(12) United States Patent
Demircin et al.

(10) Patent No.: US 7,784,076 B2
(45) Date of Patent: Aug. 24, 2010

(54) SENDER-SIDE BANDWIDTH ESTIMATION FOR VIDEO TRANSMISSION WITH RECEIVER PACKET BUFFER

(75) Inventors: Mehmet U. Demircin, Atlanta, GA (US); Petrus J. L. van Beek, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 880 days.

(21) Appl. No.: 11/113,001

(22) Filed: Apr. 21, 2005

(65) Prior Publication Data

US 2006/0095944 A1 May 4, 2006

Related U.S. Application Data

(60) Provisional application No. 60/623,157, filed on Oct. 30, 2004, provisional application No. 60/623,362, filed on Oct. 30, 2004, provisional application No. 60/623,797, filed on Oct. 30, 2004.

(51) Int. Cl.
*H04L 12/26* (2006.01)

(52) U.S. Cl. .......................... 725/81; 725/96; 709/224; 709/230; 370/465

(58) Field of Classification Search .................. 725/143
See application file for complete search history.

(56) References Cited

U.S. PATENT DOCUMENTS

| | | | |
|---|---|---|---|
| 5,159,447 A | 10/1992 | Haskell et al. | |
| 5,506,686 A | 4/1996 | Auyeung et al. | |
| 5,541,852 A | 7/1996 | Eyuboglu et al. | |
| 5,546,377 A | 8/1996 | Ozveren | |
| 5,936,940 A | 8/1999 | Marin et al. | |
| 5,978,236 A | 11/1999 | Faberman et al. | |
| 5,982,778 A | 11/1999 | Mangin et al. | |
| 5,995,705 A | 11/1999 | Lang | |
| 6,014,694 A | 1/2000 | Aharoni et al. | |
| 6,049,549 A | 4/2000 | Ganz et al. | |
| 6,055,578 A | 4/2000 | Williams et al. | |

(Continued)

FOREIGN PATENT DOCUMENTS

EP  1 026 855  10/1999

(Continued)

OTHER PUBLICATIONS

Adaptive cross-layer protection strategies for robust scalable video transmission over 802.11 WLANs van der Schaar, M.; Krishnamachari, S.; Sunghyun Choi; Xiaofeng Xu; Selected Areas in Communications, IEEE Journal, vol. 21, Issue 10, Dec. 2003 pp. 1752-1763, Digital Object Identifier 10.1109/JSAC.2003.815231.*

(Continued)

*Primary Examiner*—Andrew Y Koenig
*Assistant Examiner*—Carmine Malangone
(74) *Attorney, Agent, or Firm*—Chernoff, Vilhauer, McClung & Stenzel

(57) ABSTRACT

A method of adaptively encoding video in response to an estimation of bandwidth over a transmission channel, where bandwidth estimation uses feedback packets from a receiver acknowledging receipt of video packets transmitted during an interval when the transmitted packets are not stored in a buffer of a lower network layer.

12 Claims, 34 Drawing Sheets

U.S. PATENT DOCUMENTS

| | | | |
|---|---|---|---|
| 6,167,084 A * | 12/2000 | Wang et al. | 375/240.02 |
| 6,167,253 A | 12/2000 | Farris et al. | |
| 6,233,226 B1 | 5/2001 | Gringeri et al. | |
| 6,263,503 B1 | 7/2001 | Margulis | |
| 6,275,497 B1 | 8/2001 | Varma et al. | |
| 6,275,531 B1 | 8/2001 | Li | |
| 6,292,834 B1 | 9/2001 | Ravi et al. | |
| 6,300,665 B1 | 10/2001 | Peeters et al. | |
| 6,310,495 B1 | 10/2001 | Zhang | |
| 6,343,085 B1 | 1/2002 | Krishnan et al. | |
| 6,351,153 B1 | 2/2002 | Mishra | |
| 6,363,056 B1 | 3/2002 | Beigi et al. | |
| 6,434,606 B1 | 8/2002 | Borella et al. | |
| 6,456,591 B1 | 9/2002 | Mishra | |
| 6,459,811 B1 | 10/2002 | Hurst, Jr. | |
| 6,542,467 B2 | 4/2003 | Umayabashi | |
| 6,587,875 B1 | 7/2003 | Ogus | |
| 6,590,936 B1 | 7/2003 | Kadono | |
| 6,598,228 B2 | 7/2003 | Hejna | |
| 6,665,751 B1 | 12/2003 | Chen et al. | |
| 6,700,869 B1 | 3/2004 | Falco et al. | |
| 6,741,565 B1 | 5/2004 | Wicklund | |
| 6,747,991 B1 | 6/2004 | Hemy et al. | |
| 6,988,144 B1 | 1/2006 | Luken et al. | |
| 2001/0047423 A1 * | 11/2001 | Shao et al. | 709/235 |
| 2002/0010938 A1 | 1/2002 | Zhang et al. | |
| 2002/0054578 A1 * | 5/2002 | Zhang et al. | |
| 2002/0075857 A1 | 6/2002 | LeBlanc | |
| 2002/0085587 A1 | 7/2002 | Mascolo | |
| 2002/0101880 A1 | 8/2002 | Kim | |
| 2002/0114393 A1 | 8/2002 | Vleeschouwer | |
| 2002/0126891 A1 | 9/2002 | Osberger | |
| 2002/0136298 A1 * | 9/2002 | Anantharamu et al. | 375/240.12 |
| 2002/0140851 A1 | 10/2002 | Laksono | |
| 2002/0169880 A1 | 11/2002 | Loguinov et al. | |
| 2002/0186660 A1 | 12/2002 | Bahadiroglu | |
| 2003/0016630 A1 | 1/2003 | Vega-Garcia et al. | |
| 2003/0035133 A1 | 2/2003 | Berkema et al. | |
| 2003/0053482 A1 * | 3/2003 | Li | 370/465 |
| 2003/0067872 A1 | 4/2003 | Harrell et al. | |
| 2003/0067877 A1 | 4/2003 | Sivakumar et al. | |
| 2003/0095594 A1 | 5/2003 | Laksono et al. | |
| 2003/0101274 A1 * | 5/2003 | Yi et al. | 709/232 |
| 2003/0152032 A1 | 8/2003 | Yanagihara et al. | |
| 2003/0189589 A1 | 10/2003 | LeBlanc et al. | |
| 2004/0017773 A1 | 1/2004 | Piche et al. | |
| 2004/0027991 A1 * | 2/2004 | Jang et al. | |
| 2004/0045030 A1 * | 3/2004 | Reynolds et al. | 725/110 |
| 2004/0057381 A1 | 3/2004 | Tseng et al. | |
| 2004/0071096 A1 | 4/2004 | Na et al. | |
| 2004/0086268 A1 | 5/2004 | Radha et al. | |
| 2004/0153951 A1 | 8/2004 | Walker et al. | |
| 2004/0170186 A1 | 9/2004 | Shao et al. | |
| 2004/0190515 A1 | 9/2004 | Nogima et al. | |
| 2004/0204041 A1 | 10/2004 | Fillebrown et al. | |
| 2004/0252759 A1 * | 12/2004 | Winder et al. | 375/240.12 |
| 2004/0255328 A1 | 12/2004 | Baldwin et al. | |
| 2005/0007956 A1 | 1/2005 | Nilsson et al. | |
| 2005/0041689 A1 | 2/2005 | Wu et al. | |
| 2005/0055201 A1 | 3/2005 | Florencio et al. | |
| 2005/0094622 A1 | 5/2005 | Mallila | |
| 2005/0105469 A1 | 5/2005 | Hao | |
| 2005/0152465 A1 | 7/2005 | Maltsev et al. | |
| 2005/0169174 A1 | 8/2005 | Apostolopoulos et al. | |
| 2005/0195821 A1 | 9/2005 | Yun et al. | |
| 2005/0198258 A1 * | 9/2005 | Narsinh et al. | 709/224 |
| 2005/0204247 A1 * | 9/2005 | Guo et al. | 714/746 |
| 2005/0213502 A1 | 9/2005 | Convertino et al. | |
| 2005/0216950 A1 | 9/2005 | MacInnis | |
| 2006/0045020 A1 | 3/2006 | Picco et al. | |
| 2006/0077993 A1 * | 4/2006 | Pereira et al. | 370/412 |
| 2006/0165166 A1 | 7/2006 | Chou et al. | |
| 2006/0198392 A1 | 9/2006 | Park et al. | |
| 2007/0263657 A1 | 11/2007 | Sugar et al. | |
| 2008/0259792 A1 | 10/2008 | Cimini et al. | |

FOREIGN PATENT DOCUMENTS

| | | |
|---|---|---|
| EP | 1 047 223 A2 | 4/2000 |
| EP | 1 047 223 A3 | 4/2000 |
| EP | 1 179 925 A2 | 8/2001 |
| EP | 1 179 925 A3 | 8/2001 |
| EP | 0 699 368 | 7/2002 |
| EP | 1300046 | 4/2003 |
| EP | 1536582 | 6/2005 |
| GB | 2367219 | 3/2002 |
| JP | 6-338918 | 12/1994 |
| JP | 10-200484 | 7/1998 |
| JP | 11-215480 | 8/1999 |
| JP | 2000-308023 | 11/2000 |
| JP | 2001-223716 | 8/2001 |
| JP | 2002-58002 | 2/2002 |
| JP | 2002-94567 | 3/2002 |
| JP | 2002-217965 | 8/2002 |
| JP | 2003-008487 | 1/2003 |
| JP | 2003-32316 | 1/2003 |
| JP | 2003-37649 | 2/2003 |
| JP | 2003-204342 | 7/2003 |
| WO | WO 01/39508 | 5/2001 |
| WO | WO 02/03609 A2 | 1/2002 |
| WO | WO 02/03609 A3 | 1/2002 |
| WO | WO 02/087276 A2 | 10/2002 |
| WO | WO 02/087276 A3 | 10/2002 |
| WO | WO 02/101513 | 12/2002 |
| WO | WO 03/003630 | 1/2003 |
| WO | WO 03/009581 | 1/2003 |
| WO | WO 03/032643 | 4/2003 |
| WO | WO 03/075021 | 9/2003 |
| WO | WO 03/096698 | 11/2003 |
| WO | WO 2004/062291 | 7/2004 |

OTHER PUBLICATIONS

M. Kalman, E. Steinbach, and B. Girod, "Adaptive Media Playout for Low-Delay video Streaming Over Error-Prone Channels," IEEE Transactions on Circuits and Systems for Video Technology, vol. 14. No. 6, Jun. 2004, pp. 841-851.

R. Ramjee, J. Kurose, D. Towsley, and H. Schulzrinne, "Adaptive Playout Mechanisms for Packetized Audio Applications in Wide-Area Networks," IEEE Infocom, Toronto, Canada, Jun. 1994, 9 pages.

M. Kalman, E. Steinbach, and B. Girod, "Adaptive Playout for Real-Time Media Streaming," Proc. IEEE International Symposium on Circuits and Systems, ISCAS-2002, Scottsdale, AZ, May 2002, 4 pages.

International Search Report for PCT/US 06/36433 mailed Apr. 27, 2007.

"IEEE Wireless LAN Edition: A compilation based on IEEE Std 802.11—1999 (R2003) and its amendments," IEEE Standards Information Network, IEEE Press, Copyright 2003.

Draft Amendment to IEEE Std. 802.11 (1999 Edition), Part 11: MAC and PHY specifications: Medium Access Control (MAC) Quality of Service (QoS) Enhancements, IEEE P802.11e/D8.0, Feb. 2004.

Sergio D. Servetto and Klara Nahrstedt, "Broadcast Quality video over IP," IEEE Transactions on Multimedia, vol. 3, No. 1, Mar. 2001, pp. 162-173.

Amy R. Reibman and Barry G. Haskell, "Constraints on Variable Bit-Rate Video for ATM Networks," IEEE Transactions on circuits and Systems for Video Technology, vol. 2, No. 4, Dec. 1992, pp. 361-372.

Jean-Chrysostome Bolot and Thierry Turletti, "A rate control mechanism for packet video in the Internet," Inria, B. P. 93, 06902 Sophia-Antipolis Cedex, France, 8 pages.

Daji Qiao, et al., "Goodput Analysis and Link Adaptation for IEEE 802.11a Wireless LANs," IEEE Transactions on Mobile Computing, vol. 1, No. 4, Oct.-Dec. 2002, pp. 278-292.

Wendell Smith, "Wireless Video White Paper," ViXS Systems Inc., ViXS Confidential, Jan. 9, 2002, 15 pages.

Hsu, Chi-Yuan, Antonio Ortega and Masoud Khansari. "Rate Control for Robust Video Transmission over Burst-Error Wireless Channels," IEEE Journal on Selected Areas in Communications, vol. 17, No. 5 (May 1999): 18 pages.

Chou, Philip A., Zhourong Miao. "Rate-Distortion Optimized Steaming of Packetized Media." Submitted to IEEE Transaction of Multimedia (Feb. 2001).

Hsu, Chi-Yuan, Antonio Ortega and Masoud Khansari. "Rate Control for robust Video Transmission over Burst-Error Wireless Channels." IEEE Journal on Selected Areas in Communications, vol. 17, No. 5 (May 1999); 18 pages.

M. Jain and C. Dovrolis, "End-to-end available bandwidth: Measurement methodology, dynamics, and relation with T.CP throughput, " IEEE Trans. on Networking, vol. 11, No. 4, Aug. 2003, pp. 537-549.

K. Lai and M. Baker, "Measuring bandwidth," Proc. IEEE Infocom '98, New York, NY, Mar. 1998.

D. Loguinov and H. Radha, "Video receiver based real-time estimation channel capacity," ICIP 2002, Rochester, NY, Sep. 2002, vol. III, pp. 213-216.

V. Paxson, "End-to-end Internet packet dynamics, " Proc. ACM SIGCOMM '97, pp. 139-159, Sep. 1997, Cannes, France.

R.S. Prasad, M. Murray, C. Dovrolis and K. Claffy, "Bandwidth estimation: metrics, measurement techniques, and tools," IEEE Network, vol. 17, No. 6, Nov. 2003.

Van Beek, et al., Adaptive Streaming of High-Quality Video Over Wireless LANs, SPIE vol. 5308, year 2004, pp. 647-660.

Kurose and Ross, Computer Networking, A Top-Down approach Featuring the Internet, copyrighted 2001 by Addison Wesley Longman, Inc., complete book of 712 pages.

ISO/IEC/JTC1 SC29/WG11, "Test model 5," Apr. 1993, Sidney, Australia.

Wang & Vincent, "Bit Allocation and Constraints for Joint coding of Multiple Video Programs," IEEE, vol. 9, No. 6, Sep. 1999.

Xin et al., "Bit Allocation for Joint Transcoding of Multiple MPEG Coded Video Streams," Proc. Of Int. Conf. On Multimedia and Expo (ICME 2001), Tokyo, Japan.

Gardner et al., "HomePlug Standard Brings Networking to the Home," CSD, vol. 6, No. 12, Dec. 2000.

O'Hara and Petrick, The IEEE 802.11 Handbook, A Designer's Companion, published May 2001 by Standards Information Network IEEE New York, NY.

Bolot and Turletti, Experience with Control Mechanisms for Packet Video in the Internet, Computer Communications Review, vol. 28, No. 1, Jan. 1998.

Chen and Gilbert, "Measured Performance of 5-GHz 801.11 a Wireless LAN Systems White Paper," Atheros Communications, Aug. 27, 2001.

Vasan and Shankar, "An Emperical Characterization of Instantaneous Throughput in 802.11b WLANs," Technical Report CS-TR-4389, University of Maryland, College Park, MD.

Girod and Farber, "Wireless Video, Compressed Video Over Networks," 1999.

M. Kalman, B. Giron and P. Van Beek, "Optimized transcoding rate selection and packet scheduling for transmitting multiple video streams over a shared channel," IEEE Int. Conference on Image Processing (ICIP 2005), Genova, Italy, Sep. 2005, 4 pages.

K. Stuhlmuller, N. Farber, M. Link and B. Girod, "Analysis of video transmission over lossy channels," IEEE Journal on Selected Areas in Communications, vol. 18, No. 6, Jun. 2000, pp. 1012-1032.

S. Aramvith, I-M. Pao and M.-T. Sun, "A rate control scheme for video transport over wireless channels," IEEE Trans. On Circuits and Systems for Video Technology, vol. 11, No. 5, May 2001.

* cited by examiner

I = INTERFRAME
B = B-FRAME
P = P-FRAME (MPEG-2 TM5):

Dynamic rate adaptation with Virtual GOPs (VGOPs)

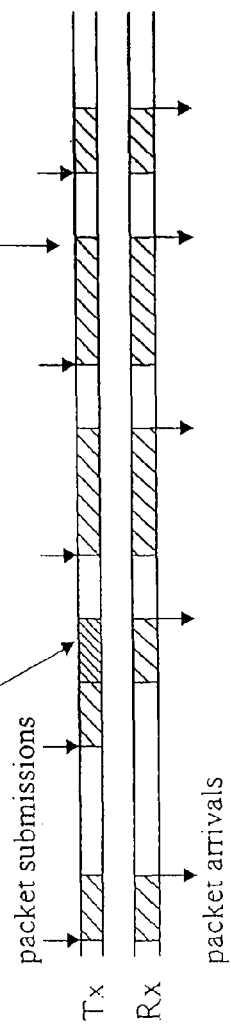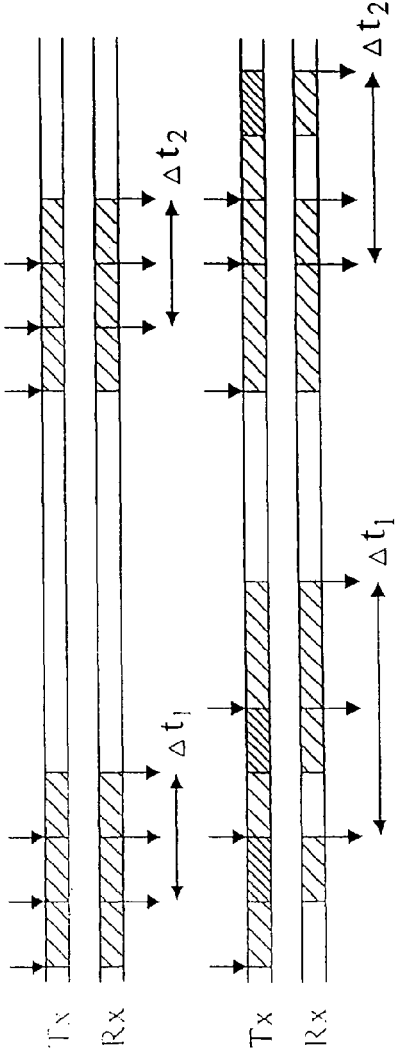
FIG. 19
FIG. 20

Measurements of maximum throughput/bandwidth using the packet burst method in ideal conditions.

- Bandwidth
- 10-point average
- IIR(0.1)

Measurements of maximum throughput/bandwidth using the packet burst method in non-ideal conditions.

- Bandwidth
- 10-point average
- IIR(0.1)

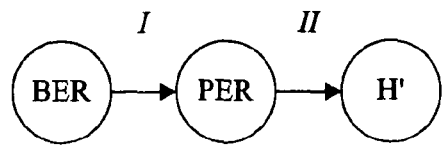
FIG. 33
| MSDU size | BER = 0 | BER = $10^{-7}$ | BER = $10^{-6}$ | BER = $10^{-5}$ | ... |
|---|---|---|---|---|---|
| 1500 | 6.246 | 6.237 | 6.159 | 5.408 | ... |
| 1400 | 6.059 | 6.051 | 5.980 | 5.294 | ... |
| 1300 | 5.856 | 5.849 | 5.785 | 5.163 | ... |
| ... | ... | ... | ... | ... | ... |
| 200 | 1.640 | 1.639 | 1.636 | 1.605 | ... |
| 100 | 0.886 | 0.886 | 0.885 | 0.876 | ... |
FIG. 34
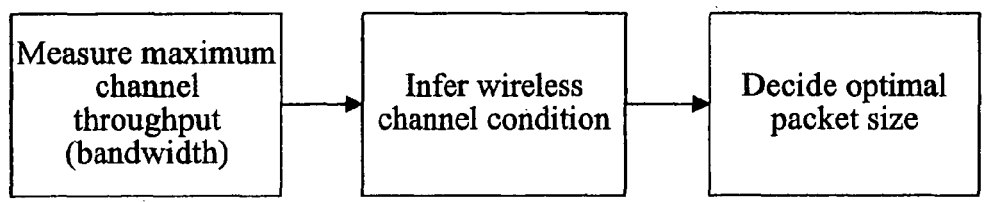
FIG. 35

Current MSDU size = 1500 bytes

| Available bandwidth range (bits per second) | New MSDU size (bytes) |
|---|---|
| [5675541, 9999999] | 1500 |
| [5007744, 5675540] | 1200 |
| [4212373, 5007743] | 1000 |
| [2977856, 4212372] | 900 |
| [1528917, 2977855] | 600 |
| [505387, 1528916] | 400 |
| [110891, 505386] | 300 |
| [15701, 110890] | 200 |
| [0, 15700] | 100 |

FIG. 36A

Current MSDU size = 1200 bytes

| Available bandwidth range (bits per second) | New MSDU size (bytes) |
|---|---|
| [5170473, 9999999] | 1500 |
| [4674327, 5170472] | 1200 |
| [4073677, 4674326] | 1000 |
| [3099940, 4073676] | 900 |
| [1800485, 3099939] | 600 |
| [692945, 1800484] | 400 |
| [171405, 692944] | 300 |
| [29788, 171404] | 200 |
| [0, 29787] | 100 |

FIG. 36B

Current MSDU size = 1000 bytes

| Available bandwidth range (bits per second) | New MSDU size (bytes) |
|---|---|
| [4734126, 9999999] | 1500 |
| [4349700, 4734125] | 1200 |
| [3879738, 4349699] | 1000 |
| [3100680, 3879737] | 900 |
| [1971702, 3100679] | 600 |
| [858762, 1971701] | 400 |
| [236682, 858761] | 300 |
| [45684, 236681] | 200 |
| [0, 45683] | 100 |

FIG. 36C

Current MSDU size = 900 bytes

| Available bandwidth range (bits per second) | New MSDU size (bytes) |
|---|---|
| [4476751, 9999999] | 1500 |
| [4147329, 4476750] | 1200 |
| [3741849, 4147328] | 1000 |
| [3063627, 3741848] | 900 |
| [2042902, 3063626] | 600 |
| [953387, 2042901] | 400 |
| [281462, 953386] | 300 |
| [57649, 281461] | 200 |
| [0, 57648] | 100 |

FIG. 36D

Current MSDU size = 600 bytes

| Available bandwidth range (bits per second) | New MSDU size (bytes) |
|---|---|
| [3494920, 9999999] | 1500 |
| [3317600, 3494919] | 1200 |
| [3096903, 3317599] | 1000 |
| [2719860, 3096902] | 900 |
| [2100193, 2719859] | 600 |
| [1248867, 2100192] | 400 |
| [493827, 1248866] | 300 |
| [124410, 493826] | 200 |
| [0, 124409] | 100 |

FIG. 36E

Current MSDU size = 400 bytes

| Available bandwidth range (bits per second) | New MSDU size (bytes) |
|---|---|
| [2594700, 9999999] | 1500 |
| [2504955, 2594699] | 1200 |
| [2391495, 2504954] | 1000 |
| [2195730, 2391494] | 900 |
| [1863720, 2195729] | 600 |
| [1336875, 1863719] | 400 |
| [697965, 1336874] | 300 |
| [232965, 697964] | 200 |
| [0, 232964] | 100 |

FIG. 36F

Current MSDU size = 300 bytes

| Available bandwidth range (bits per second) | New MSDU size (bytes) |
|---|---|
| [2040000, 9999999] | 1500 |
| [1986053, 2039999] | 1200 |
| [1918053, 1986052] | 1000 |
| [1799733, 1918052] | 900 |
| [1596187, 1799732] | 600 |
| [1258453, 1596186] | 400 |
| [777467, 1258452] | 300 |
| [323227, 777466] | 200 |
| [0, 323226] | 100 |

FIG. 36G

Current MSDU size = 200 bytes

| Available bandwidth range (bits per second) | New MSDU size (bytes) |
|---|---|
| [1393630, 9999999] | 1500 |
| [1368690, 1393629] | 1200 |
| [1336870, 1368689] | 1000 |
| [1281400, 1336869] | 900 |
| [1185080, 1281399] | 600 |
| [1020820, 1185079] | 400 |
| [755510, 1020819] | 300 |
| [415810, 755509] | 200 |
| [0, 415809] | 100 |

FIG. 36H

Current MSDU size = 100 bytes

| Available bandwidth range (bits per second) | New MSDU size (bytes) |
|---|---|
| [633960, 9999999] | 1500 |
| [628200, 633959] | 1200 |
| [621000, 628199] | 1000 |
| [608040, 620999] | 900 |
| [585000, 608039] | 600 |
| [545040, 584999] | 400 |
| [477000, 545039] | 300 |
| [365040, 476999] | 200 |
| [0, 365039] | 100 |

FIG. 36I

```
for (i=0; i<numDataUnits; i++)
{
    Let u be the index of the most recent data unit for which feedback was received
    Let k = u + 1
    Let $\overline{H}$ be the most recent estimate of available bandwidth (maximum throughput)
    Let $s_i$ be the current time
    Compute $z_i = s_{start} + i \cdot \Delta T + F \cdot \Delta T_E - s_i - M \cdot \sum_{j=k}^{i-1} \frac{P_j}{\overline{H}}$
    Select $P_i$ from a predetermined set such that $\left| z_i - M \cdot \frac{P_i}{\overline{H}} \right|$ is minimized
    Store $P_i$ in memory
    Encode or Transcode data unit $i$ into $M$ packets with payload size $P_i$
    Packetize data unit $i$ at rate $r_i = M \cdot P_i$
    Send these $M$ packets into the network interface
    Wait until the next data unit must be processed
}
```

FIG. 40

```
for (i=0; i<numDataUnits; i++)
{
    Let u be the index of the most recent data unit for which feedback was received
    Let k = u + 1

Let $\bar{H}$ be the most recent estimate of available bandwidth (maximum throughput)

Let $s_i$ be the current time

Compute $z_i = s_{start} + i \cdot \Delta T + F \cdot d_B - s_i - \sum_{j=k}^{i-1} M_j \cdot \frac{P}{\bar{H}}$ Select $M_i$ from a predetermined set such that $\left| z_i - M_i \cdot \frac{P}{\bar{H}} \right|$ is minimized Store $M_i$ in memory Encode or Transcode data unit $i$ at rate $r_i = M_i \cdot P$ Packetize data unit $i$ into $M_i$ packets with payload size $P$ Send these $M_i$ packets into the network interface Wait until the next data unit must be processed
}
```

FIG. 41

Bandwidth estimation

Early bandwidth estimation

SENDER-SIDE BANDWIDTH ESTIMATION FOR VIDEO TRANSMISSION WITH RECEIVER PACKET BUFFER

CROSS REFERENCE TO RELATED DOCUMENTS

The present application claims the benefit of U.S. Provisional Application No. 60/623,157, filed Oct. 30, 2004; U.S. Provisional Application No. 60/623,362, filed Oct. 30, 2004; and U.S. Provisional Application No. 60/623,797, filed Oct. 30, 2004.

BACKGROUND OF THE INVENTION

The present invention relates generally to wireless transmission systems, and relates more particularly to a wireless video transmission system.

Developing enhanced television systems is a significant consideration for consumer electronics manufacturers. In conventional television systems, a display device may be utilized to view program information received from a program source. The conventional display device is typically positioned in a stationary location because of restrictions imposed by various physical connections coupling the display device to input devices, output devices, and operating power. Other considerations such as display size and display weight may also significantly restrict viewer mobility in traditional television systems.

Portable television displays may advantageously provide viewers with additional flexibility when choosing an appropriate viewing location. For example, in a home environment, a portable television may readily be relocated to view programming at various remote locations throughout the home. A user may thus flexibly view television programming, even while performing other tasks in locations that are remote from a stationary display device.

Furthermore, a significant proliferation in the number of potential program sources (both analog and digital) may benefit a system user by providing an abundance of program material for selective viewing. In particular, an economical wireless audio/video transmission system for flexible home use may enable television viewers to significantly improve their television-viewing experience by facilitating portability while simultaneously providing an increased number of program source selections.

The evolution of digital data network technology and wireless digital transmission techniques may provide additional flexibility and increased quality to television systems in the home. However, current wireless data networks typically are not optimized for transmission of high quality video information.

High quality continuous media streams, such as video image streams, in their raw form often require high transmission rates, or bandwidth, for effective and/or timely transmission. In many cases, the cost and/or effort of providing the required transmission rate is prohibitive. This transmission rate problem is often solved by compression schemes that take advantage of the continuity in content to create highly packed data. Compression methods such as based on Motion Picture Experts Group (MPEG) standards and its variants for audio and video are well known. With high resolution video, such as the resolution of 1080i used in high definition television (HDTV), the data transmission rate of such a video image stream will be very high even after compression.

One problem posed by such a high data transmission rate is data storage. Recording or saving high rate video streams for any reasonable length of time requires considerably large amounts of storage that can be prohibitively expensive. Another problem presented by high resolution video data is that many output devices are incapable of rendering the data. For example, display systems that can be used to view video image streams having a lower resolution may not be capable of displaying such a high resolution. Yet another problem is the transmission of continuous media in networks with a limited bandwidth or capacity. For example, in a local area network with multiple receiving/output devices, such a network will often have a limited bandwidth or capacity, and hence be physically and/or logistically incapable of simultaneously supporting multiple receiving/output devices. Furthermore, the available bandwidth of wireless interconnections and networks often varies over time and is unpredictable due to several factors.

Transmission of compressed media data over such networks is difficult, because a high bandwidth is required continuously, and because of the stringent delay constraints associated with continuous media streams. Degradation of the channel condition may result in data packets being lost or delayed, leading to distortions or interruptions of the media presentation.

BRIEF DESCRIPTION OF THE DRAWINGS

FIG. 19 illustrates an APPLICATION layer model-based approach.
FIG. 20 illustrates an APPLICATION layer packet burst approach.

FIG. 33 illustrates BER, PER, and H'.
FIG. 34 illustrates expected 802.11B MAC maximum throughput for different values of the BER and different values of the MSDU size.
FIG. 35 illustrates a processing system.
FIG. 36A-I illustrates look up tables.
FIG. 40 illustrates one technique.
FIG. 41 illustrates another technique.

BRIEF DETAILED DESCRIPTION OF THE PREFERRED EMBODIMENTS

Figure 1:
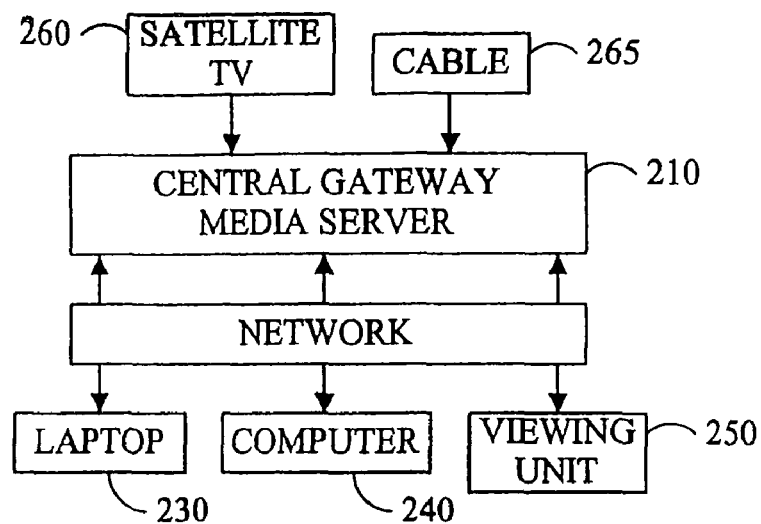
FIG. 1 illustrates a gateway, media sources, receiving units, and a network.

FIG. 1 illustrate a system for transmission of multiple data streams in a network that may have limited bandwidth. The system includes a central gateway media server 210 and a plurality of client receiver units 230, 240, 250. The central gateway media server may be any device that can transmit multiple data streams. The input data streams may be stored on the media server or arrive from an external source, such as a satellite television transmission 260, a digital video disc player, a video cassette recorder, or a cable head end 265, and are transmitted to the client receiver units 230, 240, 250 in a compressed format. The data streams can include display data, graphics data, digital data, analog data, multimedia data, audio data and the like. An adaptive bandwidth system on the gateway media server 210 determines the network bandwidth characteristics and adjusts the bandwidth for the output data streams in accordance with the bandwidth characteristics.

In one existing system, the start time of each unit of media for each stream is matched against the estimated transmission time for that unit. When any one actual transmission time exceeds its estimated transmission time by a predetermined threshold, the network is deemed to be close to saturation, or already saturated, and the system may select at least one stream as a target for lowering total bandwidth usage. Once the target stream associated with a client receiver unit is chosen, the target stream is modified to transmit less data, which may result in a lower data transmission rate. For example, a decrease in the data to be transmitted can be accomplished by a gradual escalation of the degree of data compression performed on the target stream, thereby reducing the resolution of the target stream. If escalation of the degree of data compression alone does not adequately reduce the data to be transmitted to prevent bandwidth saturation, the resolution of the target stream can also be reduced. For example, if the target stream is a video stream, the frame size could be scaled down, reducing the amount of data per frame, and thereby reducing the data transmission rate.

By way of background the bandwidth requirements for acceptable quality of different types of content vary significantly:
 CD audio is generally transmitted at about 1 Mbps;
 Standard definition video (MPEG-2) is generally transmitted at about 6 Mbps;
 High Definition video (MPEG-2) is generally transmitted at about 20 Mbps; and
 Multiple audio/video streams are generally transmitted at about 50-150 Mbps or more.

The overall quality can be expressed in many different ways, such as for example, the peak signal-to-noise ratio, delay (<100 ms for effective real-time two-way communication), synchronization between audio and video (<10 ms typically), and jitter (time varying delay). In many cases the audio/video streams are unidirectional, but may include a back-channel for communication.

There are many characteristics that the present inventors identified that may be considered for an audio/visual transmission system in order to achieve improved results over the technique described above.

(1) The devices may be located at different physical locations, and, over time, the users may change the location of these devices relative to the gateway. For example, the user may relocate the device near the gateway or farther away from the gateway, or, the physical environment may change significantly over time, both of which affect the performance of the wireless network for that device, and in turn the available bandwidth for other devices. This results in unpredictable and dynamically varying bandwidth.

(2) Different devices interconnected to the network have different resources and different usage paradigms. For example, different devices may have different microprocessors, different memory requirements, different display characteristics, different connection bandwidth capabilities, and different battery resources. In addition, different usage paradigms may include for example, a mobile handheld device versus a television versus a personal video recorder. This results in unpredictable and dynamically varying network maximum throughput.

(3) Multiple users may desire to access the data from the system simultaneously using different types of devices. As the user access data and stops accessing data the network conditions will tend to dynamically change. This results in unpredictable and dynamically varying network maximum throughput.

(4) Depending on the client device the transmitted data may need to be in different formats, such as for example, MPEG-2, MPEG-1, H.263, H.261, H.264, MPEG-4, analog, and digital. These different formats may have different impacts on the bandwidth. This results in unpredictable and dynamically varying network maximum throughput.

(5) The data provided to the gateway may be in the form of compressed bit streams which may include a constant bit rate (CBR) or variable bit rate (VBR). This results in unpredictable and dynamically varying network maximum throughput.

Various network technologies may be used for the gateway reception and transmission, such as for example, IEEE 802.11, Ethernet, and power-line networks (e.g., HomePlug Powerline Alliance). While such networks are suitable for data transmission, they do not tend to be especially suitable for audio/video content because of the stringent requirements imposed by the nature of audio/video data transmission. Moreover, the network capabilities, and in particular the data maximum throughput offered, are inherently unpredictable and may dynamically change due to varying conditions described above. The data throughput may be defined in terms of the amount of actual (application) payload bits (per second) being transmitted from the sender to the receiver successfully. It is noted that while the system may refer to audio/video, the concepts are likewise used for video alone and/or audio alone.

With reference to one particular type of wireless network, namely, IEEE 802.11, such as IEEE 802.11a and 802.11b, they can operate at several different data link rates:

6, 9, 12, 18, 24, 36, 48, or 54 Mbps for 802.11(a), and
1, 2, 5.5, or 11 Mbps for 802.11(b).

However, the actual maximum throughput as seen by the application layer is lower due to protocol overhead and depends on the distance between the client device and the access point (AP), and the orientation of the client device. Accordingly, the potential maximum throughput for a device within a cell (e.g., a generally circular area centered around the AP) is highest when the device is placed close to the AP and lower when it is farther away. In addition to the distance, other factors contribute to lowering the actual data maximum throughput, such as the presence of walls and other building structures, and radio-frequency interference due to the use of cordless phones and microwave ovens. Furthermore, multiple devices within the same cell communicating with the same AP must share the available cell maximum throughput.

A case study by Chen and Gilbert, "Measured Performance of 5-GHz 802.11a wireless LAN systems", Atheros Communications, 27 Aug. 2001 shows that the actual maximum throughput of an IEE 802.11a system in an office environment is only about 23 Mbps at 24 feet, and falls below 20 Mbps (approximately the rate of a single high definition video signal) at ranges over 70 feet. The maximum throughput of an 802.11(b) system is barely 6 Mbps and falls below 6 Mbps (approximately the rate of a single standard definition video signal at DVD quality) at ranges over 25 feet. The report quotes average throughput values for within a circular cell with radius of 65 feet (typical for large size houses in the US) as 22.6 Mbps and 5.1 Mbps for 802.11a and 802.11b, respectively. Accordingly, it may be observed that it is not feasible to stream a standard definition and a high definition video signal to two client devices at the same time using an 802.11a system, unless the video rates are significantly reduced. Also other situations likewise involve competing traffic from several different audiovisual signals. Moreover, wireless communications suffer from radio frequency interference from devices that are unaware of the network, such as cordless phones and microwave ovens, as previously described. Such interference leads to unpredictable and dynamic variations in network performance, i.e., losses in data maximum throughput/bandwidth.

Wireless Local Area Networks (WLANs), such as 802.11 systems, include efficient error detection and correction techniques at the Physical (PHY) and Medium Access Control (MAC) layer. This includes the transmission of acknowledgment frames (packets) and retransmission of frames that are believed to be lost. Such retransmission of frames by the source effectively reduces the inherent error rate of the medium, at the cost of lowering the effective maximum throughput. Also, high error rates may cause the sending stations in the network to switch to lower raw data link rates, again reducing the error rate while decreasing the data rates available to applications.

Networks based on power-line communication address similar challenges due to the unpredictable and harsh nature of the underlying channel medium. Systems based on the HomePlug standard include technology for adapting the data link rate to the channel conditions. Similar to 802.11 wireless networks, HomePlug technology contains techniques such as error detection, error correction, and retransmission of frames to reduce the channel error rate, while lowering effective maximum throughput. Due to the dynamic nature of these conditions, the maximum throughput offered by the network may (e.g., temporarily) drop below the data rate required for transmission of AV data streams. This results in loss of AV data, which leads to an unacceptable decrease in the perceived AV quality.

To reduce such limitations one may (1) improve network technology to make networks more suitable to audio/visual data and/or (2) one may modify the audio/visual data to make the audio/visual data more suitable to such transmission networks. Therefore, a system may robustly stream audio/visual data over (wireless) networks by:

(1) optimizing the quality of the AV data continuously, in real-time; and
(2) adapting to the unpredictable and dynamically changing conditions of the network.

Accordingly a system that includes dynamic rate adaption is suitable to accommodate distribution of high quality audio/video streams over networks that suffer from significant dynamic variations in performance. These variations may be caused by varying of distance of the receiving device from the transmitter, from interference, or other factors.

The following discussion includes single-stream dynamic rate adaptation, followed by multi-stream dynamic rate adaptation, and then various other embodiments.

Single Stream Dynamic Rate Adaptation

Figure 2:
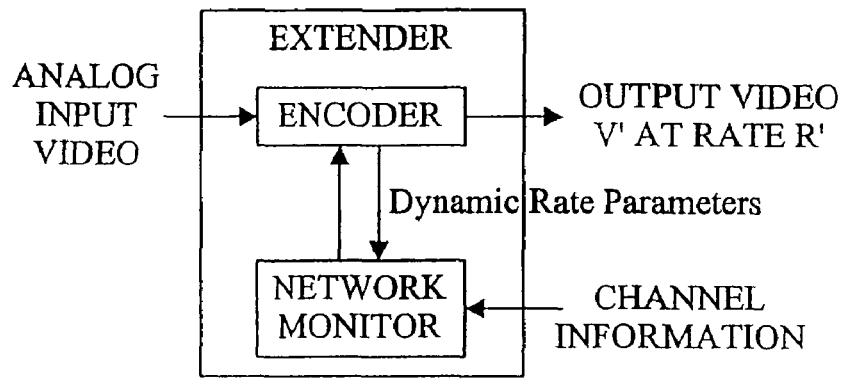
FIG. 2 illustrates an analog extender.
Figure 3:
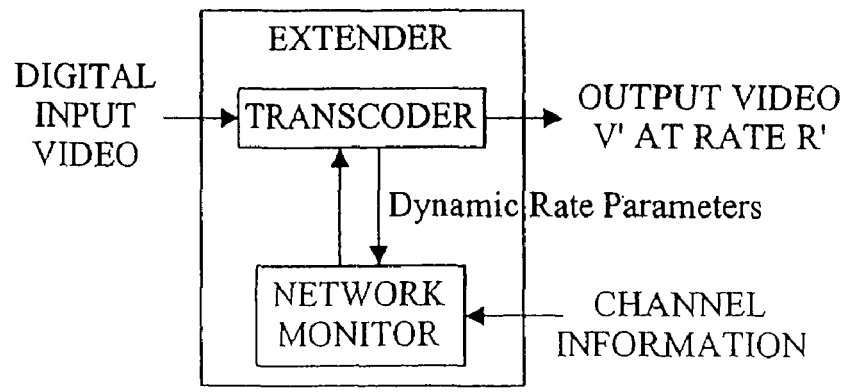
FIG. 3 illustrate a digital extender.

A system that uses dynamic rate adaptation for robust streaming of video over networks may be referred to as an extender. A basic form of an extender that processes a single video stream is shown in FIGS. 2 and 3. FIGS. 2 and 3 depict the transmitting portion of the system, the first having analog video inputs, the second having digital (compressed) video inputs. The extender includes a video encoding or transcoding module, depending on whether the input video is in analog or digital (compressed) format. If the input is analog, the processing steps may include A/D conversion, as well as digital compression, such as by an MPEG-2 encoder, and eventual transmission over the network. If the input is already in digital format, such as an MPEG-2 bit stream, the processing may include transcoding of the incoming bit stream to compress the incoming video into an output stream at a different bit rate, as opposed to a regular encoder. A transcoding module normally reduces the bit rate of a digitally compressed input video stream, such as an MPEG-2 bit stream or any other suitable format.

The coding/transcoding module is provided with a desired output bit rate (or other similar information) and uses a rate control mechanism to achieve this bit rate. The value of the desired output bit rate is part of information about the transmission channel provided to the extender by a network monitor module. The network monitor monitors the network and estimates the bandwidth available to the video stream in real time. The information from the network monitor is used to ensure that the video stream sent from the extender to a receiver has a bit rate that is matched in some fashion to the available bandwidth (e.g., channel rate). With a fixed video bit rate normally the quality varies on a frame by frame basis. To achieve the optimal output bit rate, the coder/transcoder may increase the level of compression applied to the video data, thereby decreasing visual quality slowly. In the case of a transcoder, this may be referred to as transrating. Note that the resulting decrease in visual quality by modifying the bit stream is minimal in comparison to the loss in visual quality that would be incurred if a video stream is transmitted at bit rates that can not be supported by the network. The loss of video data incurred by a bit rate that can not be supported by the network may lead to severe errors in video frames, such as dropped frames, followed by error propagation (due to the nature of video coding algorithms such as MPEG). The feedback obtained from the network monitor ensures that the output bit rate is toward an optimum level so that any loss in quality incurred by transrating is minimal.

The receiver portion of the system may include a regular video decoder module, such as an MPEG-2 decoder. This decoder may be integrated with the network interface (e.g., built into the hardware of a network interface card). Alternatively, the receiving device may rely on a software decoder (e.g., if it is a PC). The receiver portion of the system may also include a counterpart to the network monitoring module at the transmitter. In that case, the network monitoring modules at the transmitter and receiver cooperate to provide the desired estimate of the network resources to the extender system. In some cases the network monitor may be only at the receiver.

If the system, including for example the extender, has information about the resources available to the client device consuming the video signal as previously described, the extender may further increase or decrease the output video quality in accordance with the device resources by adjusting bandwidth usage accordingly. For example, consider an MPEG-1 source stream at 4 Mbps with 640 by 480 spatial resolution at 30 fps. If it is being transmitted to a resource-limited device, e.g., a handheld with playback capability of 320 by 240 picture resolution at 15 fps, the transcoder may reduce the rate to 0.5 Mbps by simply subsampling the video without increasing the quantization levels. Otherwise, without subsampling, the transcoder may have to increase the level of quantization. In addition, the information about the device resources also helps prevent wasting shared network resources. A transcoder may also convert the compression format of an incoming digital video stream, e.g., from MPEG-2 format to MPEG-4 format. Therefore, a transcoder may for example: change bit rate, change frame rate, change spatial resolution, and change the compression format.

The extender may also process the video using various error control techniques, e.g. such methods as forward error correction and interleaving.

Dynamic Rate Adaptation

Another technique that may be used to manage available bandwidth is dynamic rate adaptation, which generally uses feedback to control the bit rate. The rate of the output video is modified to be smaller than the currently available network bandwidth from the sender to the receiver, most preferably smaller at all times. In this manner the system can adapt to a network that does not have a constant bit rate, which is especially suitable for wireless networks.

Figure 4:
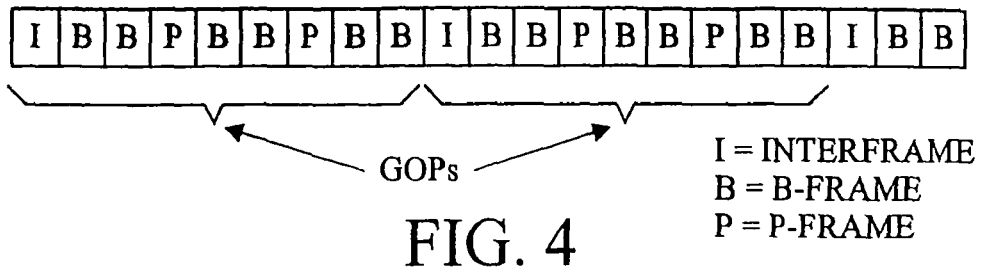
FIG. 4 illustrates GOPs.
Figure 10:
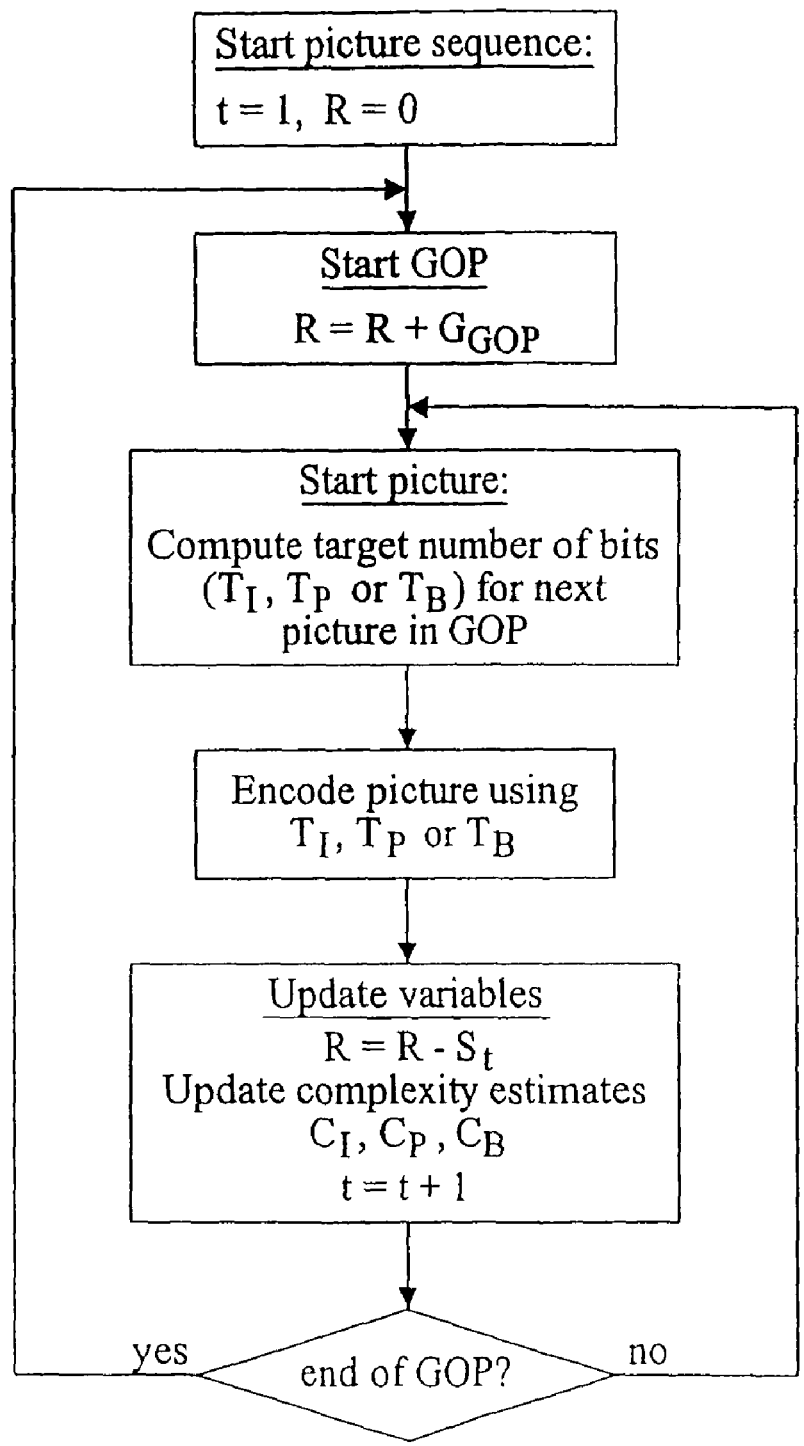
FIG. 10 illustrates MPEG-2 TM5.

One technique for rate control of MPEG video streams is that of the so-called MPEG-2 Test Model 5 (TM5), which is a reference MPEG-2 codec algorithm published by the MPEG group (see FIG. 10). Referring to FIG. 4, rate control in TM5 starts at the level of a Group-of-Pictures (GOP), consisting of a number of I, P, and B-type video frames. The length of a GOP in number of pictures is denoted by $N_{GOP}$. Rate control for a constant-bit-rate (CBR) channel starts by allocating a fixed number of bits $G_{GOP}$ to a GOP that is in direct proportion to the (constant) bandwidth offered. Subsequently, a target number of bits is allocated to a specific frame in the GOP. Each subsequent frame in a GOP is allocated bits just before it is coded. After coding all frames in a GOP, the next GOP is allocated bits. This is illustrated in FIG. 4 where $N_{GOP}=9$ for illustration purposes.

An extension for a time-varying channel can be applied if one can assume that the available bandwidth varies only slowly relative to the duration of a GOP. This may be the case when the actual channel conditions for some reason change only slowly or relatively infrequently. Alternatively, one may only be able to measure the changing channel conditions with coarse time granularity. In either case, the bandwidth can be modeled as a piece-wise constant signal, where changes are allowed only on the boundaries of a (super) GOP. Thus, $G_{GOP}$ is allowed to vary on a GOP-by-GOP basis.

Figure 5:
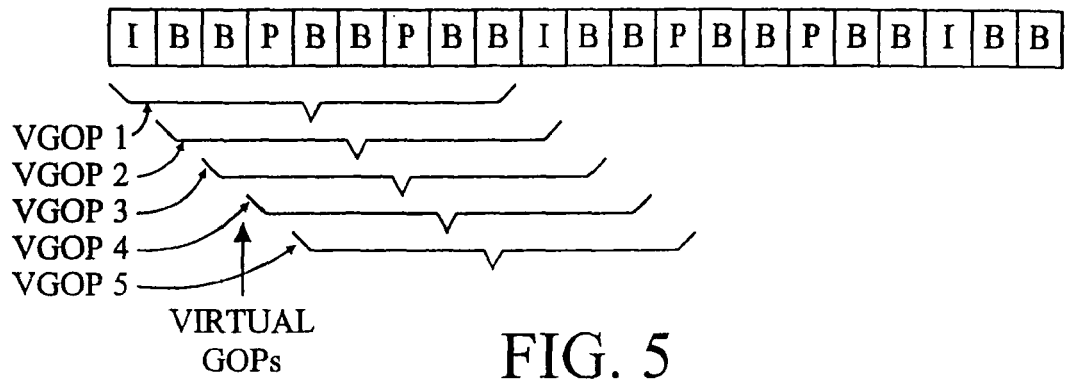
FIG. 5 illustrates virtual GOPs.
Figure 11:
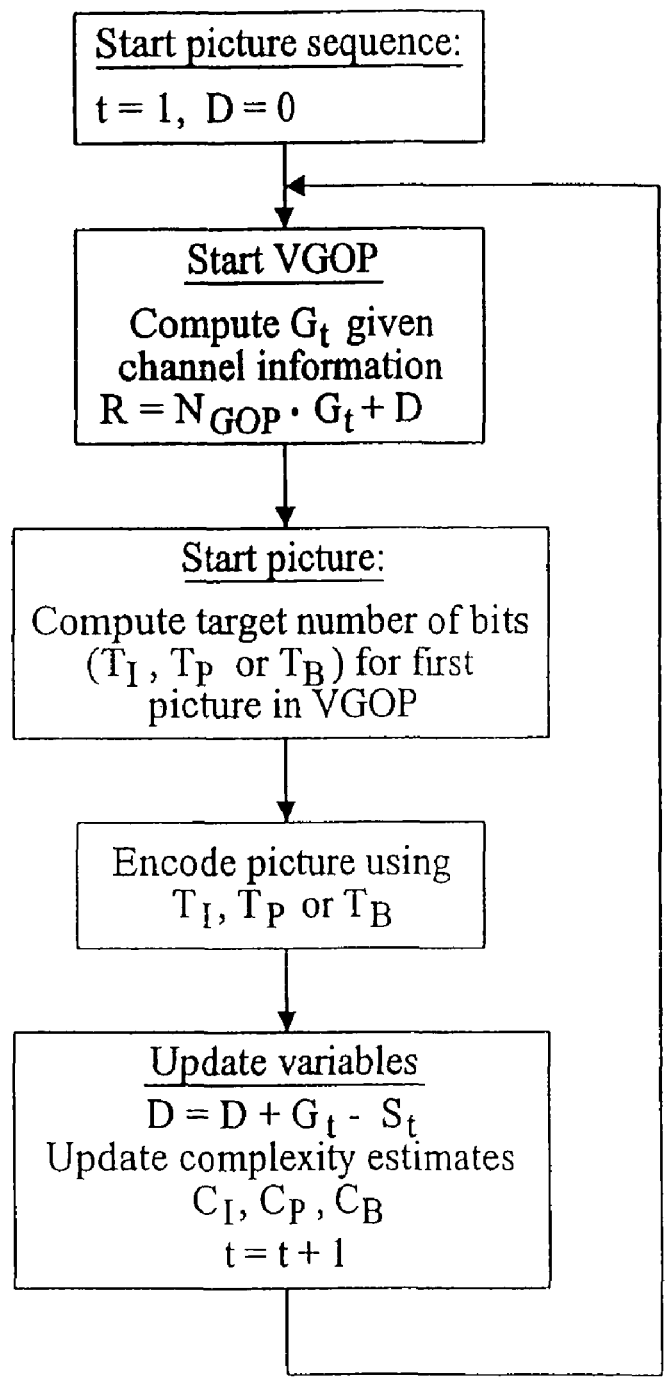
FIG. 11 illustrates dynamic rate adaptation with virtual GOPs.

However, this does not resolve the issues when the bandwidth varies quickly relative to the duration of a GOP, i.e., the case where adjustments to the target bit rate and bit allocation should be made on a frame-by-frame basis or otherwise a much more frequent basis. To allow adjustments to the target bit rate on a frame-by-frame basis, one may introduce the concept of a virtual GOP, as shown in FIG. 5 (see FIG. 11).

Each virtual GOP may be the same length as an actual MPEG GOP, any other length, or may have a length that is an integer multiple of the length of an actual MPEG GOP. A virtual GOP typically contains the same number of I-, P- and B-type pictures within a single picture sequence. However, virtual GOPs may overlap each other, where the next virtual GOP is shifted by one (or more) frame with respect to the current virtual GOP. The order of I-, P- and B-type pictures changes from one virtual GOP to the next, but this does not influence the overall bit allocation to each virtual GOP. Therefore, a similar method, as used e.g. in TM5, can be used to allocate bits to a virtual GOP (instead of a regular GOP), but the GOP-level bit allocation is in a sense "re-started" at every frame (or otherwise "re-started" at different intervals).

Let $R_t$ denote the remaining number of bits available to code the remaining frames of a GOP, at frame t. Let $S_t$ denote the number of bits actually spent to code the frame at time t. Let $N_t$ denote the number of frames left to code in the current GOP, starting from frame t.

In TM5, $R_t$ is set to 0 at the start of the sequence, and is incremented by $G_{GOP}$ at the start of every GOP. Also, $S_t$ is subtracted from $R_t$ at the end of coding a picture. It can be shown that $R_t$ can be written as follows, in closed form:

$$R_t = N_t G_P + \sum_{j=1}^{t-1} (G_P - S_j), \qquad (1)$$

where $G_P$ is a constant given by:

$$G_P = \frac{G_{GOP}}{N_{GOP}}$$

indicating the average number of bits available to code a single frame.

To handle a time varying bandwidth, the constant $G_P$ may be replaced by $G_t$, which may vary with t. Also, the system may re-compute (1) at every frame t, i.e., for each virtual GOP. Since the remaining number of frames in a virtual GOP is $N_{GOP}$, the system may replace $N_t$ by $N_{GOP}$, resulting in:

$$R_t = N_{GOP} G_t + \sum_{j=1}^{t-1} (G_j - S_j), \qquad (2)$$

Given $R_t$, the next step is allocate bits to the current frame at time t, which may be of type I, P, or B. This step takes into account the complexity of coding a particular frame, denoted by $C_t$. Frames that are more complex to code, e.g., due to complex object motion in the scene, require more bits to code, to achieve a certain quality. In TM-5, the encoder maintains estimates of the complexity of each type of frame (I, P, or B), which are updated after coding each frame. Let $C_I$, $C_P$ and $C_B$ denote the current estimates of the complexity for I, P and B frames. Let $N_I$, $N_P$ and $N_B$ denote the number of frames of type I, P and B left to encode in a virtual GOP (note that these are constants in the case of virtual GOPs).

TM5 prescribes a method for computing $T_I$, $T_P$ and $T_B$, which are the target number of bits for an I, B, or P picture to be encoded, based on the above parameters. The TM5 equations may be slightly modified to handle virtual GOPs as follows:

$$T_I = R_t \bigg/ \left( N_I + N_P \frac{K_I C_P}{K_P C_I} + N_B \frac{K_I C_B}{K_B C_I} \right) \quad (3)$$

$$T_P = R_t \bigg/ \left( N_P + N_I \frac{K_P C_I}{K_I C_P} + N_B \frac{K_P C_B}{K_B C_P} \right)$$

$$T_B = R_t \bigg/ \left( N_B + N_I \frac{K_B C_I}{K_I C_B} + N_P \frac{K_B C_P}{K_P C_B} \right),$$

where $K_I$, $K_P$, and $K_B$ are constants. I, B, P, refer to I frames, B frames, and P frames, and C is a complexity measure. It is to be understood that any type of compression rate distortion model, defined in the general sense, may likewise be used.

As it may be observed, this scheme permits the reallocation of bits on a virtual GOP basis from frame to frame (or other basis consistent with virtual GOP spacing). The usage and bit allocation for one virtual GOP may be tracked and the unused bit allocation for a virtual GOP may be allocated for the next virtual GOP.

Multi-Stream Dynamic Rate Adaptation

The basic extender for a single AV stream described above will encode an analog input stream or adapt the bit rate of an input digital bit stream to the available bandwidth without being concerned about the cause of the bandwidth limitations, or about other, competing streams, if any. In the following, the system may include a different extender system that processes multiple video streams, where the extender system assumes the responsibility of controlling or adjusting the bit rate of multiple streams in the case of competing traffic.

Figure 6:
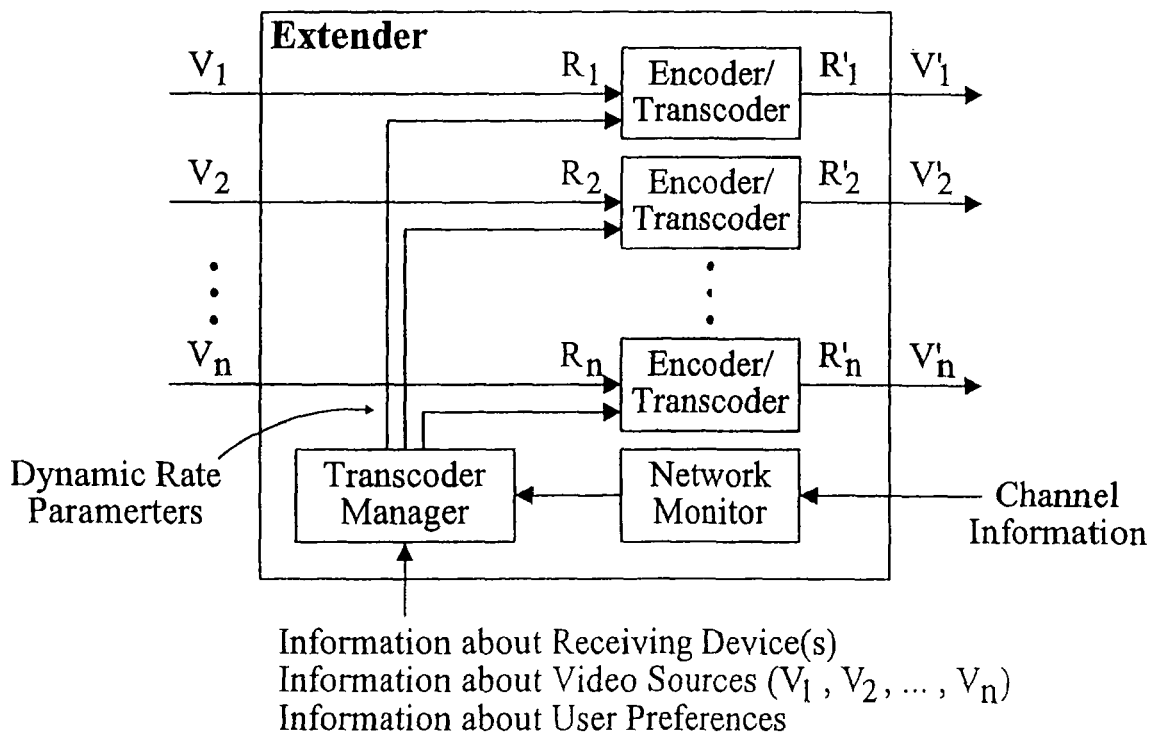
FIG. 6 illustrates a more detailed view of an extender.

The multi-stream extender, depicted in FIG. 6, employs a "(trans)coder manager" on top of multiple video encoders/transcoders. As shown in FIG. 6, the system operates on n video streams, where each source may be either analog (e.g. composite) or digital (e.g. MPEG-2 compressed bitstreams). Here, $V_n$ denotes input stream n, while $V'_n$ denotes output stream n. $R_n$ denotes the bit rate of input stream n (this exists only if input stream n is in already compressed digital form; it is not used if the input is analog), while $R'_n$ denotes the bit rate of output stream n.

Each input stream is encoded or transcoded separately, although their bit rates are controlled by the (trans)coder manager. The (trans)coder manager handles competing requests for bandwidth dynamically. The (trans)coding manager allocates bit rates to multiple video streams in such a way that the aggregate of the bit rates of the output video streams matches the desired aggregate channel bit rate. The desired aggregate bit rate, again, is obtained from a network monitor module, ensuring that the aggregate rate of multiple video streams does not exceed available bandwidth. Each coder/transcoder again uses some form of rate control to achieve the allocated bit rate for its stream.

In this case, the system may include multiple receivers (not shown in the diagram). Each receiver in this system has similar functionality as the receiver for the single-stream case.

As in the single-stream case, the bit rate of the multiple streams should be controlled by some form of bit allocation and rate control in order to satisfy such constraints. However, in the case of a multi-stream system, a more general and flexible framework is useful for dynamic bit rate adaptation. There are several reasons for this, as follows:
  (1) The system should deal with multiple AV streams that may have different characteristics, and should allocate the available bits as supported by the channel accordingly;
  (2) The system should deal with the network characteristics, which are partly unpredictable, and need special attention in the case of multiple receivers as described later;
  (3) The system should handle any differences between the receiving devices themselves, such as differences in screen sizes, supported frame rates, etc.; and
  (4) The different video sources may be regarded as different in importance due to their content. Also, since the different video streams are viewed by different people (users), possibly in different locations (e.g., different rooms in a home), the system may want to take the preferences of the different users into account.

The resulting heterogeneity of the environment may be taken into account during optimization of the system.

To this end, the multi-stream extender system may optionally receive further information as input to the transcoder manager (in addition to information about the transmission channel), as shown in FIG. 6. This includes, for example:
  Information about each receiving device;
  Information about each video source; and
  Information about the preferences of each user.

In the following subsections, first is listed the type of constraints that the bit rate of the multiple streams in this system are subject to. Then, the notion of stream prioritizing is described, which is used to incorporate certain heterogeneous characteristics of the network as discussed above. Then, various techniques are described to achieve multi-stream (or joint) dynamic rate adaptation.

Bit Rate Constraints for Multiple Streams

The bit rates of individual audio/video streams on the network are subject to various constraints.

Firstly, the aggregate rates of individual streams may be smaller than or equal to the overall channel capacity or network bandwidth from sender to receiver. This bandwidth may vary dynamically, due to increases or decreases in the number of streams, due to congestion in the network, due to interference, etc.

Further, the rate of each individual stream may be bound by both a minimum and a maximum. A maximum constraint may be imposed due to the following reasons.
  (1) A stream may have a maximum rate due to limitations of the channel or network used. For instance, if a wireless network is used, the maximum throughput to a single device depends on the distance between the access point and the client device. Note that this maximum may be time-varying. For instance, if the client device in a wireless network is portable and its distance to the access point is increasing (e.g. while being carried), the maximum throughput is expected to decrease.

(2) A stream may have a maximum rate due to limitations of the client device. The client device may have limited capabilities or resources, e.g., a limited buffer size or limited processing power, resulting in an upper bound on the rate of an incoming audio/video stream.

(3) A stream may have a minimum rate imposed by the system or by the user(s), in order to guarantee a minimum quality. If this minimum rate cannot be provided by the system, transmission to the device may not be performed. This helps achieve some minimum quality. A stream may also have a minimum rate imposed in order to prevent buffer underflow.

Stream Prioritizing or Weighting

The (trans)coder manager discussed above may employ several strategies. It may attempt to allocate an equal amount of available bits to each stream; however, in this case the quality of streams may vary strongly from one stream to the other, as well as in time. It may also attempt to allocate the available bits such that the quality of each stream is approximately equal; in this case, streams with highly active content will be allocated more bits than streams with less active content. Another approach is to allow users to assign different priorities to different streams, such that the quality of different streams is allowed to vary, based on the preferences of the user(s). This approach is generally equivalent to weighting the individual distortion of each stream when the (trans)coder manager minimizes the overall distortion.

The priority or weight of an audio/video stream may be obtained in a variety of manners, but is generally related to the preferences of the users of the client devices. Note that the weights (priorities) discussed here are different from the type of weights or coefficients seen often in literature that correspond to the encoding complexity of a macro block, video frame, group of frames, or video sequence (related to the amount of motion or texture variations in the video), which may be used to achieve a uniform quality among such parts of the video. Here, weights will purposely result in a non-uniform quality distribution across several audio/video streams, where one (or more) such audio/video stream is considered more important than others. Various cases, for example, may include the following, and combinations of the following.

Case A

Figure 15:
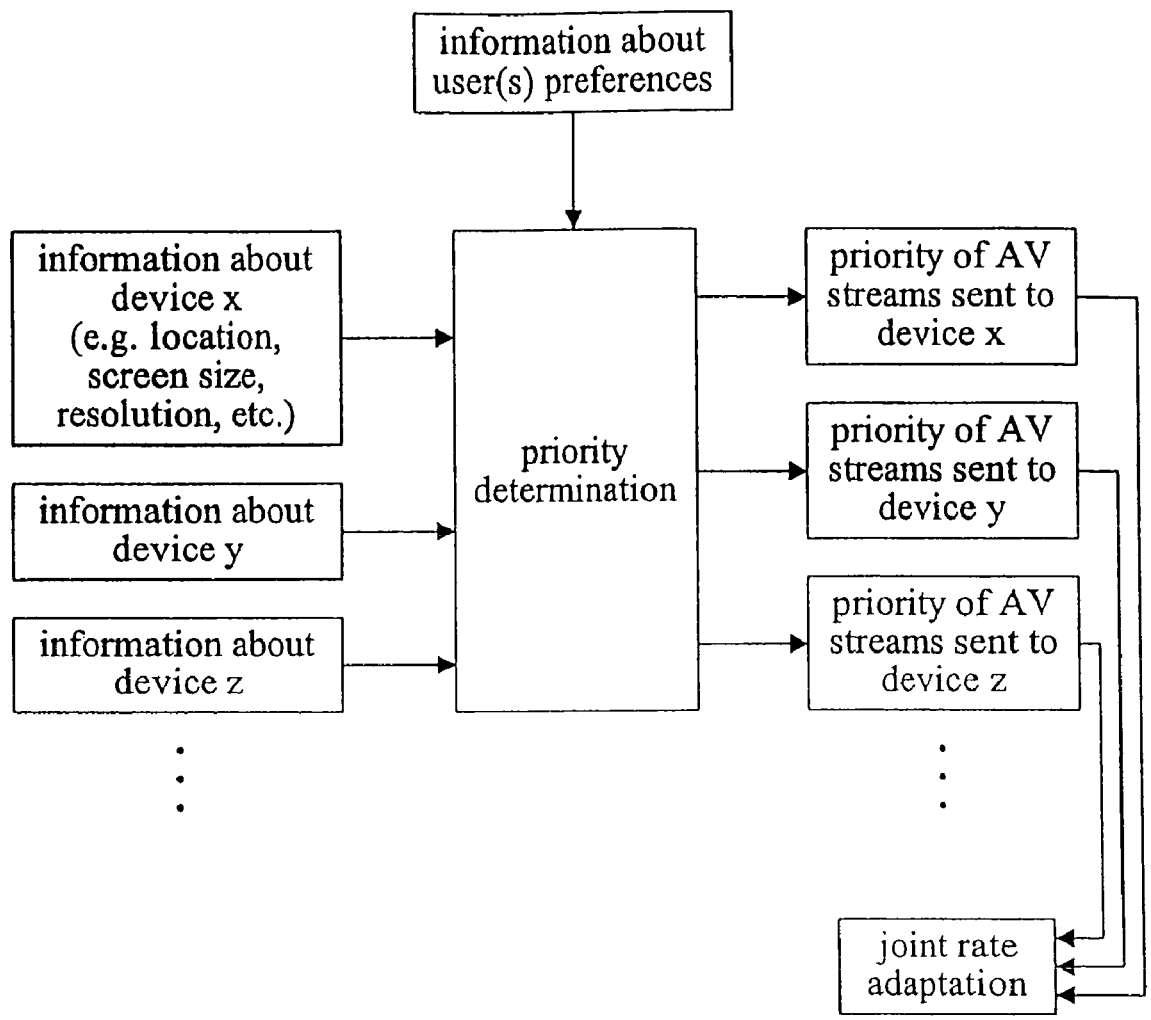
FIG. 15 illustrates user preferences and priority determination for streams.

The weight of a stream may be the result of a preference that is related to the client device (see FIG. 15). That is, in the case of conflicting streams requesting bandwidth from the channel, one device is assigned a priority such that the distortion of streams received by this device are deemed more severe as an equal amount of distortion in a stream received by another device. For instance, the user(s) may decide to assign priority to one TV receiver over another due to their locations. The user(s) may assign a higher weight to the TV in the living room (since it is likely to be used by multiple viewers) compared to a TV in the bedroom or den. In that case, the content received on the TV in the living room will suffer from less distortion due to transcoding than the content received on other TVs. As another instance, priorities may be assigned to different TV receivers due to their relative screen sizes, i.e., a larger reduction in rate (and higher distortion) may be acceptable if a TV set's screen size is sufficiently small. Other device resources may also be translated into weights or priorities.

Such weighting could by default be set to fixed values, or using a fixed pattern. Such weighting may require no input from the user, if desired.

Such weighting may be set once (during set up and installation). For instance, this setting could be entered by the user, once he/she decides which client devices are part of the network and where they are located. This set up procedure could be repeated periodically, when the user(s) connect new client devices to the network.

Such weighting may also be the result of interaction between the gateway and client device. For instance, the client device may announce and describe itself to the gateway as a certain type of device. This may result in the assignment by the gateway of a certain weighting or priority value to this device.

Case B

Figure 16:
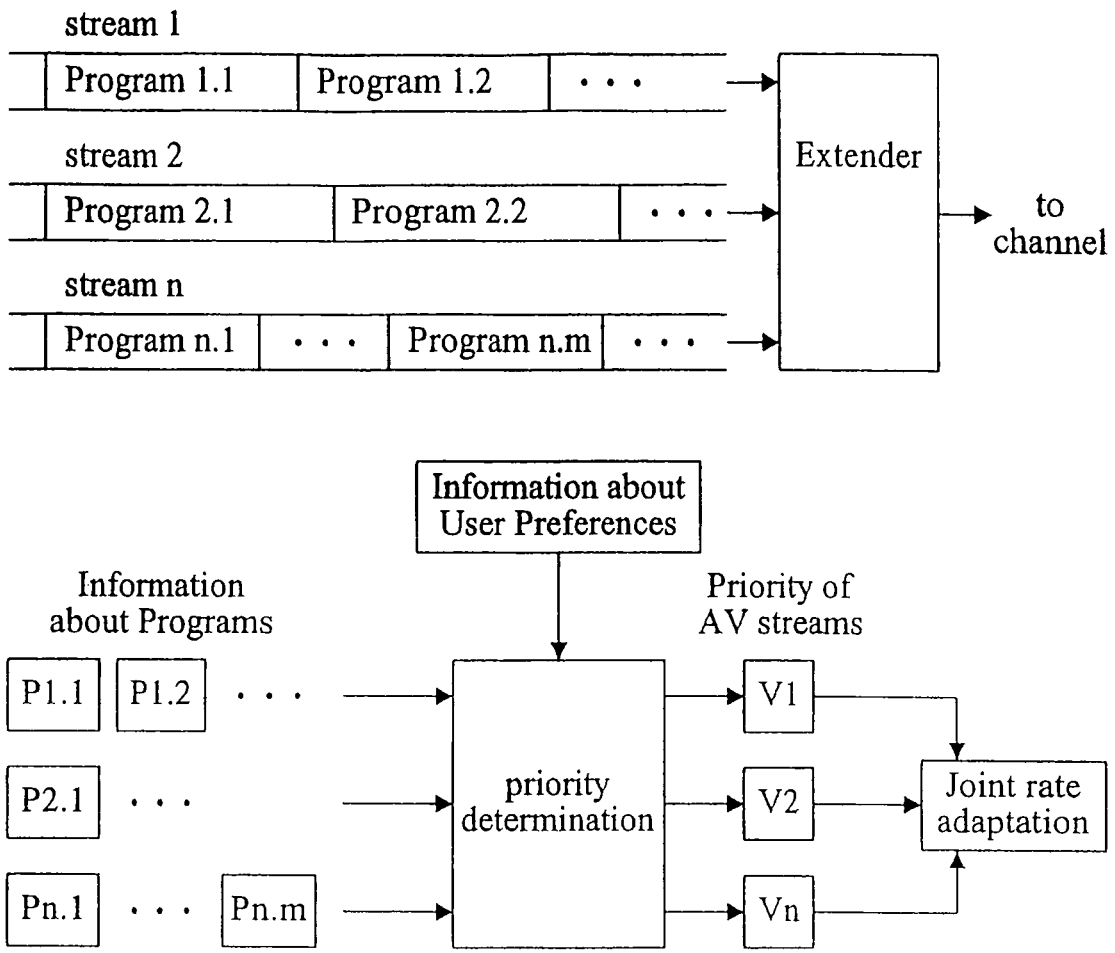
FIG. 16 illustrates the weight of a stream resulting from preferences at a particular point in time.

The weight of a stream may be result of a preference that is related to a content item (such as TV program) that is carried by a particular stream at a particular point in time (see FIG. 16). That is, for the duration that a certain type of content is transmitted over a stream, this stream is assigned a priority such that the distortion of this stream is deemed more severe as an equal amount of distortion in other streams with a different type of content, received by the same or other devices. For instance, the user(s) may decide to assign priority TV programs on the basis of its genre, or other content-related attributes. These attributes, e.g. genre information, about a program can be obtained from an electronic program guide. These content attributes may also be based on knowledge of the channel of the content (e.g. Movie Channel, Sports Channel, etc). The user(s) may for example assign a higher weight to movies, compared to other TV programs such as gameshows. In this case, when multiple streams contend for limited channel bandwidth, and one stream carries a movie to one TV receiver, while another stream simultaneously carries a gameshow to another TV, the first stream is assigned a priority such that it will be distorted less by transcoding than the second stream.

Such weighting could by default be set to fixed values, or using a fixed pattern. Such weighting may require no input from the user, if desired.

Such weighting may be set once (during set up and installation). For instance, this setting could be entered by the user, once he/she decides which type(s) of content are important to him/her. Then, during operation, the gateway may match the description of user preferences (one or more user preferences) to descriptions of the programs transmitted. The actual weight could be set as a result of this matching procedure. The procedure to set up user preferences could be repeated periodically. The user preference may be any type of preference, such as those of MPEG-7 or TV Anytime. The system may likewise include the user's presence (any user or a particular user) to select, at least in part, the target bit rate. The user may include direct input, such as a remote control. Also, the system may include priorities among the user preferences to select the target bit rate.

Such weighting may also be the result of the gateway tracking the actions of the user. For instance, the gateway may be able to track the type of content that the user(s) consume frequently. The gateway may be able to infer user preferences from the actions of the user(s). This may result in the assignment by the gateway of a certain weighting or priority value to certain types of content.

Case C

Figure 17:
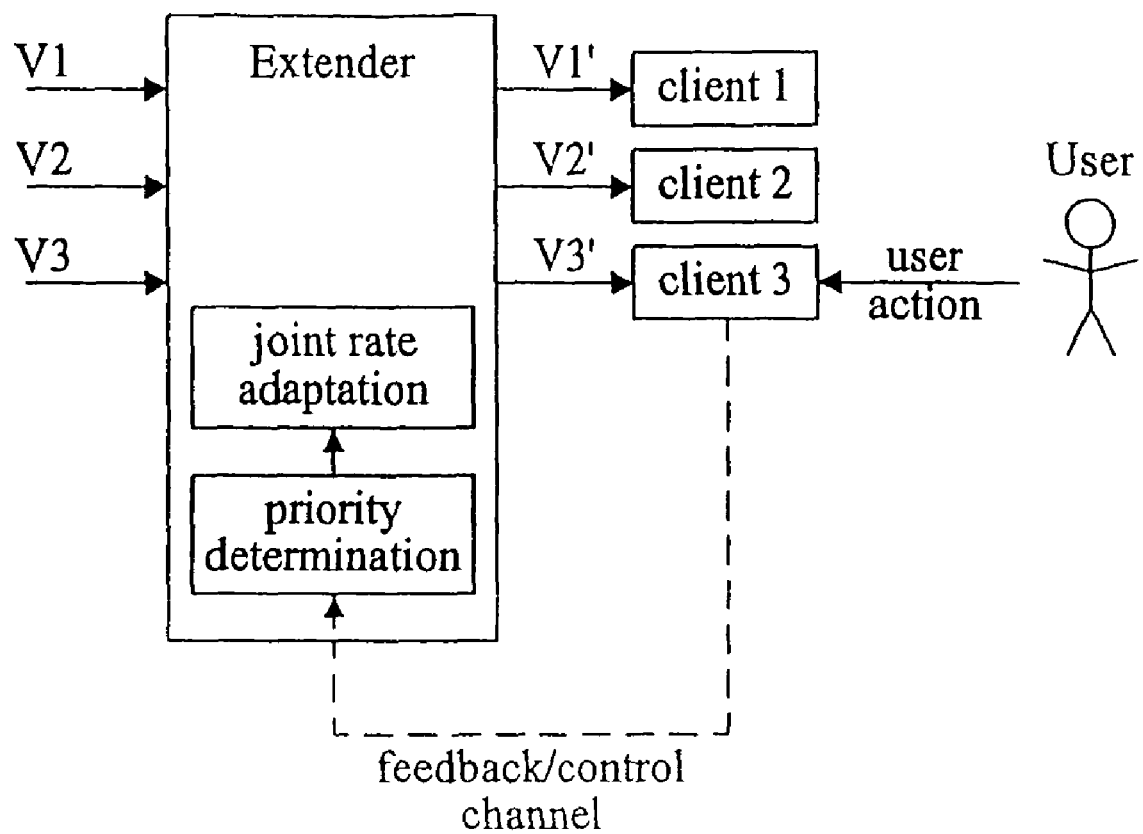
FIG. 17 illustrates the relative weight of streams set or changed at arbitrary times or on user demand.

The relative weight of streams may also be set or changed at arbitrary times or on user demand (see FIG. 17).

Such weighting may be bound to a particular person in the household. For instance, one person in a household may wish to receive the highest possible quality content, no matter what device he/she uses. In this case, the weighting can be changed according to which device that person is using at any particular moment.

Such weighting could be set or influenced at an arbitrary time, for instance, using a remote control device.

Such weighting could also be based on whether a user is recording content, as opposed to viewing. Weighting could be such that a stream is considered higher priority (hence should suffer less distortion) if that stream is being recorded (instead of viewed).

Case D

The relative weight of streams may also be set based on their modality. In particular, the audio and video streams of an audiovisual stream may be separated and treated differently during their transmission. For example, the audio part of an audiovisual stream may be assigned a higher priority than the video part. This case is motivated by the fact that when viewing a TV program, in many cases, loss of audio information is deemed more severe by users than loss of video information from the TV signal. This may be the case, for instance, when the viewer is watching a sports program, where a commentator provides crucial information. As another example, it may be that users do not wish to degrade the quality of audio streams containing hi-quality music. Also, the audio quality could vary among different speakers or be sent to different speakers.

Network Characteristics

The physical and data link layers of the aforementioned networks are designed to mitigate the adverse conditions of the channel medium. One of the characteristics of these networks specifically affects bit allocation among multiple streams as in a multi-stream extender system discussed here. In particular, in a network based on IEEE 802.11, a gateway system may be communicating at different data link rates with different client devices. WLANs based on IEEE 802.11 can operate at several data link rates, and may switch or select data link rates adaptively to reduce the effects of interference or distance between the access point and the client device. Greater distances and higher interference cause the stations in the network to switch to lower raw data link rates. This may be referred to as multi-rate support. The fact that the gateway may be communicating with different client devices at different data rates, in a single wireless channel, affects the model of the channel as used in bit allocation for joint coding of multiple streams.

Prior work in rate control and bit allocation uses a conventional channel model, where there is a single bandwidth that can simply be divided among AV streams in direct proportion to the requested rates for individual AV streams. The present inventors determined that this is not the case in LANs such as 802.11 WLANs due to their multi-rate capability. Such wireless system may be characterized in that the sum of the rate of each link is not necessarily the same as the total bandwidth available from the system, for allocation among the different links. In this manner, a 10 Mbps video signal, and a 20 Mbps video signal may not be capable of being transmitted by a system having a maximum bandwidth of 30 Mbps. The bandwidth used by a particular wireless link in an 802.11 wireless system is temporal in nature and is related to the maximum bandwidth of that particular wireless link. For example, if link 1 has a capacity of 36 Mbps and the data is transmitted at a rate of 18 Mbps the usage of that link is 50%. This results in using 50% of the systems overall bandwidth. For example, if link 2 has a capacity of 24 Mbps and the data is transmitted at a rate of 24 Mbps the usage of link 2 is 100%. Using link 2 results in using 100% of the system's overall bandwidth leaving no bandwidth for other links, thus only one stream can be transmitted.

Bit Allocation in Joint Coding of Multiple Streams

A more optimal approach to rate adaptation of multiple streams is to apply joint bit allocation/rate control. This approach applies to the case where the input streams to the multi-stream extender system are analog, as well as the case where the input streams are already in compressed digital form.

Let the following parameters be defined:

$N_L$ denote the number of streams $P_n$ denote a weight or priority assigned to stream n, with $P_n \geq 0$ $a_n$ denote a minimum output rate for stream n, with $a_n \geq 0$ $b_n$ denote a maximum output rate for stream n, with $b_n \geq a_n$ $D_n(r)$ denote the distortion of output stream n as a function of its output rate r (i.e. the distortion of the output with respect to the input of the encoder or transcoder)

$R_C$ denote the available bandwidth of the channel or maximum network maximum throughput $R_n$ denotes the bit rate of input stream n $R'_n$ denotes the bit rate of output stream n Note that $R_n$, $R'_n$ and $R_C$ may be time-varying in general; hence, these are functions of time t.

The problem of the multi-stream extender can be formulated generically as follows:

The goal is to find the set of output rates $R'_n$, n=1, ..., $N_L$, that maximizes the overall quality of all output streams or, equivalently, minimizes an overall distortion criterion D, while the aggregate rate of all streams is within the capacity of the channel.

One form of the overall distortion criterion D is a weighted average of the distortion of the individual streams:

$$D = \sum_{n=1}^{N_L} p_n D_n(R'_n) \qquad (4)$$

Another form is the maximum of the weighted distortion of individual streams:

$$D = \max_n \{p_n D_n(R'_n)\} \qquad (5)$$

Other suitable criteria to describe the quality of a media stream may be used, such as the Peak-Signal-to-Noise-Ratio (PSNR). Likewise, other suitable criteria may be used to describe the overall quality of all streams, such as the average of the PSNR values of individual streams, or the minimum of the PSNR values of individual streams, or other suitable forms.

In this section, a conventional channel model is used, similar to cable tv, where an equal amount of bit rate offered to a stream corresponds to an equal amount of utilization of the channel, while it may be extended to the wireless type utilizations described above. Therefore, the goal is to minimize a criterion such as (4) or (5), subject to the following constraints:

$$\sum_{n=1}^{N_L} R'_n \le R_C \quad (6)$$

and, for all n, $$0 \le a_n \le R'_n \le b_n \le R_n \quad (7)$$

at any given time t.

In the case of transcoding, note that the distortion of each output stream $V'_n$ is measured with respect to the input stream $V_n$, which may already have significant distortion with respect to the original data due to the original compression. However, this distortion with respect to the original data is unknown. Therefore, the final distortion of the output stream with respect to the original (not input) stream is also unknown, but bounded below by the distortion already present in the corresponding input stream $V_n$. It is noted that in the case of transcoding, a trivial solution to this problem is found when the combined input rates do not exceed the available channel bandwidth, i.e, when:

$$\sum_{n=1}^{N_L} R_n \le R_C \quad (8)$$

In this case, $R'_n = R_n$ and $D_n(R'_n) = D_n(R_n)$ for all n, and no transcoding needs to be applied.

It is noted that no solution to the problem exists, when:

$$R_C \le \sum_{n=1}^{N_L} a_n \quad (9)$$

This may happen when the available channel bandwidth/network maximum throughput would drop (dramatically) due to congestion, interference, or other problems. In this situation, one of the constraints (7) would have to be relaxed, or the system would have to deny access to a stream requesting bandwidth.

It is noted that an optimal solution that minimizes the distortion criterion as in (5) is one where the (weighted) distortion values of individual streams are all equal.

It is noted that (6) embodies a constraint imposed by the channel under a conventional channel model. This constraint is determined by the characteristics of the specific network. A different type of constraint will be used as applied to LANs with multi-rate support.

A few existing optimization algorithms exist that can be used to find a solution to the above minimization problem, such as Lagrangian optimization and dynamic programming. Application of such optimization algorithms to the above problem may require search over a large solution space, as well as multiple iterations of compressing the video data. This may be prohibitively computationally expensive. A practical approach to the problem of bit allocation for joint coding of multiple video programs extends the approach used in the so-called MPEG-2 Test Model 5 (TM5).

An existing approach is based on the notions of super GOP and super frame. A normal MPEG-2 GOP (Group-of-Pictures) of a single stream contains a number of I, P and B-type frames. A super GOP is formed over multiple MPEG-2 streams and consists of $N_{GOP}$ super frames, where a super frame is a set of frames containing one frame from each stream and all frames in a super frame coincide in time. A super GOP always contains an integer number of stream-level MPEG-2 GOPs, even when the GOPs of individual streams are not the same length and not aligned. The bit allocation method includes a target number of bits assigned to a super GOP. This target number $T_s$ is the same for every super GOP and is derived from the channel bit rate, which is assumed fixed. Given $T_s$, the bit allocation is done for each super frame within a super GOP. The resulting target number of bits for a super frame $T_t$ depends on the number of I, P, and B frames in the given streams. Then, given $T_t$, the bit allocation is done for each frame within a super frame. The resulting target number of bits for a frame within a super frame at time t is denoted by $T_{t,n}$.

The existing technique is based on the use of a complexity measure C for a video frame, that represents the "complexity" of encoding that frame. Subsequently, streams are allocated bits proportional to the estimated complexity of the frames in each stream. That is, streams with frames that are more "complex" to code, receive more bits during bit allocation compared to streams that are less "complex" to code, resulting in an equal amount of distortion in each stream. The relationship between the rate and the distortion of a stream resulting from encoding or transcoding can be expressed in various manners, using various types of rate-distortion models known to those skilled in the art. While the following uses a simple rate-distortion model involving a complexity measure C, other rate-distortion models may likewise be utilized.

The complexity measure C for a video frame is defined as the product of the quantization value used to compress the DCT coefficients of that video frame, and the resulting number of bits generated to code that video frame (using that quantization value). Therefore, the target number of bits $T_{t,n}$ for a particular frame within a super frame can be computed on the basis of an estimate of the complexity of that frame, $C_{t,n}$, and the quantizer used for that frame, $Q_{t,n}$:

$$T_{t,n} = \frac{C_{t,n}}{Q_{t,n}} \quad (10)$$

The value of $C_{t,n}$ is assumed constant within a stream for all future frames of the same type (I, P or B) to be encoded. Therefore, $C_{t,n}$ equals either $C_{I,n}$, or $C_{P,n}$, or $C_{B,n}$ depending on the frame type.

The sum of the number of bits allocated to all frames within a superframe should be equal to the number of bits allocated to that superframe, i.e., $$T_t = \sum_{n=1}^{N_L} T_{t,n} \quad (11)$$

The technique uses an equal quantizer value Q for all frames in all streams, in order to achieve uniform picture quality. However, taking into account the different picture types (I, P and B), the quantizer values for each frame are related to the fixed Q by a constant weighting factor:

$$Q_{t,n} = K_{t,n} Q \qquad (12)$$

where $K_{t,n}$ is simply either $K_I$, $K_P$ or $K_B$, depending only on the frame type.

Combining (10), (11) and (12), results in the following bit allocation equation for frames within a super frame:

$$T_{t,n} = \frac{\frac{1}{K_{t,n}} C_{t,n}}{\sum_{n=1}^{N_L} \frac{1}{K_{t,n}} C_{t,n}} T_t \qquad (13)$$

This equation expresses that frames from different streams are allocated bits proportional to their estimated complexities.

To accommodate prioritization of streams as discussed above, the existing techniques may be extended as follows:

One may generalize (12) by including stream priorities $p_n$ as follows:

$$Q_{t,n} = \frac{K_{t,n} Q}{p_n} \qquad (14)$$

where $p_n$ are chosen such that:

$$\sum_{n=1}^{N_L} \frac{1}{p_n} = N_L \qquad (15)$$

For example, if all streams have the same priority, $p_n=1$ for all n, such that (15) holds. Higher priority streams are assigned values $p_n$ greater than 1, while lower priority streams are assigned values of $p_n$ smaller than 1.

Combining (10), (11) and (14), one obtains:

$$T_{t,n} = \frac{\frac{p_n}{K_{t,n}} C_{t,n}}{\sum_{n=1}^{N_L} \frac{p_n}{K_{t,n}} C_{t,n}} T_t \qquad (16)$$

which can be used for bit allocation instead of (13). From (16), it can be seen that the priorities can be used to allocate more bits to frames from high priority streams and less bits to frames from low priority streams. This strategy implicitly attempts to minimize the distortion criterion (5). Note that this extension applies to both encoding and transcoding.

In the approach described above, intended for encoding, encoding complexities C of frames are estimated from past encoded frames. These estimates are updated every frame and used to allocate bits to upcoming frames. That is, the estimate of complexity for the current frame t and future frames is based on the measurement of the values of the quantizer used in a previous frame as well as the actual amount of bits spent in that previous frame (in the same stream n). Therefore, the estimate is:

$$C'_{t,n} = S'_{t-\tau,n} Q'_{t-\tau,n} \qquad (17)$$

where S indicates the number of bits actually spent on a video frame, t indicates the current frame and t−τ indicates the nearest previous frame of the same type (I, P or B), and the prime indicates that the estimate is computed from the output of the encoder. Note again that in reality only 3 different values for these estimates are kept for a single stream, one for each picture type.

While this approach can also be used in transcoding, the present inventor determined that it is possible to improve these estimates. The reason is that in the case of transcoding, one has information about the complexity of the current frame, because one has this frame available in encoded form at the input of the transcoder. However, it has been observed that complexity of the output frame is not the same as the complexity of the input frame of the transcoder because the transcoder changes the rate of the bitstream. It has been observed that the ratio of the output complexity over the input complexity remains relatively constant over time. Therefore, an estimate of this ratio based on both input and output complexity estimates of a previous frame can be used to scale the given input complexity value of the current frame, to arrive at a better estimate of the output complexity of the current frame:

$$C'_{t,n} = \frac{S'_{t-\tau,n} Q'_{t-\tau,n}}{S_{t-\tau,n} Q_{t-\tau,n}} S_{t,n} Q_{t,n} \qquad (18)$$

where S and Q without prime are computed from the input bitstream.

The approach described above for multi-stream encoding all assumed a constant target bit rate, i.e., a constant bit rate channel. This assumption actually does not hold in certain networks, especially for wireless channels, as previously described. Accordingly, a modified approach that takes into account the time varying nature of the channel is useful.

An extension can be applied if one can assume that the target bit rate varies only slowly relative to the duration of a (super) GOP. This may be the case when the actual channel conditions for some reason change only slowly or relatively infrequently. Alternatively, one may only be able to measure the changing channel conditions with coarse time granularity. In either case, the target bit rate can not be made to vary more quickly than a certain value dictated by the physical limitations. Therefore, the target bit rate can be modeled as a piecewise constant signal, where changes are allowed only on the boundaries of a (super) GOP.

This approach can be combined with the aforementioned approach by providing a new value of $T_s$ to the bit allocation algorithm (possibly with other extensions as discussed above) at the start of every (super) GOP. In other words, $T_s$ is allowed to vary on a (super) GOP-by-GOP basis.

Another extension is to use the concept of virtual GOPs for the case where the target bit rates varies quickly relative to the duration of a (super) GOP, i.e., the case where adjustments to the target bit rate and bit allocation must be made on a (super) frame-by-frame basis. The use of virtual GOPs was explained for the single-stream dynamic rate adaptation above. In the multi-stream case, the concept of virtual GOPs extends to the concept of virtual super GOPs.

Another bit allocation approach in joint coding of multiple streams in a LAN environment, such as those based on IEEE 802.11, is suitable for those networks that have multi-rate support. In this case an access point in the gateway may be communicating at different data link rates with different client devices. For this, and other reasons, the maximum data throughput from the gateway to one device may be different from the maximum throughput from the gateway to another device, while transmission to each device contributes to the overall utilization of a single, shared, channel.

As before, there are $N_L$ devices on a network sharing available channel capacity. It may be assumed there are $N_L$ streams being transmitted to these $N_L$ devices (1 stream per device). The system employs a multi-stream manager (i.e., multi-stream transcoder or encoder manager) that is responsible for ensuring the best possibly quality of video transmitted to these devices.

It may be assumed that a mechanism is available to measure the bandwidth or maximum data throughput $H_n$ to each device n=1, 2, ..., $N_L$. In general, this throughput varies per device and varies with time due to variations in the network: $H_n(t)$. It can be assumed that the data maximum throughput can be measured at a sufficiently fine granularity in time. The maximum data throughput $H_n$ is measured in bits per second. Note that the maximum throughput $H_n$ is actually an average over a certain time interval, e.g., over the duration of a video frame or group of frames.

In the case of 802.11 networks, for instance, the bandwidth or maximum data throughput for device n may be estimated from knowledge about the raw data rate used for communication between the access point and device n, the packet length (in bits), and measurements of the packet error rate. Other methods to measure the maximum throughput may also be used.

One particular model of the (shared) channel is such that the gateway communicates with each client device n for a fraction $f_n$ of the time. For example, during a fraction $f_1$ of the time, the home gateway is transmitting video stream 1 to device 1, and during a fraction $f_2$ of the time, the gateway is transmitting video stream 2 to device 2, and so on. Therefore, an effective throughput is obtained from the gateway to client n that is equal to:

$$f_n H_n.$$

The following channel constraint holds over any time interval:

$$\sum_{n=1}^{N_L} f_n \leq 1.0 \quad (19)$$

i.e., the sum of channel utilization fractions must be smaller than (or equal to) 1.0. If these fractions add up to 1.0, the channel is utilized to its full capacity.

In the case of transcoding, let $R_n$ denote the rate of the original (source) video stream n. To be able to transmit video streams to all devices concurrently, there may exist a set of $f_n$, n=1, 2, ..., $N_L$, such that the following holds for all n, under the constraint of (19):

$$f_n H_n \geq R_n \quad (20)$$

If such a set of $f_n$ does not exist, then the rate of one or more video sources be reduced. Let $R'_n$ denote the rate of the transrated (output) video stream n. To retain the highest possible video quality, the minimum amount of rate reduction should be applied, in order for a set of $f_n$ to exist, such that the following holds for all n, under the constraint of (19):

$$f_n H_n = R'_n \quad (21)$$

In the case of joint encoding (instead of joint transcoding), the goal is simply to find a solution to (21), under the constraint of (19), where $R'_n$ denotes the rate of the encoder output stream n.

In general, the problem of determining a set of fractions $f_n$ is an under-constrained problem. The above relationships do not provide a unique solution. Naturally, the goal is to find a solution to this problem that maximizes some measure of the overall quality of all video streams combined.

An embodiment is based on a joint coding principle, where the bit rates of different streams are allowed to vary based on their relative coding complexity, in order to achieve a generally uniform picture quality. This approach maximizes the minimum quality of any video stream that are jointly coded, i.e., this approach attempts to minimize distortion criterion (5).

One may consider $N_L$ video streams, where each stream is MPEG-2 encoded with GOPs of equal size $N_G$. One may also consider a set of $N_L$ GOPs, one from each stream, concurrent in time. This set, also called super GOP, contains $N_L \times N_G$ video frames. The first step in some bit allocation techniques is to assign a target number of bits to each GOP in a super GOP, where each GOP belongs to a different stream n. The allocation is performed in proportion to the relative complexity of each GOP in a super GOP. The second step in the bit allocation procedure is to assign a target number of bits to each frame of the GOP of each video stream.

Let $T_n$ denote the target number of bits assigned to the GOP of stream n (within a super GOP). Let $S_{n,t}$ denote the number of bits generated by the encoder/transcoder for frame t of video stream n. The total number of bits generated for stream n over the course of a GOP should be equal (or close) to $T_n$, i.e., $$T_n = \sum_{t=1}^{N_G} S_{n,t} \quad (22)$$

As in the MPEG-2 TM5 a coding complexity measure for a frame is used that is the product of the quantizer value used and the number of bits generated for that frame, i.e., $$C_{n,t} = Q_{n,t} S_{n,t} \quad (23)$$

Therefore, (22) can be rewritten as:

$$T_n = \sum_{t=1}^{N_G} \frac{C_{n,t}}{Q_{n,t}} \quad (24)$$

As in equation (14) a generally constant quality approach may be used. All quantizer values may be equal, up to a constant factor $K_{n,t}$ that accounts for the differences in picture types (I, P, and B) and a stream priority $p_n$. Therefore, (24) can be rewritten as:

$$T_n = \frac{p_n}{Q} \sum_{t=1}^{N_G} \frac{C_{n,t}}{K_{n,t}} \quad (25)$$

To achieve (21), the following may hold:

$$T_n = f_n H_n \frac{N_G}{\text{frame\_rate}} \quad (26)$$

Combining equations (25) and (26), together with (19), provides the following solution for the set of n unknowns, $f_n$ (factoring out Q).

$$f_n = \frac{\frac{p_n}{H_n} \sum_{t=1}^{N_G} \frac{C_{n,t}}{K_{n,t}}}{\sum_{n=1}^{N_L} \frac{p_n}{H_n} \sum_{t=1}^{N_G} \frac{C_{n,t}}{K_{n,t}}} \quad (27)$$

It is assumed that the channel is utilized to its maximum capacity, i.e., the sum of channel utilization fractions adds up to exactly 1.0. Note that the approach is still valid if the utilization fractions need to add up to a lower value than 1.0. Equation (27) would simply be modified with an additional factor to allow for this. For instance, there may be non-AV streams active in the network that consume some of the channel capacity. In the case of non-AV streams, some capacity has to be set aside for such streams, and the optimization of the rates of AV streams should take this into account, by lowering the mentioned sum lower than 1.0.

Given $f_n$, the actual target rate for each GOP can be computed with (26).

Figure 12:
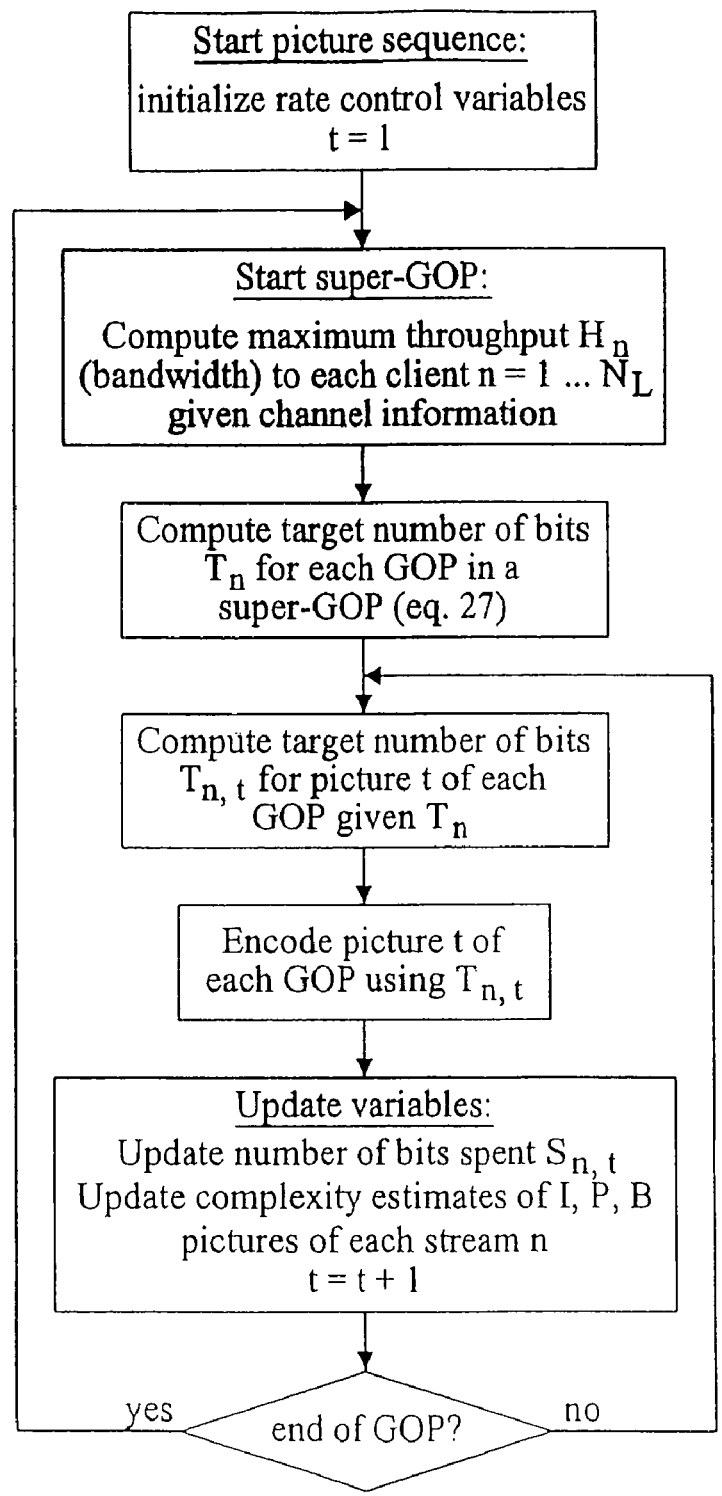
FIG. 12 illustrates slowly varying channel conditions of super GOPS by GOP bit allocation.

As mentioned above, the second step in the bit allocation procedure is to assign a target number of bits to each frame of the GOP of each video stream. This can be achieved using existing bit allocation methods, such as the one provided in TM5. Subsequent coding or transcoding can be performed with any standard method, in this case any encoder/transcoder compliant to MPEG-2 (see FIG. 12).

Although the above method has been derived specifically for the wireless LAN case, it should be noted that the above model and equations hold for any other type of LAN or network where a central gateway, server, or access point may communicate with multiple client devices at different maximum rates. While in the above we have used a simple rate-distortion model involving coding complexity measures C other rate-distortion models may likewise be utilized to determine an optimal set of channel fractions f.

Figure 13:
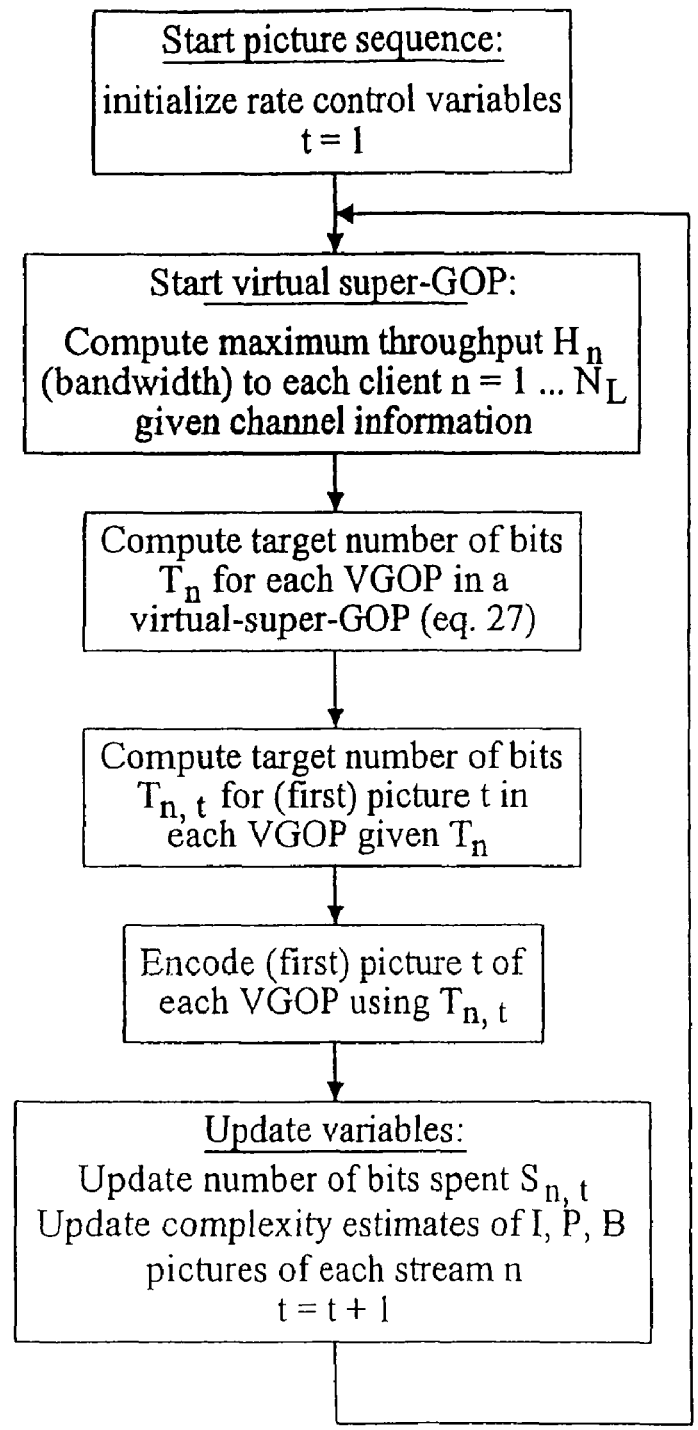
FIG. 13 illustrates dynamic channel conditions of virtual super GOP by virtual super GOP bit allocation.

In the case of dynamic rate adaptation, the maximum throughput rates $H_n$ vary in time. In this case, the above method can be combined with the notion of virtual GOPs, or virtual superGOPs, which consist of virtual GOPs of multiple AV streams, and overlap in time (see FIG. 13). Equation (27) would be executed at every frame time, to assign a target number of bits to a virtual GOP of a particular stream n. Subsequently, a target number of bits for each frame within each virtual GOP must be assigned, using, for instance, equations (3).

Figure 14:
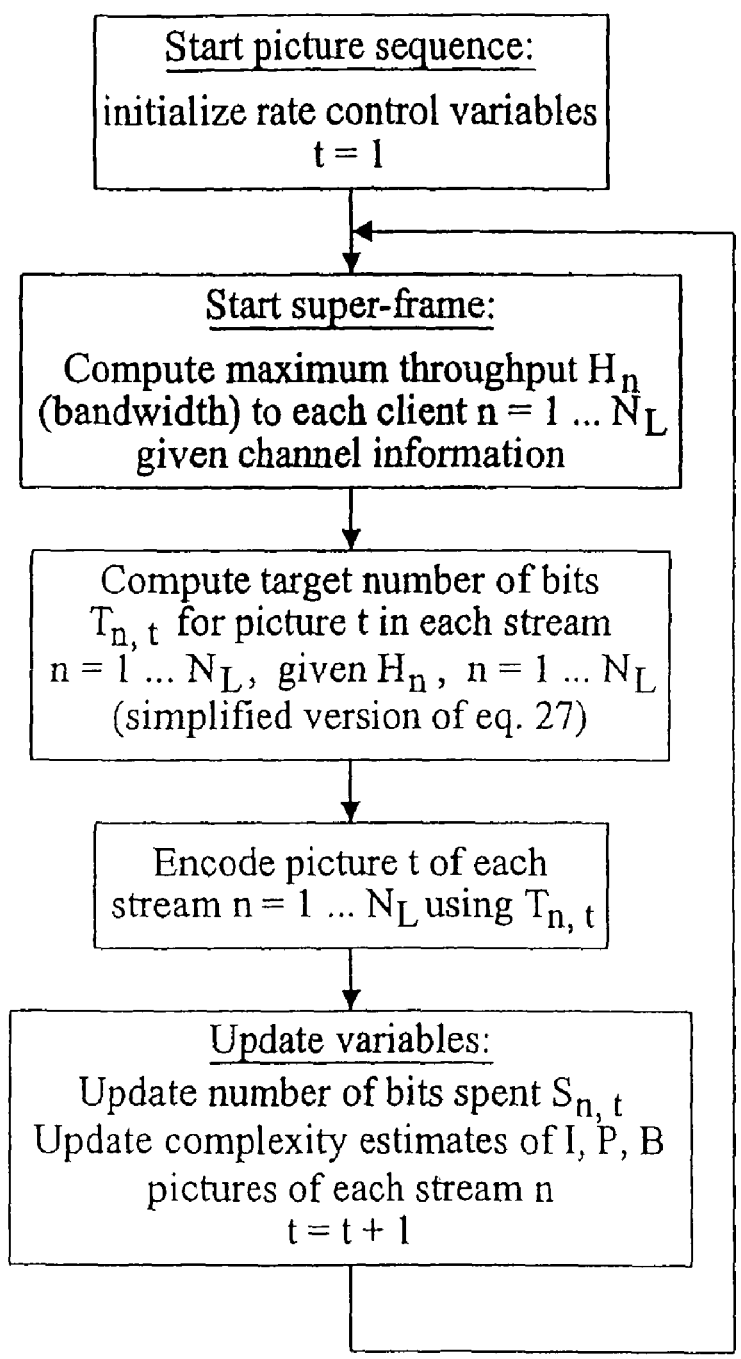
FIG. 14 illustrates dynamic channel conditions of super frame by super frame bit allocation.

Note further, that the above method can be applied in the case where GOPs are not used, i.e., the above method can be applied on a frame-by-frame basis, instead of on a GOP-by-GOP basis (see FIG. 14). For instance, there may be cases where only P-type pictures are considered, and rate control is applied on a frame-by-frame basis. In this case, there is a need to allocate bits to individual frames from a set of $N_L$ co-occurring frames from different video streams. The above method can still be used to assign a target number of bits to each frame, in accordance to the relative coding complexity of each frame within the set of frames from all streams.

Figure 7:
FIG. 7 illustrates an analog source single stream.

One embodiment uses a single-stream system, as illustrated in FIG. 7. This single-stream system has a single analog AV source. The analog AV source is input to a processing module that contains an AV encoder that produces a digitally compressed bit stream, e.g., an MPEG-2 or MPEG-4 bit stream. The bit rate of this bit stream is dynamically adapted to the conditions of the channel. This AV bit stream is transmitted over the channel. The connection between transmitter and receiver is strictly point-to-point. The receiver contains an AV decoder that decodes the digitally compressed bit stream.

Figure 8:
FIG. 8 illustrates a digital source single stream.

Another embodiment is a single-stream system, as illustrated in FIG. 8. This single-stream system has a single digital AV source, e.g. an MPEG-2 or MPEG-4 bit stream. The digital source is input to a processing module that contains an transcoder/transrater that outputs a second digital bit stream. The bit rate of this bit stream is dynamically adapted to the conditions of the channel. This AV bit stream is transmitted over the channel. The connection between transmitter and receiver is strictly point-to-point. The receiver contains an AV decoder that decodes the digitally compressed bit stream.

Figure 9:
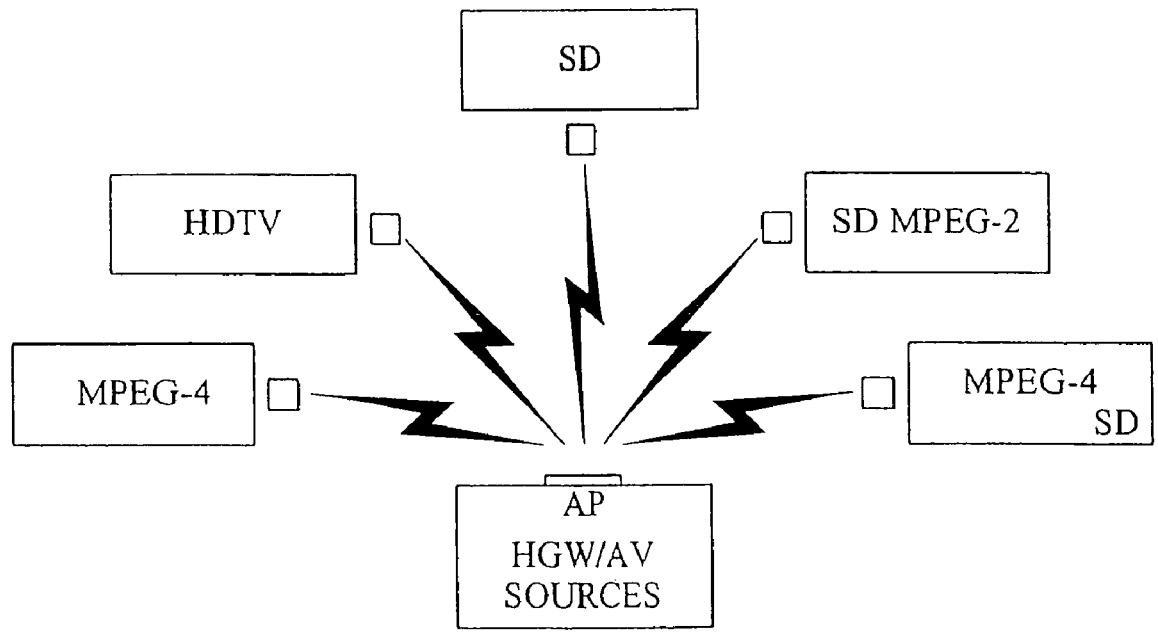
FIG. 9 illustrates multiple streams.

Another embodiment is a multi-stream system, as illustrated in FIG. 9. This multi-stream system has multiple AV sources, where some sources may be in analog form, and other sources may be in digital form (e.g., MPEG-2 or MPEG-4 bit streams). These AV sources are input to a processing module that contains zero or more encoders (analog inputs) as well as zero or more transcoders (digital inputs). Each encoder and/or transcoder produces a corresponding output bitstream. The bit rate of these bit streams are dynamically adapted to the conditions of the channel, so as to optimize the overall quality of all streams. The system may also adapt these streams based on information about the capabilities of receiver devices. The system may also adapt streams based on information about the preferences of each user. All encoded/transcoded bit streams are sent to a network access point, which transmits each bit stream to the corresponding receiver. Each receiver contains an AV decoder that decodes the digitally compressed bit stream.

Channel Bandwidth Estimation

The implementation of a system may estimate the bandwidth in some manner. Existing bandwidth estimation models have been primarily based on the estimation of the network capacity over a distributed network of interconnected nodes, such as the Internet. Typically there are many interconnected nodes, each of which may have a different bandwidth capacity. Data packets transmitted through a set of relatively fast nodes may be queued for transmission through a relatively slow node. To attempt to estimate the bottleneck bandwidth over a communication network a series of packets may be transmitted from the server through a bottleneck link to the client. By calculating the temporal spacing between the received packets, the client may estimate the bandwidth of the bottleneck node. Accordingly, the temporal spacing of packets occurs as a result of a relatively slow network connection within the many network connections through which the data packets are transmitted. This temporal spacing does not measure a rate of change of the network bandwidth in terms of a relatively short time frame, such as less than 1 second, but rather is a measure whatever link is the network bottleneck when measured on a periodic basis, such as every few minutes. Moreover, the physical bottleneck node has a tendency to change over time as the traffic across the distributed network changes, such as the Internet.

Other techniques for estimating the bandwidth of distributed networks involves generating significant amounts of test data specifically for the purpose of estimating the bandwidth of the network. Unfortunately, such test data presents a significant overhead in that it significantly lowers the bandwidth available for other data during the test periods. In many cases the test data is analyzed in an off-line manner, where the estimates are calculated after all the test traffic was sent and received. While the use of such test data may be useful for non-time sensitive network applications it tends to be unsuitable in an environment where temporary interruptions in network bandwidth are undesirable, and where information about link bandwidth is needed substantially continuously and in real time.

It would also be noted that the streaming of audio and video over the Internet is characterized by relatively low bit rates (in the 64 to 512 Kbps range), relatively high packet losses (loss rates up to 10% are typically considered acceptable), and relatively large packet jitter (variations in the arrival time of packets). With such bit rates, a typical measurement of the bandwidth consists of measuring the amount of the packet loss and/or packet jitter at the receiver, and subsequently sending the measured data back to the sender. This technique is premised on a significant percentage of packet loss being acceptable, and it attempts to manage the amount of packet loss, as opposed to attempting to minimize or otherwise eliminate the packet loss. Moreover, such techniques are not necessarily directly applicable to higher bit rate applications, such as streaming high quality video at 6 Mbps for standard definition video or 20 Mbps for high definition video.

The implementation of a system may be done in such a manner that the system is free from additional probing "traffic" from the transmitter to the receiver. In this manner, no additional burden is placed on the network bandwidth by the transmitter. A limited amount of network traffic from the receiver to the transmitter may contain feedback that may be used as a mechanism to monitor the network traffic. In the typical wireless implementation there is transmission, feedback, and retransmission of data at the MAC layer of the protocol. While the network monitoring for bandwidth utilization may be performed at the MAC layer, one implementation of the system described herein preferably does the network monitoring at the APPLICATION layer. By using the application layer the implementation is less dependent on the particular network implementation and may be used in a broader range of networks. By way of background, many wireless protocol systems include a physical layer, a MAC layer, a transport/network layer, and an application layer.

When considering an optimal solution one should consider (1) what parameters to measure, (2) whether the parameters should be measured at the transmitter or the receiver, and (3) whether to use a model-based approach (have a model of how the system behaves) versus a probe-based approach (try sending more and more data and see when the system breaks down, then try sending less data and return to increasing data until the system breaks down). In a model-based approach a more optimal utilization of the available bandwidth is likely possible because more accurate adjustments of the transmitted streams can be done.

The parameters may be measured at the receiver and then sent back over the channel to the transmitter. While measuring the parameters at the receiver may be implemented without impacting the system excessively, it does increase channel usage and involves a delay between the measurement at the receiver and the arrival of information at the transmitter.

MAC Layer

Figure 18:
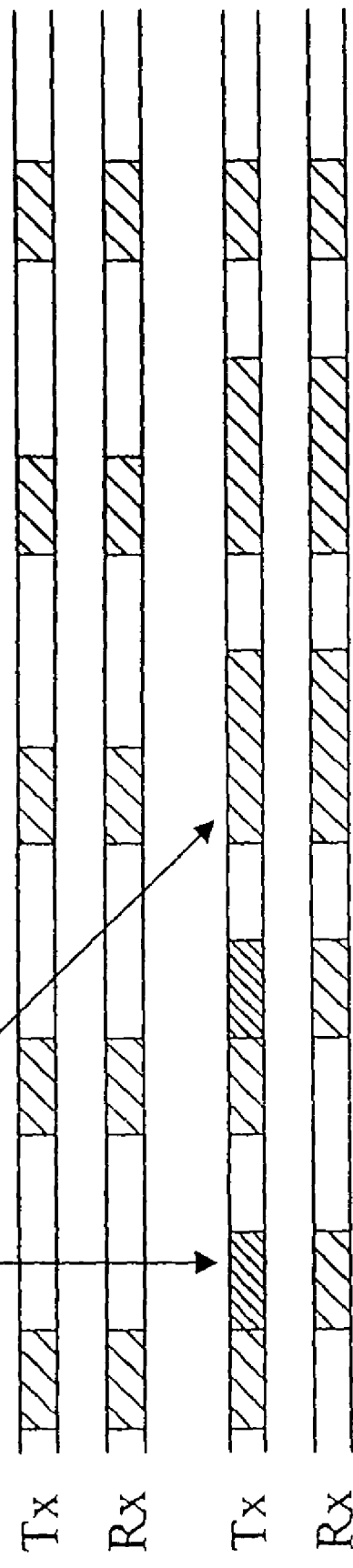
FIG. 18 illustrates an MAC layer model.

Alternatively, the parameters may be measured at the transmitter. The MAC layer of the transmitter has knowledge of what has been sent and when. The transmitter MAC also has knowledge of what has been received and when it was received through the acknowledgments. For example, the system may use the data link rate and/or packet error rate (number of retries) from the MAC layer. The data link rate and/or packet error rate may be obtained directly from the MAC layer, the 802.11 management information base parameters, or otherwise obtained in some manner. For example, FIG. 18 illustrates the re-transmission of lost packets and the fall-back to lower data link rates between the transmitter and the receiver for a wireless transmission (or communication) system.

In a wireless transmission system the packets carry P payload bits. The time T it takes to transmit a packet with P bits may be computed, given the data link rate, number of retries, and a prior knowledge of MAC and PHY overhead (e.g., duration of contention window length of header, time it takes to send acknowledgment, etc.). Accordingly, the maximum throughput may be calculated as P/T (bits/second).

Application Layer

As illustrated in FIG. 19, the packets are submitted to the transmitter, which may require retransmission in some cases. The receiver receives the packets from the transmitter, and at some point thereafter indicates that the packet has been received to the application layer. The receipt of packets may be used to indicate the rate at which they are properly received, or otherwise the trend increasing or decreasing. This information may be used to determine the available bandwidth or maximum throughput. FIG. 20 illustrates an approach based on forming bursts of packets at the transmitter and reading such bursts periodically into the channel as fast a possible and measure the maximum throughput of the system. By repeating the process on a periodic basis the maximum throughput of a particular link may be estimated, while the effective throughput of the data may be lower than the maximum.

Figure 21:
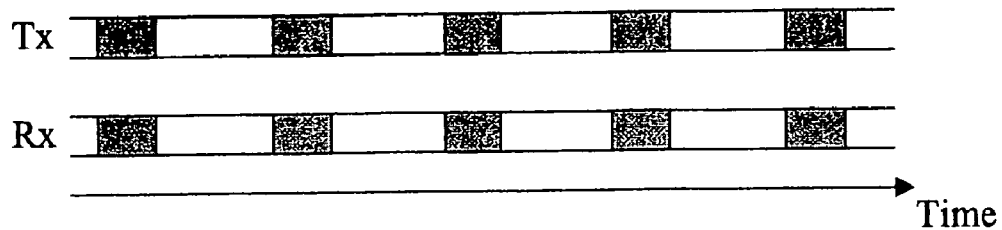
FIG. 21 illustrates ideal transmission and receiving.

Referring to FIG. 21, the technique for the estimation of the available bandwidth may be based upon a single traffic stream being present from the sender to the receiver. In this manner, the sender does not have to contend for medium access with other sending stations. This single traffic stream may, for instance, consist of packets containing audio and video data. As illustrated in FIG. 21, a set of five successful packet transmissions over time in an ideal condition of a network link is shown, where Tx is the transmitter and Rx is the receiver. It is noted that FIG. 21 depicts an abstracted model, where actual transmission may include an acknowledgment being transmitted from the receiver to the transmitter, and intra-frame spacings of data (such as prescribed in the 802.11 Standard). In the actual video data stream having a constant bit rate, the packets are spaced evenly in time, where the time interval between data packets is constant and determined by the bit rate of the video stream, and by the packet size selected.

Figure 22:
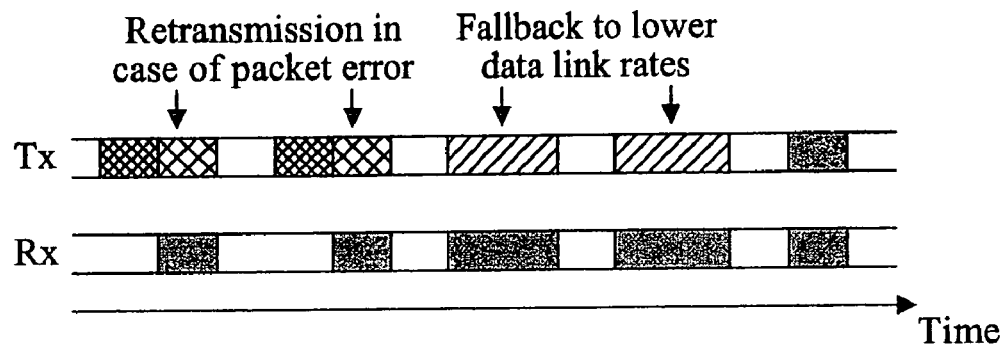
FIG. 22 illustrate retransmission and fallback to lower data rates.

Referring to FIG. 22 a sequence of five packets is shown under non-ideal conditions. After the application has transmitted some of the packets, the transmitter retransmits some of the packets because they were not received properly by the receiver, were incorrect, or an acknowledgment was not received by the transmitter. The retransmission of the packets automatically occurs with other protocol layers of the wireless transmission system so that the application layer is unaware of the event. As illustrated in FIG. 22, the first two packets were retransmitted once before being properly received by the receiver. As a result of the need to retransmit the packets, the system may also automatically reverts to a slower data rate where each packet is transmitted using a lower bit rate. The 802.11a specification can operate at data link rates 6, 9, 12, 18, 24, 36, 48, or 54 Mbps and the 802.11b specification can operate at 1, 2, 5.5, or 11 Mbps. In this manner the need for retransmission of the packets is alleviated or otherwise eliminated.

Figure 23:
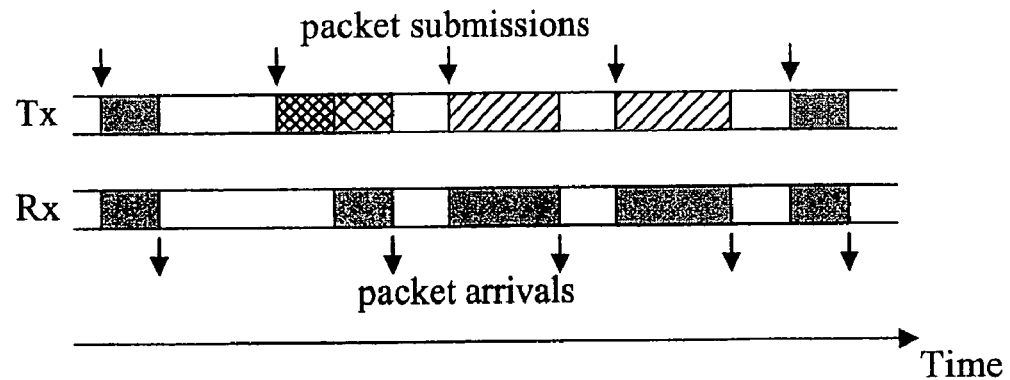
FIG. 23 illustrates pack submissions and packet arrivals.

Referring to FIG. 23, the present inventors considered the packet submissions to be transmitted from the application, illustrated by the arrows. As it may be observed, there is one retransmission that is unknown to the application and two changes in the bit rate which is likewise unknown to the application. The application is only aware of the submission times of the packets to be transmitted. The packet arrivals at the application layer of the receiver are illustrated by the arrows. The packets arrive at spaced apart intervals, but the application on the receiver is unaware of any retransmission that may have occurred. However, as it may be observed it is difficult to discern what the maximum effective bandwidth is based upon the transmission and reception of the packets shown in FIG. 23.

Figure 24:
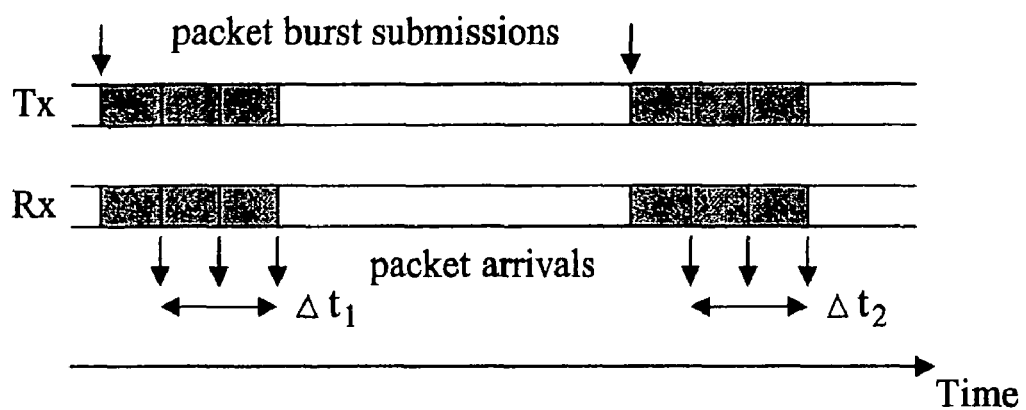
FIG. 24 illustrates pack burst submissions and arrivals.

After consideration of the difficultly, the present inventor determined that to effectively measure the bandwidth available, a group of packets should be provided to the transmitter in a manner as fast as the transmitter will accept the packets or otherwise without substantial space between the packets in comparison with the normal speed at which they would be provided to the transmitter, for the average bit rate of the video. Referring to FIG. 24, the burst of packets is preferably a plurality, and more preferably 3 or more. Subsequently, the packets are submitted by the transmitter through the wireless network, to the receiver. At the receiver, the arrival of the individual packets in each burst is timed.

In many cases, the transmission of packets across the wireless network is at an average data rate less than the maximum data rate. Accordingly, the transmitter may buffer a plurality of packets together temporarily that is received for transmission. The data packets may arrive at the transmitter portion of the system at regular intervals, for example, if they come from a video encoder or transcoder that is operating at a constant bit rate. After the buffering, the transmitter may attempt to send the buffered packets as a burst, i.e., at the maximum sending rate. The transmitter may continue to buffer additional groups of packets to form additional bursts, as desired.

One desired result of sending packets in such bursts is that the overall throughput of the system is approximately equal to the target bit rate of the streaming video. The effective throughput, E, can be modified by controlling the following three parameters:

(1) The packet size (e.g., in the number of bytes), or the size of the data payload of each packet; and/or
(2) The number of packets in each burst of packets; and/or
(3) The time interval between subsequent burst of packets.

By way of example, if a payload size of 1472 bytes, and the number of packets in the burst is 10, and the time interval between bursts is 40 milliseconds, the effective throughput is: 10 (packets per burst)×1472 (bytes per packet)×8 (bits per byte)/0.040 (seconds per burst)=2,944,000 bits per second, or approximately 2.9 Mbps. Therefore, an audiovisual stream with a bit rate of 2.9 Mbps can be streamed at that rate using that wireless connection. It may be observed, that the packets are the actual video signal and not merely additional test traffic imposed on the network. In addition, the system may sequentially transmit the packet bursts in a manner such that the average data rate matches (within 10%) the video bit rate. In this manner, the system may have a continuous measurement of the available video bandwidth, while permitting the average video rate to remain unchanged.

Figure 25:
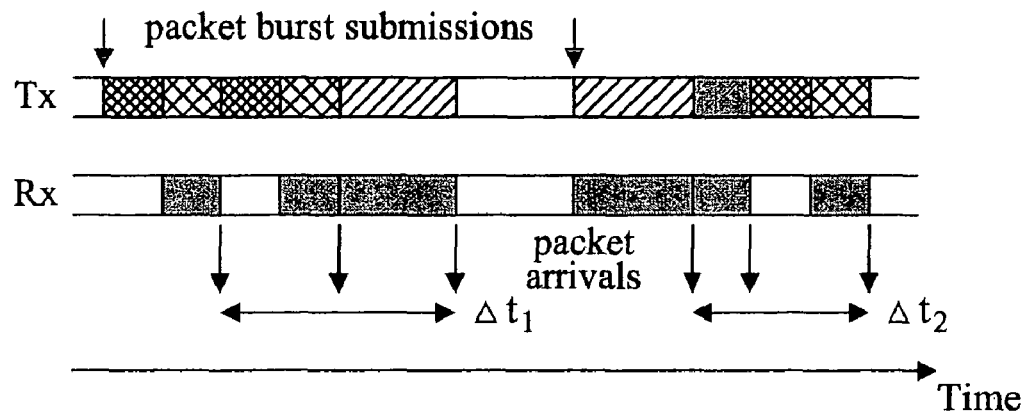
FIG. 25 illustrates packet burst submissions and arrivals with errors.

The effective throughput of a system is always lower than (or equal to) the bandwidth or maximum throughput that the channel can support. Bandwidth or the maximum throughput may be denoted as T. For example, it is known that in ideal conditions an 802.11b link in DCF mode can support a maximum throughput (bandwidth) of approximately 6.2 Mbps—if the payload size is 1472 bytes per packet, and the underlying link rate is 11 Mbps. In non-ideal conditions this maximum throughput or bandwidth will be lowered, due to re-transmissions and lowering of link rates. Naturally, the effective throughput can never exceed the maximum throughput. The ideal situation is illustrated in FIG. 24 while the non-ideal situation is illustrated in FIG. 25. In the case shown in FIG. 24 the channel actually may support a higher througput, up to a maximum throughput, of $T=T_A$ Mbps. Therefore, $E_S<T_A$ and there is space for additional traffic. In the case shown in FIG. 25 the maximum throughput drops because the underlying MAC uses more of the capacity of the channel to transmit the packets in the data stream and there is less room for additional traffic. The maximum throughput in this case, say $T=T_B$ is lower than the case shown in FIG. 24: $T_B<T_A$. The effective throughput can still be supported: $E_S<T_B$ holds as well.

It is the maximum throughput or bandwidth T that is estimated, in order to provide the transmitter with the right information to adapt the audio/video stream bandwidth (if necessary). The maximum throughput is achieved, albeit temporarily, during transmission of a packet burst. Therefore, the maximum throughput is estimated by computing the ratio of the number of bits transmitted during a burst, and the time duration of that burst. More precisely, consider a burst of N packets ($N \geq 2$) arriving at the receiver, where packet i, $1 \leq i \leq N$, in that burst arrives at time $t_i$ (in seconds). Note that at the receiver it may not know the time at which the sender submitted the first packet to the network for transmission. As shown in FIGS. 24 and 25, during the time interval $\Delta t = t_N - t_1$ between the arrival of the first and the last packet of a burst, the network is busy transmitting packets 2 to N (all packets in the burst except the first). If one assumes that each packet in a burst carries the same payload P bits, then the amount of bits transmitted during the interval $\Delta t$ is equal to $P*(N-1)$ bits. Therefore, the maximum throughput or bandwidth at the time of this burst is:

$$T = \frac{P \cdot (N-1)}{t_N - t_1}$$

More generally, one may denote the maximum throughput or bandwidth for a burst j by $T_j$. The payload of packets during burst j is $P_j$ (all packets during a burst have the same payload). The number of packets in burst j is $N_j$. The time of arrival of packet i in burst j is $t_{j,i}$ and the time interval measured for burst j is $\Delta t_j = t_{j,N} - t_{j,1}$.

It is noted that the receiver may also utilize time stamps measured at the sender side, if the sender embeds those time stamps into the packet payload. The packet payload may also include a packet sequence number. The packet payload may also include a burst sequence number. Such sequence numbers may be used by the receiver to detect packet losses. The packet payload may also contain a field that indicates that a packet is the first packet in a burst, and/or a field that indicates that a packet is the last packet in a burst, and/or a field that indicates that a packet is neither the first nor the last packet in a burst.

Timestamps or measurements of time and time intervals can be provided by clocks internal to the hardware/software platform. Note that different hardware/software platforms may offer different APIs and may support clocks with different performance in terms of clock resolution (or granularity). For example, on a Linux platform, the gettimeofday( ) API is available, which provides time values with microsecond resolution. As another example, on a Windows 2000/Windows XP platform (Win32 API), the GetTickCount( ) and QueryPerformanceCounter( ) APIs are available. The latter API can be used to retrieve time values with sub-millisecond resolution. The actual resolution of the time values provided by the QueryPerformanceCounter( ) API depends on the hardware. For example, this resolution was found to be better than microsecond resolution on two different Windows 2000 laptop PCs, and was found to be better than nanosecond resolution on a newer Windows XP desktop PC.

The bandwidth measurements may be done on an ongoing basis, that is, more than just once. Every burst of data packets during the streaming of audio/video data may be used to estimate bandwidth available during transmission of that burst. Such measurements performed at the receiver are sent back to the sender.

A test setup was implemented using software running on two Windows 2000 laptop PCs, both equipped with IEEE 802.11b WLAN client cards. These WLAN cards on these laptops were configured to communicate in the 802.11 ad-hoc mode, and the IP protocol settings were configured to create a 2 laptop private network. Software running on one PC acted as a server, sending packets over the network to the receiver using the UDP, IP and 802.11b protocols. Note that UDP may be used instead of TCP, as UDP is more suitable for real-time traffic. It is noted that the system may use other protocols, such as for example, the Powerline Communication networks or other LANs.

The first example illustrates throughput performance of 802.11b in a generally ideal case, where the laptop PCs were located close to each other, and interference from external sources was minimized. The 802.11b cards were configured to communicate at the maximum 11 Mbps link rate. The packet payload was constant at 1472 bytes (an additional 28 bytes are used by UDP and IP, such that the 802.11 MAC delivered 1500 byte packets). Each experiment consisted of transmission of 100 bursts. In this example, each burst consisted of 10 packets and the time between subsequent bursts was scheduled to be 40 ms. Therefore, effective throughput in this case is approximately 2.9 Mbps.

Figure 26:
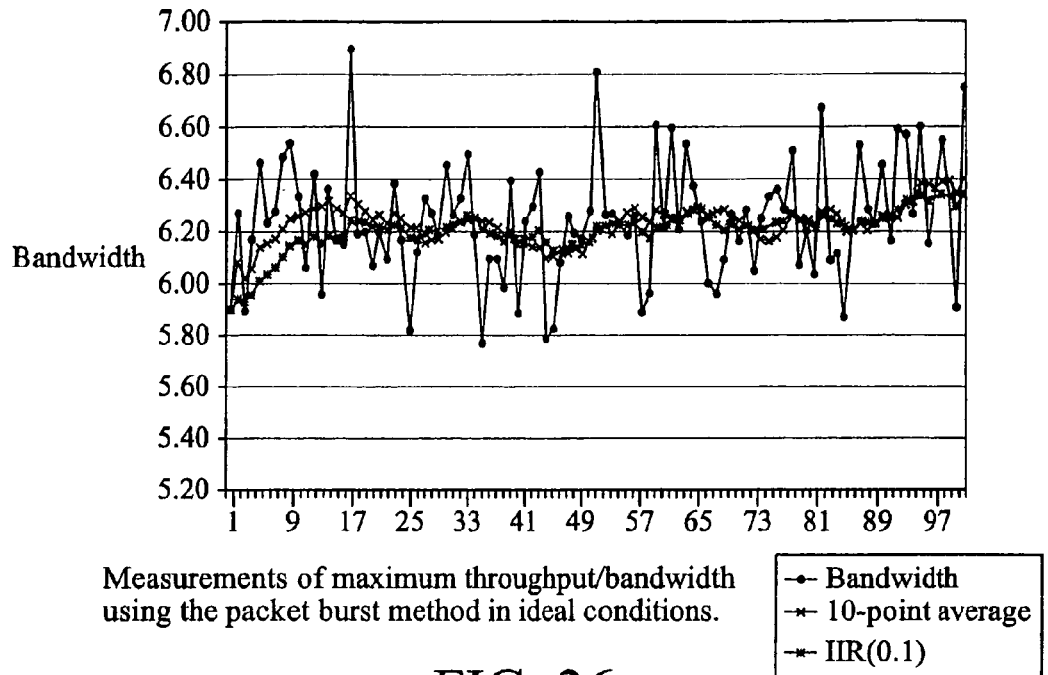
FIG. 26 illustrates measured maximum bandwidth using packet burst under ideal conditions.

Results for the ideal conditions are shown in FIG. 26. From other measurements, it is known that the maximum throughput/bandwidth in this case is 6.2 Mbps on average. Note that the bandwidth varies somewhat around the 6.2 Mbps value; the average value over 100 bursts is 6.24 Mbps and the standard deviation is 0.22 Mbps. The average value over 100 burst is very close to the expected value, and the standard deviation is reasonably small. Methods to handle the variations are discussed in the next section.

The second example illustrates throughput performance of 802.11b in generally non-ideal conditions, where the laptop PCs were located much further away from each other, at a distance of 43 m, in an indoor environment containing many cubicles, and a few walls between the sender and receiver. All other parameters were the same as in the first example.

Figure 27:
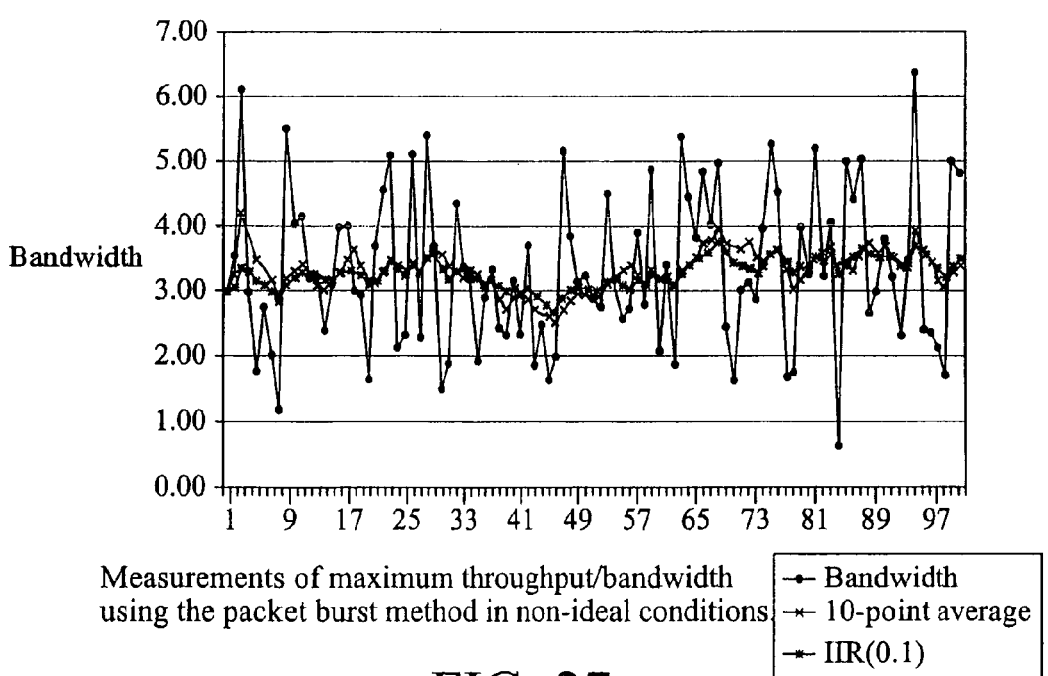
FIG. 27 illustrates measured maximum bandwidth using packet burst under non-ideal conditions.

Results for the non-ideal case are shown in FIG. 27. The maximum throughput in this case is much lower: 3.3 Mbps on average over 100 bursts. The standard deviation over 100 bursts is much higher: 1.20 Mbps. The diagram shows the decreased throughput performance and the increased variations in performance (note that the vertical axis has a different scale in FIG. 26 and FIG. 27).

From this second example, it is noted that the variation in measured bandwidth values may be a useful parameter in itself to use as feedback in an audio/video streaming system—as an alternative to estimating bandwidth directly.

Robustness

Measurements of bandwidth are subject to temporal variations under most conditions, as illustrated in FIGS. 26 and 27. Some of these variations, generally referred to as noise, are not meaningful in the context of wireless broadcasting. It was determined that one source of errors is caused by the (limited) resolution of the clock used to measure packet arrival times. With such errors present it is desirable to provide a robust estimate of (instantaneous) bandwidth that can be used as input to a rate adaptation mechanism at the audio/video encoder at the sender.

There exists a trade-off between the number of packets in a burst and the robustness of the bandwidth estimate. Robustness of the bandwidth estimate can be increased by using a larger number of packets per burst. For example, using bursts with more than two packets reduces the effects of limited resolution of the measurement clock. However, increasing the number of packets per burst means the buffer size at the sender side must be increased, resulting in higher cost of implementation, and higher transmission delays.

The examples shown in FIGS. 26 and 27 assumed a burst size of 10 packets; however, any suitable number of packets may be used. Some temporal variations in the estimates of bandwidth typically remains as the number of packets is increased to its practical maximum. The processing of either the bandwidth estimates or of the measured time intervals may be used to reduce the variations. Processing techniques may be applied to compute a final estimate of the bandwidth.

Traditional techniques applicable to measuring Internet bottleneck bandwidth use a frequency distribution (histogram) of a set of bandwidth estimates and take either the mean, median or mode(s) of that distribution as the final bandwidth estimate. The approach is partly based upon viewing the data as a set of data to be collected, and thereafter processed. However, the present inventor has determined that such techniques are not appropriate for real-time bandwidth estimation in WLANs. One of the principal reasons the present inventor determined that such techniques are inappropriate is that it takes several seconds before enough bandwidth samples can be collected to form a meaningful frequency distribution. However, in the case of video over a wireless network, the channel is subject to variations on a much smaller (subsecond) timescale and the system should be able to respond to those changes in a much faster manner.

To overcome this limitation of a set-based premise, the present inventor determined that the data should be analyzed as a sequential set of measurement samples, as opposed to viewing the data as a set of data to be collected, and thereafter processed. In this manner, the temporal nature of the data becomes important. The data may be treated as a set of measurement samples as a time sequence, i.e., as a discrete time signal. Accordingly, if the samples are received in a different order the resulting output is different. Assuming the measurement samples are spaced equidistantly in time, various signal processing techniques can be applied to eliminate "noisy" variations, including but not limited to the following.

(1) FIR filtering. Non-recursive filtering with a finite number of filter tabs. One example is a moving average filter. FIGS. 26 and 27 illustrate the effect of a 10 tab moving average filter on the sequence of bandwidth measurement samples.

(2) IIR filtering. Recursive filtering with a finite number of filter tabs. One example is a first-order recursive filter that weights both the previous estimate with the current measurement sample to compute a new estimate. FIGS. 26 and 27 illustrate the effect of a first order IIR filter on the sequence of bandwidth measurement samples.

(3) Statistical processing. Mean square error (MSE) estimates, maximum a posteriori (MAP) estimates, Wiener filtering, Kalman filtering. Statistical processing provides a particularly convenient framework, because it allows one to both filter samples and predict future values as the same time. Forming a prediction is important since the results of the measurements are used to control the rate of audio/video data transmitted in the (near) future.

(4) Curve fitting. Fitting curves, such as straight lines, splines, and other, allows interpolation, approximation and extrapolation from the noisy data samples. Curve fitting is especially useful in case the measurement samples are not spaced exactly equidistantly in time.

In each of these methods, the additional processing to compute a final estimate for the bandwidth at burst j may utilize a limited number of bandwidth samples from the past $T_m$, $j-M_1 \leq m \leq j$, and may also utilize a limited number of final bandwidth estimates from the past $T_m^*$, $j-M_2 \leq m \leq j-1$. One embodiment may, for example, utilize a first order IIR type of filter as follows:

$$T_j^* = (1-w) \cdot T_{j-1}^* + w \cdot T_j$$

where w is a parameter between 0 and 1. For instance, if w=0.5, the final estimate of bandwidth at burst j is computed by weighting equally the previous final estimate of the bandwidth at burst j−1 and the current bandwidth sample for burst j. The parameter w controls the amount of smoothing or averaging applied to the bandwidth samples, where the amount of smoothing is high when w is low, and the amount of smoothing is low when w is high. This parameter may be held constant; alternatively, one may change this parameter adaptively. This technique was used in the examples in FIGS. 26 and 27, where the value of w was 0.1.

Note that instead of filtering or processing bandwidth samples $T_j$, one may also filter or process measured time intervals $\Delta t_j$ before computing bandwidth values using $$T = \frac{P \cdot (N-1)}{t_N - t_1}.$$

In that case, one may utilize samples of measured time intervals intervals from the past $\Delta t_m$, $j-M_1 \leq m \leq j$, as well as a limited number of processed time interval estimates from the past $\Delta t_m^*$, $j-M_2 \leq m \leq j-1$, to compute a final estimate of a representative time interval for burst j, $\Delta t_j^*$. Then, one may apply $$T = \frac{P \cdot (N-1)}{t_N - t_1}$$

using this final estimate of the time interval, to compute a final estimate of the bandwidth at burst j, $T_j^*$. One example is to use IIR filtering on the measured time intervals:

$$\Delta t_j^* = (1-w) \Delta t_{j-1}^* + w \Delta t_j$$

followed by:

$$T_j^* = \frac{P_j \cdot (N_j - 1)}{\Delta t_j^*}$$

Such filtering, estimation and prediction techniques allow filtering out an appropriate amount of noisy variations, while still providing a final estimate quickly.

The measurement results at the receiver are transmitted back to the sender. The sender uses this feedback information to adapt the audio/video being transmitted, especially its rate. The feedback information transmitted from receiver to sender may consist of an estimate of (instantaneous) bandwidth/maximum throughput as computed by the receiver. It may also include raw measurement results, or a partial estimate, which the sender may use to compute a final estimate. It may also include a time stamp, indicating the time at which the estimate was computed, and a sequence number, indicating the packet number or packet burst number. The feedback information may also contain an indication of whether the receiver detected any packet loss.

Feedback information can be sent back to the sender using the same network link that carries the audio/video data. In particular, packets with feedback information can be transmitted between transmission of packet bursts with audio/video data from sender to receiver. Such feedback packets may be sent periodically, for example, after every burst of audio/video packets, or after every K bursts, or whenever desired, for example, only if there is a significant change of the bandwidth performance. The feedback packets only uses a small portion of the available bandwidth for transmission. This overhead should be minimized, i.e., kept small while still allowing the sender to react in a timely fashion. The amount of information in such feedback packets is very small compared to the audio/video data, therefore the bandwidth overhead is very small. Still, the sender may take this small overhead into account in its bandwidth allocation and adaptation strategy.

Figure 28A:
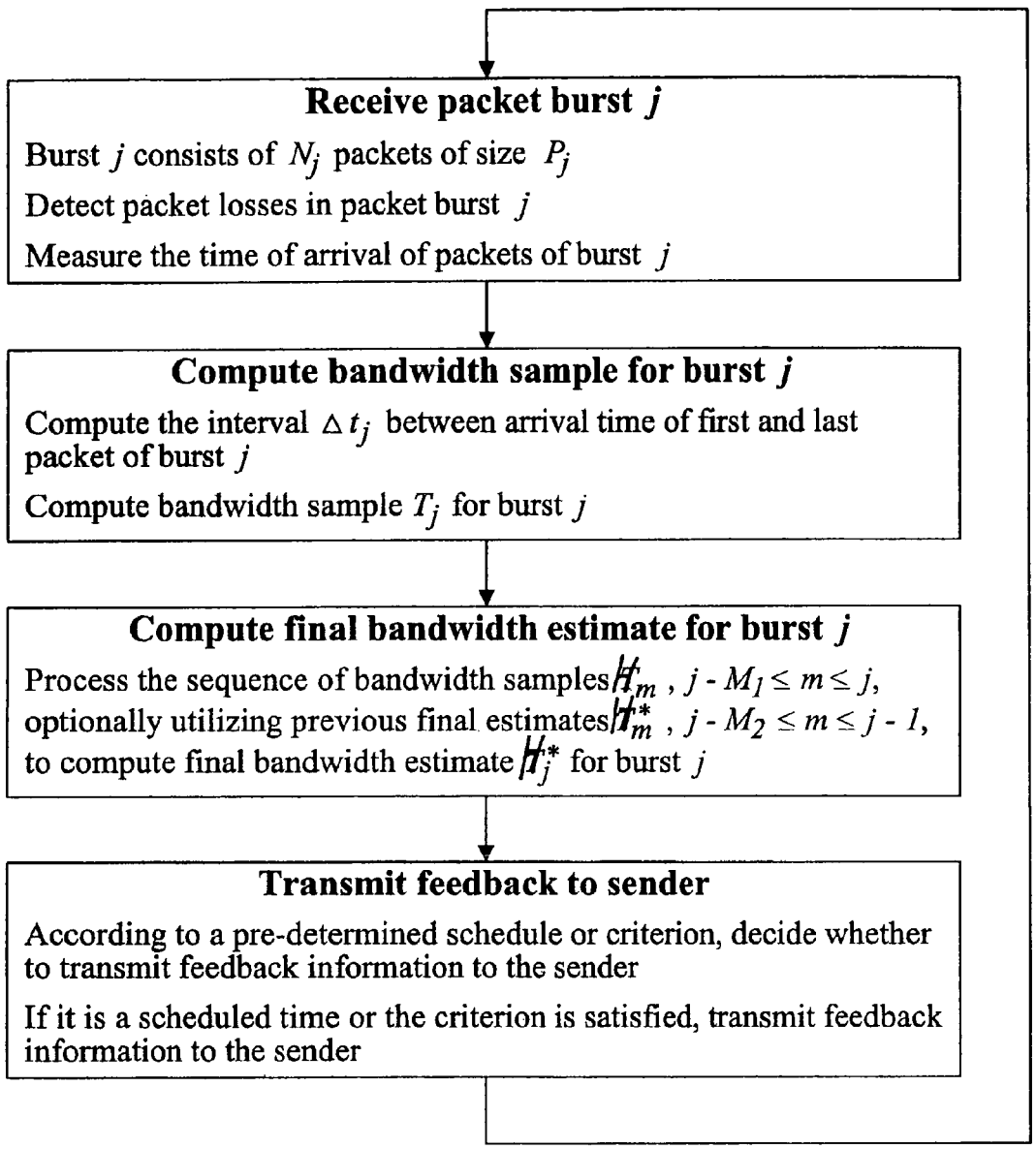
FIGS. 28A-28B illustrates receiving packets.

Referring to FIG. 28A, a flow diagram for an exemplary receiver is shown. The receiver receives the packet bursts j and determines packet losses and measures the arrival of the packets. Then the receiver computes the bandwidth sample for the burst j. Thereafter, the receiver may compute the final bandwidth estimate for the burst j by incorporating the bandwidth of the previous packets. After estimating a final bandwidth the receiver transmits the bandwidth information back to the sender. It is to be understood that the sender may calculate the bandwidth information and bandwidth estimates based upon information from the receiver.

Figure 28B:
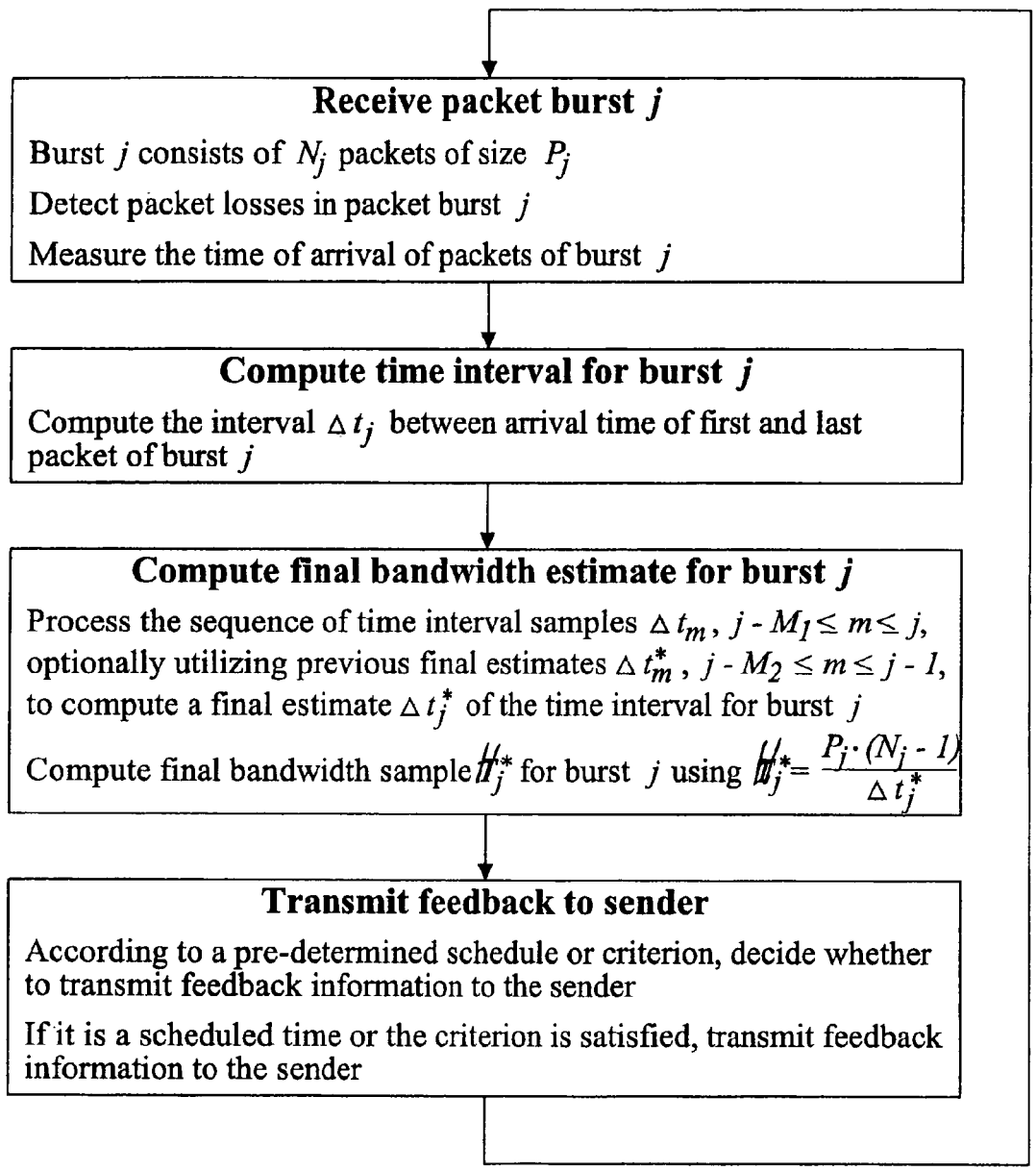

Referring to FIG. 28B, a flow diagram for another exemplary receiver is shown. The receiver receives the packet bursts j and determines packet losses and measures the arrival of the packets. Then the receiver computes the time interval for burst j. Thereafter, the receiver may compute the final bandwidth estimate for the burst j by incorporating the time intervals of the previous packets. After estimating a final bandwidth the receiver transmits the bandwidth information back to the sender. It is to be understood that the sender may calculate the bandwidth information and bandwidth estimates based upon information from the receiver.

Figure 29:
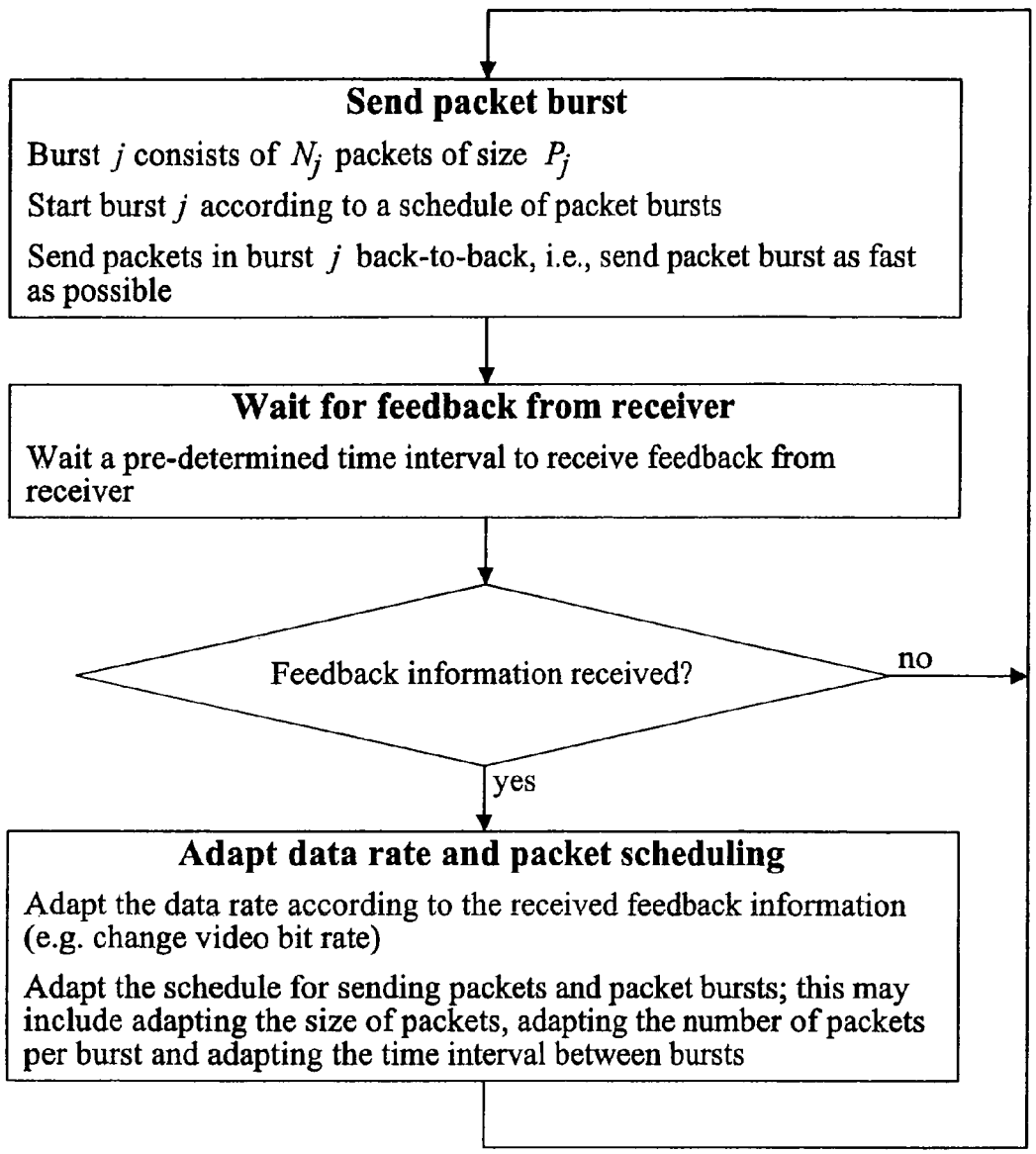
FIG. 29 illustrates transmitting packets.

Referring to FIG. 29, a flow diagram for an exemplary transmitter is shown. The transmitter sends a packet burst to the receiver. The transmitter then waits a pre-determined time interval to receive feedback from the receiver. When the feedback information is received the transmitter may adapt the rate and schedule the packets to the receiver. It is to be understood that the sender may calculate the bandwidth information and bandwidth estimates based upon information from the receiver.

Figure 30:
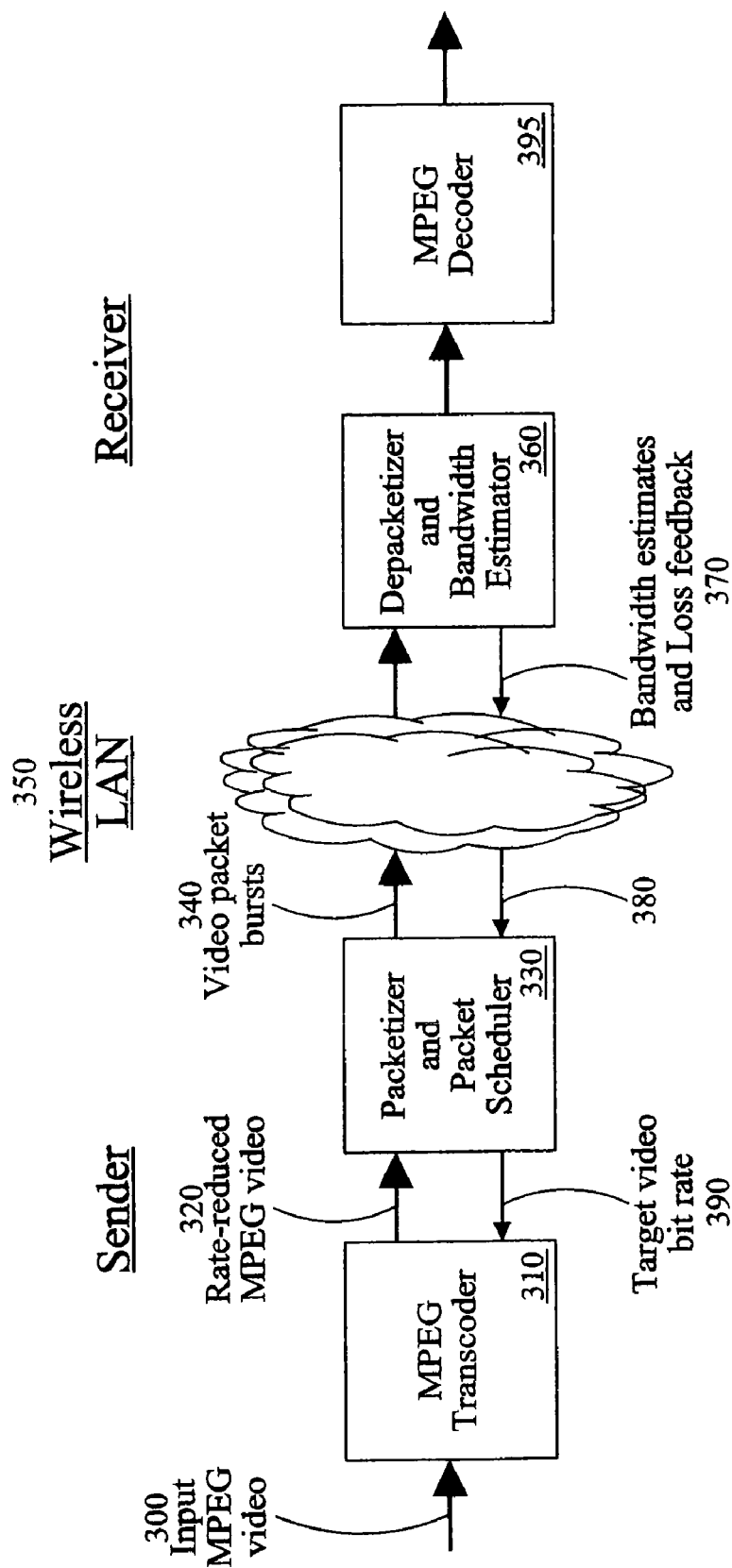
FIG. 30 illustrates a wireless system.

Referring to FIG. 30, a wireless broadcasting system may include an input video 300, such as in a MPEG format. The input video 300 is provided to a MPEG transcoder 310 which adapts the video bit rate to the desired data sending rate for one or more video streams. The rate-reduced (or increased) MPEG video 320 is provided to a packetizer and packet scheduler 330 which schedules packets for transmission over the channel, adapting the data sending rate so that is preferably remains generally below the available bandwidth. The video packets 340, in many cases in the form of a "burst", is provided to a wireless network 350. The data from the wireless network 350 is received by a depacketizer and bandwidth estimator 360. The estimator 360 provides a bandwidth estimate and loss feedback 370 to the wireless network 350, which in turn provides data 380 to the scheduler 330. The data 380 is used to determine a target video bit rate 390 provided to the MPEG transcoder 310. The output of the estimator 360 is provided to a MPEG decoder 395.

For the system shown in FIG. 30, the bandwidth may be defined as previously described or as the maximum throughput offered by the "lower" network layers to the audio/video application layer at a particular time. The maximum throughput or bandwidth available for transmission of audio/video data by H, which is time-varying. The sending rate may be denoted by S and defined by the rate at which the sender submits data to the network. The effective throughput may be denoted by E and defined by the actual throughput of audio/video data realized at any particular time between the sender and the receiver.

It may be observed that the effective throughput may not exceed the maximum throughput or bandwidth at any particular time: $E \leq H$. With a given maximum throughput of the channel, e.g. $H=H_A$ Mbps, the sender transmits data at a rate, e.g. $S=S_A$ Mbps, that is lower than $H_A$ to help ensure that all transmitted data arrives at the receiver without packet losses and in a timely manner. In such as case, the effective throughput, e.g. $E=E_A$ Mbps, is equal to the sending rate $E_A=S_A \leq H_A$.

If the sending rate were to be higher then the bandwidth, some of the data send would be lost or arriving late, e.g. $S_A \geq H_A = E_A$. Therefore, one feature of the sender is to ensure that $E=S \leq H$ at all or more of the time. The sender controls its sending rate by scheduling the transmission of the audio/video data packets appropriately. Another feature of the sender is to ensure that the bit rate of the video generated, R', is equal to the sending rate, e.g. R'=S. In the single stream embodiment, the sender should achieve $R'=S \leq H$.

As an example, in the case that the bit rate of the original video stream is already lower than the network bandwidth, the transrater does not have to actively lower the bit rate. In fact, the transrater may actively increase the bit rate, if desired. To optimize performance the sender substantially matches the packet sending rate to the video bit rate in order to achieve improved image quality. However, when the bandwidth of the wireless network decreases sufficiently to approach the video bit rate the sender may react to avoid packet losses by appropriately lowering both its sending rate and the transrater output bit rate dynamically.

As previously discussed, one technique to transmit data from the sender to the receiver is to use a "burst" of M packets having a packet size P over a time ΔT. A set of suitable parameters that may be modified in order to control the sending rate include, for example:

(1) The packet size (e.g., in number of bytes), or the size of the data payload of each packet, P;
(2) The number of packets in each packet burst, M;
(3) The time interval between subsequent packet bursts, ΔT.

For purposes of discussion all packets in a single burst will be assumed to have the same payload size. It is to be understood that the payload size may vary from burst to burst, and from packet to packet, as desired. In the case of the same payload size, the sending rate S may be defined as:

$$S = \frac{P \cdot M}{\Delta T}$$

The maximum throughput H is achieved, albeit on a temporary basis, during the transmission of a burst of packets.

After further consideration of effectively adapting the sending rate to match the available bandwidth, the present inventors determined that effectively modifying the packet size provides significant advantages. In many cases, for simplicity of implementation, the number of packets in each burst, M, is maintained as a constant (or 90% or more the same for a period of several bursts), as well as the time interval between bursts (or 90% or more the same for a period of several intervals), ΔT. The system may compute M and ΔT at the start of a session and maintained constant during the rest of the session; and are therefore assumed a constant at the time of rate adaptation. It is to be understood that the number of packets in each burst, M, and/or the interval between bursts, ΔT, may be modified during a session, if desired.

Adapting the sending rate by varying the packet size (or payload size P) has some advantages over varying the number of packets in a burst, or the time interval between bursts. Varying the number of packets in a burst results in more difficulty for the receiver to detect the first and last packets in a burst (which may be used to estimate bandwidth). Varying the number of packets would likely necessitate the signaling of the position of a packet in a burst (first, last, or neither), which would increase the overhead on the data transmitted. In addition, the number of packets per burst should not be excessively lowered, because the estimate of bandwidth would become more unreliable. The excessive lowering and excessive raising of the number of packets per burst should be limited. Moreover, the system may include a lower threshold of the number of packets to ensure reliability. If desired, the number of packets in a burst may be within the range of 2 to 500, and more preferably from 10 to 50. Also, the number of packets should not be excessively raised, because it would result in a significantly larger buffer at the sending device as well as the increase in the average buffering delay. Accordingly, simply changing the number of packets in a burst, as the sole adaptation measure, may not be sufficiently robust for many applications.

Varying the packet size provides the advantage that better bandwidth utilization may result. In the event that the packet size is lowered when the system detects a degraded channel condition, this will result in an increase in the expected bandwidth that would have otherwise occurred. This is because, in a given channel condition, smaller packets have a higher probability of being transmitted properly (e.g., a lower packet error ration) compared to larger packets. Therefore, smaller packets will result in fewer retransmissions before arriving correctly at the receiver. This automatically has a positive effect on the available bandwidth at the application layer.

It has been determined that it is desirable to decrease the payload size P, and hence the packet size, when the available bandwidth H decreases, and to increase the payload size P, and hence the packet size, when the available bandwidth increases. As it may be observed, it is desirable to maintain the sending rate S below the available bandwidth H during all (such as 90%, 99% of the time or more), or substantially all, of the time without being lower than necessary.

The packet size adaptation may be formulated as follows. The sender has obtained (for example from the receiver, or otherwise) an estimate of the available bandwidth/maximum H. The system is aware of the current payload size $P_{current}$ of the packets that have been used while estimating the maximum throughput. The sender also is aware of the current sending rate $S_{current}$. The sender may now determine a different sending rate $S_{next}$ for the next burst or bursts of packets, as well as the next payload size $P_{next}$ to realize that sending rate value.

Another issue that arises in the case of wireless networks is that the bandwidth/maximum throughput depends on the packet size. The maximum throughput that can be achieved with a small packet size is lower than that which can be achieved with a large packet size. Hence, changing the packet size also changes the maximum throughput that can be achieved.

Figure 31:
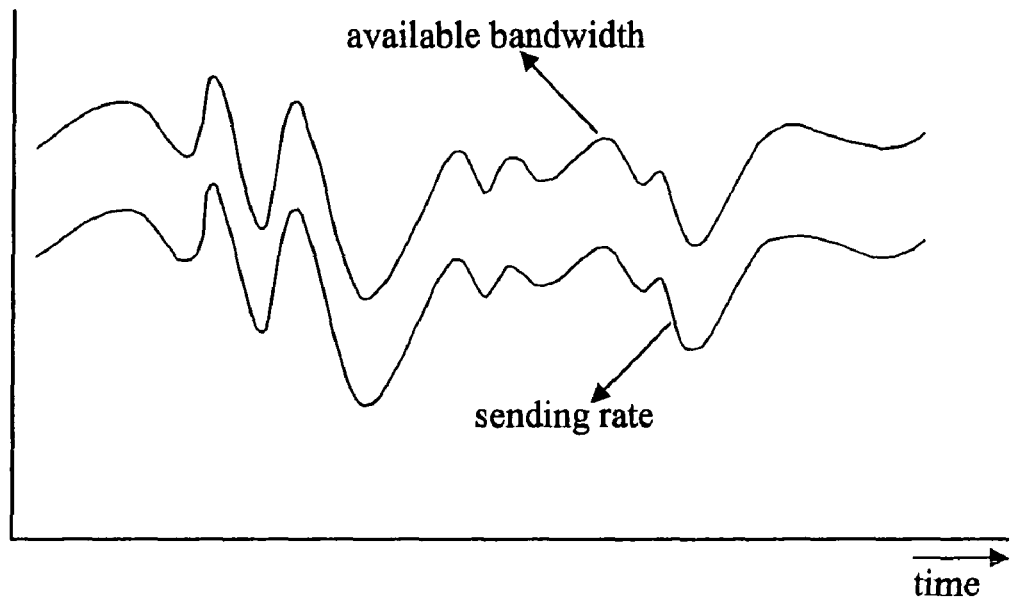
FIG. 31 illustrates an embodiment of available bandwidth and the sending rate.

One potential technique for selecting a sending rate, given an estimate of the available bandwidth, is to compute the payload size $P_{next}$ such that the following relationship is maintained:

$$S_{next} = F \cdot H$$

where F is a bandwidth utilization factor, $0 \leq F \leq 1$. Here, F provides a margin to safeguard against errors in the estimate of the available bandwidth and against any sudden changes in the available bandwidth within short time intervals. While H is based on the recent estimates of the available bandwidth, the system may also consider changes of the bandwidth that may occur between the time of measurement and the time at which the sender is able to utilize such an estimate for rate adaptation. By way of example, a temporal time period of 1 second or less, ½½ of a second or less, ¹⁄₁₀th of a second or less, or ¹⁄₁₀₀th of a second or less, may be used as a measure of a time internal over which there is generally increasing bandwidth or generally decreasing bandwidth of the channel. For example, if the estimate of available bandwidth was obtained at the receiver and subsequently transmitted back to the sender, the time interval between computing the estimate and utilizing it may not be negligible. Even if computing the estimate includes techniques for predicting the bandwidth forward in time, such estimates may not be robust. Hence, the system may utilize F to provide an additional safety margin. Once implementation of this technique is illustrated in FIG. 31.

For example, if the bandwidth is generally degrading then the estimate of the available bandwidth may be higher than the actual available bandwidth when the data is sent. Alternatively, if the bandwidth is generally improving then the current estimate of the available bandwidth may be lower than the actual available bandwidth when the data is sent. Other functions of F may likewise be used.

In general, other factors may also be taken into consideration when computing a sending rate. For example, in the audio/video streaming environment, the system should not increase (or decrease) the sending rate from one burst to the next significantly, because a sudden increase (or decrease) in a video bit rate (such as a change greater than 10%, 20%, 30%, 40%, 60%, or 80% or more), while allowing slow increases in the sending rate (such as a change less than 10%, 20%, 30%, 40%, or 50%), thereby providing additional robustness and user desirability. In many cases, the permitted decrease is greater than the permitted increase. Furthermore, if multiple streams are transmitted simultaneously, one may also limit increases (or decreases) in the sending rate depending on the sending rate of other streams. In this manner, the increases (or decreases) are different than they would have otherwise been based upon other streams.

Figure 32:
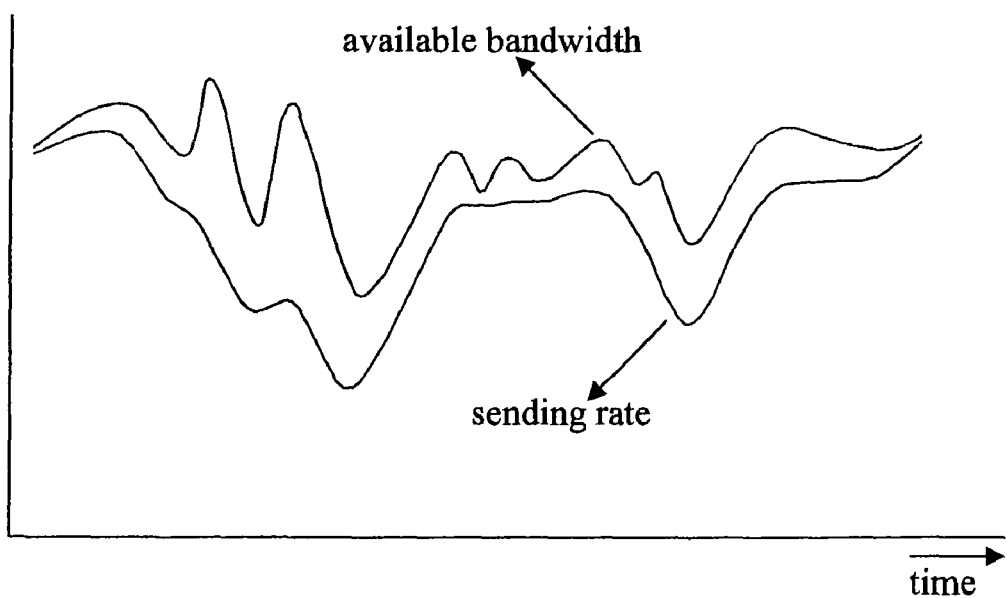
FIG. 32 illustrates another embodiment of available bandwidth and the sending rate.

Another factor that may be taken into account is the amount of variation (over time) in the bandwidth estimate. This is motivated by the fact that n degraded channel conditions, not only will the available bandwidth decrease, but generally the variation in the estimate will increase. Therefore, the magnitude of the variation can be utilized to modify the safety margin that should be maintained between available bandwidth and chosen sending rate. One implementation of this technique is illustrated in FIG. 32.

The previous equation:

$$S_{next} = F \cdot H$$

is generally used in the case that the packet loss did not occur in the previous packet burst(s). In the case where packet loss did occur in the previous burst(s), a different value for the next sending rate may be computed. For example, the minimum sending rate may be selected in this event.

A new payload size $P_{next}$ may be selected in order to achieve the sending rate as prescribed above. As noted above, it is desirable to select $P_{next}$ such that the resulting sending rate $S_{next}$ is proportional to the bandwidth available when using the newly selected $P_{next}$. However, the latter value is unknown to the sender, as it only is aware of the estimate of the avasilable bandwidth, when using the current payload side $P_{current}$. As mentioned above, the available bandwidth may depend on the packet size used.

The previous equation may be more accurately stated as:

$$S_{next} = \frac{P_{next} \cdot M}{\Delta T} = F \cdot H(P_{next})$$

The sender is aware $H(P_{current})$; however $P_{current}$ may or may not be equal to the optimal $P_{next}$ to be selected. In order to select an optimal P, the sender should estimate or otherwise have the available bandwidth expected at the new payload size $P_{next}$.

One technique for the selection of the packet size/payload size is to determine, from theory and/or experiment, the maximum possible available bandwidth for any payload size: $H_{max}(P)$. This maximum available bandwidth is obtained under ideal (or substantially ideal) conditions of the wireless channel, e.g., no retransmissions occurring and the maximum data link rate is used.

The ratio of the measured bandwidth at the current payload size $H(P_{current})$ and the maximum possible bandwidth at this payload size $H_{max}(P_{current})$ may be computed. This ratio is smaller or equal to 1.0 by definition, as the measured bandwidth under the current channel condition is always lower (or equal) to the maximum bandwidth (obtained under ideal channel conditions). This ratio may then be used to predict the available bandwidth for arbitrary payload size in the current channel condition. One expression for this relationship is as follows:

$$H(P) \approx \frac{H(P_{current})}{H_{max}(P_{current})} \cdot H_{max}(P)$$

Restarting this equation in terms of $P_{next}$ results in:

$$\frac{P_{next} \cdot M}{\Delta T} \approx F \cdot \frac{H(P_{current})}{H_{max}(P_{current})} \cdot H_{max}(P_{next})$$

Therefore, the sender may select $P_{next}$ such that the equation holds. It is noted that $H(P_{current})$ is known (as it was measured) and the values of $H_{max}(Pcurrent)$ and $H_{max}(P_{next})$ are known as well. The latter values can be computed on-line or pre-computed and stored in a look up table for selected values of P.

Another technique for packet selection includes a dependency of the available bandwidth on the wireless channel condition. For a particular transmission system, the condition of the channel may be characterized by the Bit Error Ratio (BER), namely, the probability of bit errors after transmission. The condition of the channel may also be characterized using other characteristics, such as for example, signal to noise ratio. It is noted that the BER is a function of the signal to noise ratio.

The Packet Error Ratio (PER) may be defined as the probability of an entire packet (802.11 data frame in some contexts) containing one or more bit errors. The PER in many cases depends on the BER and the data packet size. Given a fixed BER value, a larger packet size leads to a larger PER. As previously noted, large packets tend to be more prone to errors than small packets. One relationship between PER and BER can be expressed approximately as:

$$PER = 1 - (1-BER)^b$$

where b is the packet size in number of bits (i.e., 8×P plus MAC/PHY overhead).

The achievable throughput (available bandwidth) depends on the PER and data packet size, protocol overhead, in addition to other factors. The channel condition may be modeled statistically, and the system can compute the expected maximum achievable throughput (expected available bandwidth), denoted by H'. This model is based upon a fixed number of retries by the 802.11 MAC. When the PER is low, a small number of retries is expected to result in a packet arriving successful at the receiver. In this case, the maximum throughput will be high. On the other hand, when the PER is large, a larger number of retries is expected, and a higher probability of a packet loss will result. Under such channel conditions, the maximum throughput will be low.

Therefore, the system is capable of computing the PER from the BER, and to compute expected maximum throughput from the PER, as illustrated in FIG. 33. These relationships may be calculated in many different ways, depending on exactly how one models the underlying statistical processes as well as the wireless (e.g., 802.11) protocols.

Referring to FIG. 34, a tabulation of the expected bandwidth for different values of the payload size P and for different values of the BER for the 802.11b MAC is illustrated. It is noted that FIG. 34 contains expected values of the 802.11b MAC throughput, which may differ from the throughput at the audio/video application layer, due to the use of intermediate protocol layers and associated overhead due to protocol headers. A MAC Service Data Unit (MSDU) contains both the audio/video payload as well as the headers for intermediate protocols, such as UDP and IP. For example, if the audio/video data is transported using UDP and IP on top of 802.11b, an MSDU of 1500 bytes contains 1472 bytes of audio/video application data, because 28 bytes are required by the UDP (8 bytes) and IP (20 bytes) headers. Therefore, actual achievable throughput for audio/video data is slightly lower than the values in the table below. This is taken into account in our adaptation algorithm.

Tables similar to FIG. 34 may be constructed for 802.11a, 80211g, or other wireless protocols. It is noted that the values of MSDU size and BER in FIG. 34 are examples of typical values, and that other values can be used as appropriate. The column with BER =0 corresponds to the case of ideal channel conditions, and columns further to the right correspond to degrading channel conditions.

The technique may provide rate adaptation as illustrated in FIG. 35. Given an estimate of current available bandwidth at the current payload size H($P_{current}$), the system may infer the current channel condition using FIG. 34. Specifically, in each row of FIG. 34, the system constructs ranges of bandwidth values, where ech range is defined by the midpoint values between two subsequent bandwidth entries in a row. For example, if the current MSDU size is 1500 (corresponding to $P_{current}$=1472 in case UDP/IP are used), the midpoint between the values in the columns with BER=10−7 and BER=10−6 is (6.237+6.159)/2=6.198 Mbps. Likewise, the midpoint between the values in the columns with BER=10−6 and BER=10−5 is (6.159+5.408)/2=5.784 Mbps. The values 6.198 Mbps and 5.784 Mbps define a range of rates. If the current MSDU size is 1500 and the current estimated bandwidth value is in that range, the system infers that the BER is approximately 10−6, thus providing a characterization of the current channel condition.

Subsequently, to find a more optimal payload size under the current channel condition, the system may search the column with the BER found in the previous step, for the row such that the resulting sending rate (with $p_{next}$) is closest to the expected available bandwidth at that $p_{next}$ and that BER, scaled by F.

More precisely, given the BER and given values of expected bandwidth H' for several values of P (from a table such as FIG. 34), the system selects $P_{next}$ as the value of P that minimizes:

$$\left| \frac{P \cdot M}{\Delta T} - F \cdot H'(P, BER) \right|$$

It is noted that FIG. 34 may be entirely pre-computed, for sets of values of P (or MSDU size) and values of the BER, including the bandwidth ranges defined by midpoints between two columns. Therefore, given values of F, M and ΔT, the entire selection process as prescribed by equation directly above may be pre-computed and stored in a look-up table. Therefore, the implementation of the rate adaptation technique may consist of only one or a few table lookups, as detailed below.

The adaptation algorithm described above may be efficiently implemented by a set of look-up tables. This set of tables simply maps a given MSDU size and an estimate of current bandwidth (using the given MDSU size) into a new MDSU size, that is optimal in the channel condition inferred.

To illustrate the operation of the table look-up mechanism, an example is provided below as an example set of tables for the case of 802.11b.

The design of the tables starts out with MSDU sizes in the set:

{0, 10−7, 10−6, 10−5, 10−4.75, 104.5, 10−4.25, 10−4, 10−3.75, 10−3.5, 10−3.25}.

The number of packets per burst M may be 10.

The time interval between bursts ΔT may be 30 msec.

In this case, the sending rate (at MAC level) for MSDU size 1500 bytes is 4 Mbps. Note that this corresponds to an audio/video payload of 1472 bytes, and application layer sending rate of 3.925 Mbps. The largest packet size (based on MSDU is 1500 bytes) will be used under ideal channel conditions (BER=0), and smaller packet sizes (corresponding to smaller MSDU sizes in the set above) will be used in degraded channel conditions (BER above 0).

One example uses, F=0.64. This was designed such that the relationship holds precisely for the ideal case (BER=0 and MSDU size is 1500 bytes), where the sending rate (at MAC level) is 4 Mbps, and expected bandwidth is approximately 6.25 Mbps.

The technique illustrates in FIGS. 36A-I look-up tables designed using the methodology incorporating the dependency of the available bandwidth on the channel condition previously described. The set of optimal MSDU sizes, in this case, is the following subset:

{1500, 1200, 1000, 900, 600, 400, 300, 200, 100}.

In specific cases, it may be more desirable to use a single two-dimensional look-up table instead of a set of one-dimensional look-up tables.

Note again that the table look-up implementation allows any design methodology, including but not limited to the particular technique described herein. Furthermore, the table design and calculations can be performed off-line. The on-line adaptation process would therefore consist mainly of table look-up operations.

The design of the adaptation look-up table(s) depends on the set of MSDU sizes used, as well as on the number of packets per burst M, and inter-burst interval. The set of MSDU sizes may differ for different network types and perhaps for different implementations of network equipment. It is expected that this set can be fixed during product development in all applications. The choice of M and $\Delta T$ depends mostly on the maximum rate used for streaming audio/video data. In some applications, this is also fixed during product development. In all such cases, the look-up tables can be constructed entirely off-line. In cases where the audio/video streaming bit rate is not known a priori, the application may have to make a choice of M and $\Delta T$ just prior to starting a streaming session. The actual look-up table can be constructed at that time as well, prior to streaming. In other cases, there may be a range of bit rates known at product development time, in which case a set of look-up tables as for example in the above can be pre-computed applicable to a few typical bit rate values and pre-stored in the product.

In another combination, only a table with expected bandwidth values, such as shown in FIG. 34, is pre-stored in the device. In this case, the adaptation look-up tables are not stored in the device. Rather, the packet selection process is performed on-line on the basis of FIG. 34 and as prescribed by $$\frac{P \cdot M}{\Delta T} - F \cdot H'(P, BER)$$

This technique has low computational complexity and is suitable for a fast implementation.

In one implementation, data from the sender to the receiver is transported using UDP and IP over the 802.11 MAC. Therefore the 802.11 MAC payload (the MSDU) contains a 20 byte IP header and an 8 byte UDP header. The system may include in the UDP payload a packet sequence number and burst sequence number. These are used to detect packet losses at the receiver, and to detect the first and last packets in a burst. In some cases, the burst sequence number may be derived from the packet sequence number at the receiver. In that case, the burst sequence number does not have to be included in each packet. In the current implementation, the number of packets per burst is constant for the duration of an audio/video stream.

An alternative design would be to use RTP (Real-time Transport Protocol) over UDP/IP. RTP headers already contain packet sequence numbers, and provide other functionality as well.

In one implementation, a feedback packet from the receiver to the sender is transported using UDP and IP over the 802.11 MAC. The payload contains the estimate of available bandwidth computed at the receiver. It also contains an indicator of whether packet loss was detected in the recent packet burst(s).

An alternative design may se RTCP (Real-Time Control Protocol) to provide feedback messages from receiver to sender. RTCP is a companion protocol to RTP. RTCP provides Quality-of-Service related feedback information to participants of an RTP session, in the form of so-called Sender Reports and Receiver Reports.

It is to be generally understood that the payload of the feedback packet may also contain the value of the packet size or payload size, which corresponds to the size of the packets used to estimate the bandwidth at the receiver. This helps ensure that the sending rate adaptation process has the correct (pack size, bandwidth) tuple to index into the packet size adaptation tables. Moreover, the packet size adaptation technique may be implemented at the receiver rather than at the sender. In such a case, the feedback packet ma contain the computed new packet or payload size for the following transmissions, as computed by the rate adaptation process.

In some embodiments, a bandwidth value may be computed at the receiver, which is subsequently communicated to the sender, and the rate adaption process is performed at the sender side. In other embodiments, the receiver may use the computed bandwidth value directly to compute a new packet and/or payload size and/or timing between packets (or bursts) to be used for subsequent packet transmissions. In such a case, the new packet and/or payload size and/or timing between packets (or bursts) is communicated to the sender, rather than the estimated bandwidth value. In general it is to be understood that the process of sensing measurements, computing a bandwidth value on the basis of such measurements, computing other quantities indicative of the condition of the wireless channel, performing rate adaptation, computing packet sizes, computing number of packets in a burst, computing the time between packets and between bursts, can be performed either at the receiver or the transmitter, or a combination of the two. One consideration that may be used to select where the measurements and processing is undertaken is the computation resources available to the sender and/or receiver, as well as the expected conditions of the wireless channel and the available bandwidth.

An example of the operation of the rate adaptation scheme is now illustrated. The bandwidth estimation, feedback, and rate adaptation modules may be implemented in software modules. These software modules may function on two Windows 2000 laptops (one sender/server, and the other receiver/client). Each laptop may be equipped with 802.11b client adapters, configured in the ad-hoc networking mode of 802.11 and communicating using the 802.11b DCF. Data is transported using UDP and IP over 802.11b.

In this example, parameters were identical as for the look-up table example design provided above. The number of packets per burst M is 10. The time interval between bursts is 30 msec. The maximum MSDU size was 1500 bytes (payload of 1472 bytes), and during adaptation MSDU sizes are selected from the set {1500, 1200, 1000, 900, 600, 400, 300, 200, 100}. Therefore the maximum sending rate was 4 Mbps, while the minimum sending rate was 0.267 Mbps. The set of look-up tables as included above were used by the sender. Bandwidth estimates are computed at the receiver and sent back to the sender.

In this example, the laptops were initially positioned near each other. After approximately 5 sec, the distance between the laptops was increased (by pushing a rolling cart carrying one of the laptops), up to about 25 m. The speed was about 1 m/sec. After approximately 55 seconds from the start of the experiment, the distance between the two laptops was decreased, until the initial position. The experiment lasted about 90 sec, as was the duration of the data stream. In this example, the 802.11b cards were configured in Auto Rate Fallback mode, which allows the card to switch data link rates depending on channel conditions. Transmission power was set to 1 mW. Together, these conditions caused the sending/receiving stations to experience degraded channel conditions.

Figure 37:
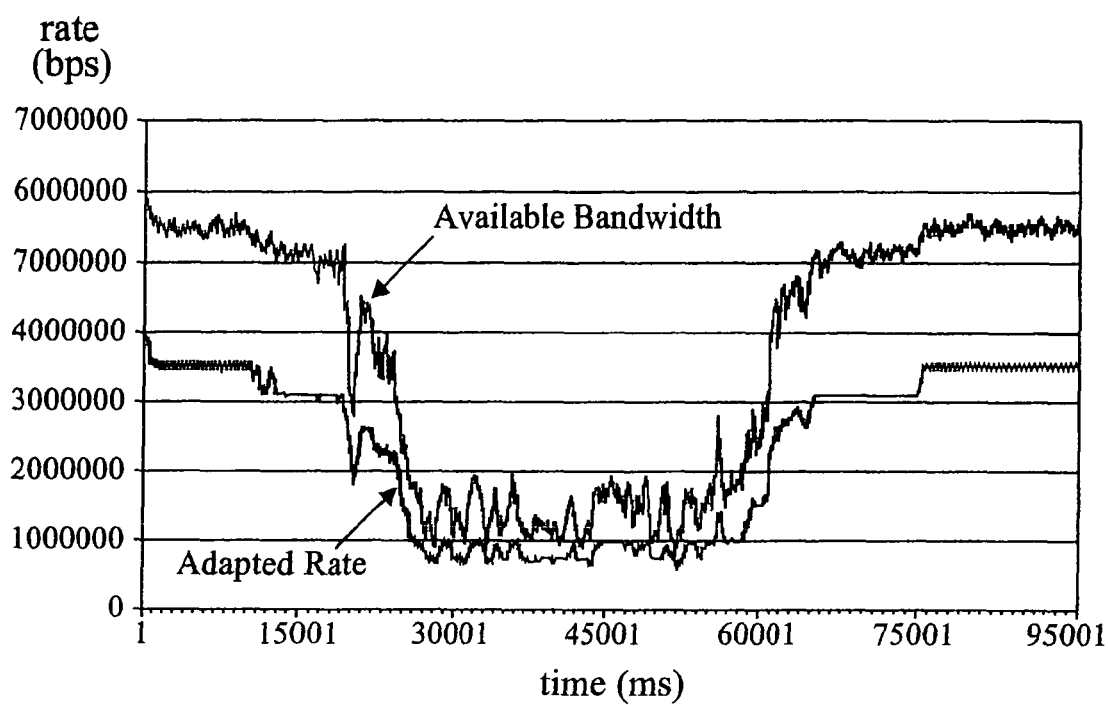
FIG. 37 illustrates the operation of the sending rate adaptation scheme.

The resulting measurements of available bandwidth (as reported by the receiver) as well as the adapted sending rate are shown in FIG. 37. As illustrated in FIG. 37, the original samples of the sending rate (one per burst) were smoothed in a similar way as samples of available bandwidth were during estimation. The graph shows that the rate was adapted successfully to remain below the estimated available bandwidth at all times.

It is also to be understood that the wireless channel may be characterized and the data transmitted through the wireless channel may be characterized based upon other criteria, such as for example, the signal to noise ratio. In this manner, the rate adaptation techniques, the packet size adaptation, the spacing determinations, and the number of packet determinations may be based, at least in part, on these other characteristics, such as the signal to noise ratio.

Delay Constrained Transmission

To maintain the highest quality, it is advantageous to adapt the audio/video stream in real time, based on the varying network conditions and audio/video content characteristics. In particular in cases where the end-to-end delay between encoding or transcoding and decoding or presentation of the audio/video content is small, it is advantageous to model the transmission system as well as the audio/video content characteristics more extensively.

It is advantageous to view the compressed audio/video stream as a sequence of audio/video data units. For example, a data unit may correspond to a single video frame, out of the series of video frames constituting a video stream. For continuous audio/video media streams, each audio/video data unit should be delivered to the receiver before its delivery deadline in order to avoid distortions or interruptions of the decoding and rendering of the content at the receiver. Therefore, each audio/video data unit has an associated delivery deadline, substantially resulting in a limit or constraint on the delay incurred by this data unit between the time of encoding (or transcoding) and the time of decoding. Furthermore, it is advantageous to consider the importance of an audio/video data unit, that is, the effect on the quality of the rendering of the content in the event that a data unit is delivered before its delivery deadline, in the event it is delivered after its delivery deadline, or in the event it is lost entirely. In delay-constrained audio/video transmission, the audio/video stream is adapted in such a manner that substantially all the data units arrive at the receiver before their respective delivery deadlines. Alternatively, the audio/video stream is adapted in such a manner that substantially the most important data units arrive at the receiver before their respective delivery deadlines. For example, this may be achieved by adapting the bit rate of the compressed video data in response to changes of the available bandwidth.

It is advantageous to consider the buffering of compressed audio/video data in various instances between the time of encoding and the time of decoding. Buffering of audio/video data is necessary and commonplace in audio/video transmission systems for various reasons. The sender (encoding) part of the system typically includes a buffer at the output of the encoder. The receiving (decoding) part of the system typically includes a buffer at the input of the decoder. Buffers are also typically present in parts of the system that implement the various networking protocol layers at the sender (encoder), at the receiver (decoder), and optionally at intermediate networking nodes. All such buffering has an effect on the delay incurred by audio/video data units transmitted. Such buffering needs to be considered jointly with the variations of available bandwidth and variations of the audio/video bit rate over time.

While the current bit rate that data is being sent to the receiver may be suitable for the estimated bandwidth, there tend to be variations in the bandwidth resulting in the data rate being temporarily higher than the actual available bandwidth. During these times attempting to transmit data at a bit rate in excess of the available bandwidth, the data will become increasingly backlogged in buffers at the sender (server or gateway) or within the channel. When the data rate is lower than the available bandwidth, then the backlogged data in the buffers at the sender (server or gateway) or the channel will tend to decrease. This temporary backlogging of data within the buffers at the sender (server or gateway) or the channel is not that critical for data that is not time sensitive. However, for audio and/or video transmission there are time constraints that require that the transmitted data to be present at the decoder by a specified time so that it may be properly decoded. Unfortunately, the data backlogged in buffers at the sender (server or gateway) or delayed in the channel may result in the data eventually arriving at the decoder after the specified time and thus not being properly decoded on time. This may result in the corresponding frame of video being lost or otherwise skipped, or interruption of video presentation at the receiver. The system should guard against underflow of the buffers, in particular the buffer at the decoder. The system should also guard against overflow of the buffer, in particular the buffer at the encoder.

Figure 38:
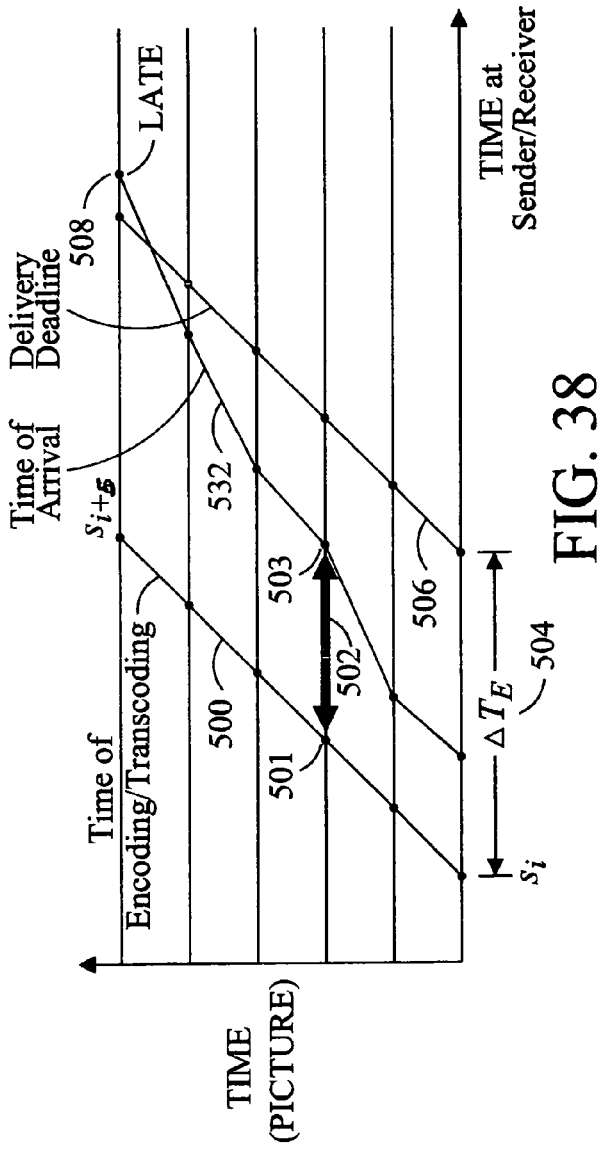
FIG. 38 illustrates timing of data.

Referring to FIG. 38, a time of encoding 500 illustrates each time $s_i$ that each frame is encoded and/or transcoded for transmission to a receiver. The duration of transmission $d_i$ 502 represents the time from encoding and/or transcoding 501 to receiving the data at the receiver 503. The duration of transmission $d_i$ 502 for different data units tends to vary based upon the particular channel conditions and other data units in the buffers at the sender (server or gateway) to be transmitted. Since the duration of transmission $d_i$ 502 tends to vary for each data unit, the system preferably encodes and/or transcodes each data unit (e.g., portion of a frame) at a time $\Delta T_E$ 504 (delay tolerance) sufficiently before the delivery deadline $S_{DTS,i}$ 506 for each data unit. The delay constraint on the system may be represented as $s_i + d_i \leq S_{DTS,i}$. The duration for transmission $d_i$ 502 may be modified by reducing the number of bits for the frame or increasing the number of bits for the frame. It may be observed that in FIG. 38, the data units for the 6th frame arrived late 508 and accordingly will not be decoded on time, thus impairing the quality of the video. Accordingly, it is preferable to monitor the bandwidth and/or data unit arrival time in order to suitably adjust the number of bits for a frame.

Figure 39:
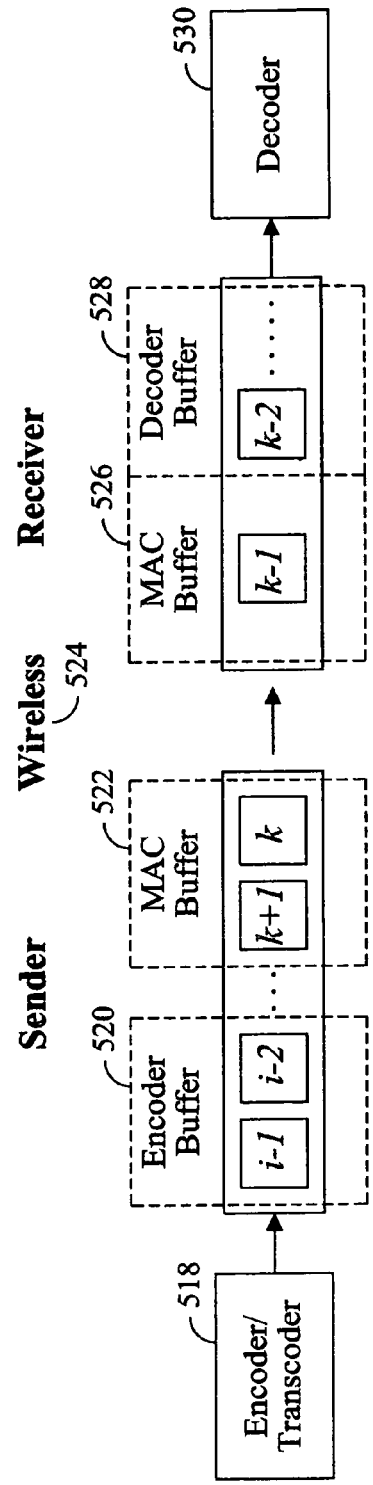
FIG. 39 illustrates buffers.

Referring to FIG. 39, the system may include one or more buffers or other mechanisms in the system between the encoding and/or transcoding of the data and the decoder receiving the data at the receiver. The system may include an encoder buffer 520 after the encoder that receives data from the encoder and/or transcoder 518. The encoder buffer 520 may be at the application level of the sender portion of the system. The sender may further include a MAC buffer 522 at the MAC layer of the sender that receives data from the encoder and/or encoder buffer 520. The encoder buffer and the MAC buffer at the sender may both contain packets for data units that were already encoded/transcoded by the encoder/transcoder 518. The system may take into account the amount of data in the sender buffers when selecting a bit rate. The system may include a delay in the wireless transmission 524. The receiver may include a MAC buffer 526 and a decoder buffer 528 that receive data from the wireless transmission 524. As previously described, the system may take into account the delivery deadline of video frames/data units at the decoder 530. Data units, such as compressed video frames, should be present in the decoder buffer 528 at their delivery deadlines. Another criteria that may be used to characterize the system is the arrival time 532 of each data unit with respect to each delivery deadline 506. When the arrival time 532 is sufficiently before the delivery deadline 506 the data rate may be increased, if desired, and conversely if the arrival time 532 is not sufficiently before the delivery deadline 506 the data rate may be decreased, if desired.

The temporal aspects of the system may also be considered in attempting to select an appropriate data rate. The past channel condition(s) for transmission of previous data unit(s) may be considered. For example, if the channel recently had poor bandwidth then it may be preferable not to increase the data rate significantly even if the channel condition improves. In addition, the system may include some estimation of the number of data units or otherwise a measure of data that was sent from the encoder in excess of the available bandwidth for a prior time period. This additional data sent from the encoder and/or transcoder may be used as a basis to modify additional data units. Another characteristic that may be used is the accumulative effects of the channel condition(s) over a prior period of time to determine the appropriate data rate for current and/or future transmissions. The change in the past channel condition(s) for previous data unit(s) may be considered. For example, if the channel instantly had high bandwidth then the system may anticipate that future bandwidth may likewise be high and provide a data rate accordingly. For example, if the channel is trending toward less bandwidth over time, then it may be preferable to decrease the data rate or otherwise not increase the data rate. The anticipated future channel condition(s) for later data unit(s), based upon transmissions of past data unit(s), to be transmitted may be considered. The change in the past channel condition(s) may be used as a basis for anticipating the future channel condition(s) for later data unit(s) to be transmitted. For example, if the channel had been experiencing increasing bandwidth then the system may anticipate further increasing bandwidth in the future, and thus increase the data rate accordingly.

Further it has been determined that in the case of MPEG-2 type video data there are different types of frame information, such as I, B, and P frames. For reconstructing video the I frames are the most important, the P frames are less important than the I frames, and the B frames are less important than the P frames. In this manner, additional data may be provided to the more important frames, when feasible. Also, the data preceeding a more important frame, such as an I frame, may be encoded with fewer bits to make additional bandwidth available to the I frame. In this manner, there is an increased likelihood that the I frame will arrive in a timely manner. In some cases, the transcoder or encoder may use the knowledge about the bandwidth characteristics of the transmission and adjust the number of bits used for the encoding or transcoding in order to achieve improved transmission characteristics. In general, some portions of the data stream are more important than other portions of the data stream, and may thus be encoded with a different number of bits. Accordingly, by being aware of the properties of the media, such as its frame type, different data units may be afforded different encoding properties and/or different transmission properties, such as the delay afforded.

One manner of controlling the temporal aspects of the wireless transmission may be as follows. The system may determine a target delivery time, which is earlier in time than the actual delivery deadline. A target delivery time is determined using a deadline sensitivity factor F. Subsequently, the system adapts the bit rate of the data units such that the expected time of arrival of the data units coincides with the target delivery times. This can be expressed as follows.

$$s_i + E_{(d_i)} \approx s_{start} + F \cdot \Delta T_E + i \cdot \Delta T,$$

where $s_i$ is the time data unit i is encoded or transcoded;
$E_{(d_i)}$ is the expected duration of transmission of data unit i;
where F is a deadline sensitivity factor $0 \leq F \leq 1$;
where $\Delta T_E$ is an end-to-end delay;
where $s_{start}$ is the time that the first picture is encoded or transcoded at the sender;
and where $\Delta T$ is the playout duration of a data unit.

The transmitted data across the wireless network may be described in terms of a sequence of data units, each of which contains a portion of encoded or compressed media data. A data unit may, for example, correspond to a single video frame. Alternatively, a data unit may, for example, correspond to less than a single video frame, a portion of a video frame, an object within a video frame, or multiple video frames. Data units may be indexed by i, i=0, 1, 2, 3, ..., and each data unit corresponds to one or multiple packets, where a packet is a unit of data suitable for transmission over a network.

The number of bits used to encode the data unit may be denoted by $r_i$ (q), where q is a set of coding choices, in particular quantizer step sizes. The distortion associated with data unit i when encoded with q may be denoted by $D_i$ (q). Each data unit may have an associated delivery deadline by which the data unit should arrive at the receiver, in order to be properly decoded within the time permitted. The delivery deadline may be expressed by a decoder time stamp $t_{DTS,i}$ that is expressed in media time t. In the case of constant frame rate video, where one data unit corresponds to one video frame, the following relation is generally correct:

$$t_{DTS,i} - t_{DTS,0} = i \cdot \Delta T$$

where $\Delta T$ corresponds to the frame duration or frame interval (1.0 divided by the frame rate). That is, the difference between the decoder time stamp of any data unit i and the decoder time stamp of the first data unit is a multiple of the playout duration of a data unit. Other relations may likewise be used, as desired.

In most cases the receiver buffers the incoming data units from the wireless network before passing the data units to the decoder. Therefore, at the start of the transmission of a stream of data packets, the receiver receives the data packets, and waits a fixed time interval before starting to decode the first data unit. Thereafter, the receiver will typically decode data units at a constant rate. For example, in the case of video, this constant rate may correspond to the frame rate.

Media time t (media clock) is related to the sender time s (clock at sender) by the following transformation:

$$s = s_{start} + \Delta T_E + (t - t_{DTS,0})$$

where $s_{start}$ corresponds to the time at the sender (on sender's clock) at which the first data unit is coded/transcoded; $\Delta T_E$ is the end-to-end delay between coding and decoding. The end-to-end delay consists substantially of three components $\Delta T_E = d_E + d_F + d_B$, where $d_E$ is the time difference between the time that the first data unit is encoded and the time that the first packet of the first data unit is sent by the sender; $d_F$ is the time difference between the time that the sender sends the first packet of the first data unit into the channel and the time it arrives at the receiver; and $d_B$ is the time difference between the time that the first packet of a data unit arrives at the receiver and the time this data unit is removed from the receiver buffer and is due to be decoded. This timing is based upon normal playback speed at the receiver. However, the timing may be varied based upon other factors, including for example, the playback speed at the receiver. The value of $d_B$ may be controlled by the system, with higher values indicating an increase in robustness at the expense of higher delays experienced by the user when starting transmission or when changing the input video, e.g. by channel changing.

In the case of constant frame rate video, using the above relations it follows that the decoding time stamp in terms of sender time (on sender's clock) can be expressed by:

$$s_{DST,i} = s_{start} + \Delta T_E + i \cdot \Delta T$$

Referring to FIG. 38, the relation between decoding time stamps $S_{DTS,i}$ and the index i of data units is indicated by the delivery deadlines curve 506. The delivery deadlines curve is offset from the curve with encoding times 500 by a constant delay value.

Suppose that at time $s_i$ the sender is about to encode or transcode data unit i. Let $d_i$ be the time difference between the instant that data unit i is encoded and the moment it arrives. The duration $d_i$ depends on the number of bits $r_i$ used to encode data unit i and how the data unit i is packetized (in particular the number and payload size of data packets) and the (time-varying) throughput performance of the network or channel. On-time delivery of this data unit suggests that the following may hold:

$$s_i + d_i \leq s_{start} + \Delta T_E + i \cdot \Delta T \qquad (28)$$

Referring to FIG. 38, the time of arrival of 532 of data units should be before the delivery deadlines 506. This expresses an end-to-end delay constraint.

The model of the system may further include an encoder buffer at the output of the encoder, as well as a transmission queue or buffer in the networking portion at the sender side. This transmission queue (or buffer) may correspond to the WLAN MAC packet queue. In many cases, this queue is not readily accessible by the application layer. When the application sends a data packet into the channel, it simply drops the packet into the transmission queue. The state, i.e. fullness, of the encoder buffer and transmission buffer at any particular time depends on the (time-varying) channel condition. In many cases, the transmission buffer may be empty most of the time if the channel condition is generally good. In contrast, the transmission buffer may fill up or become completely full if the channel condition is not good.

The state of the system at time $s_i$ is illustrated in the diagram in FIG. 39. The sender is about to encode/transcode data unit i. The sender buffers 520 and 522 may contain a non-zero number of data units k, k+1, . . . , i−2, i−1; where the data unit in the queue that was submitted to the encoder buffer previously is unit i−1. The data unit that is about to be transmitted over the wireless channel is unit k, which is the data unit with the lowest index still in the sender MAC queue 522. The data unit with highest index that has already arrived at the receiver buffer 526 and 528 is unit k−1. It is noted that the receiver MAC buffer 526 may be small and hold little data. In the case that data units correspond to video frames, and encoder and decoder operate at a constant frame rate, the total number of data units in the transmission system must be constant.

Let $\Delta t_j$ be the time it takes to transmit data unit j over the wireless channel, that is, the duration between the first and last bit of data unit j to enter the receiver decoder buffer. This duration $\Delta t_j$ depends on how the data unit j is packetized, for example the number and size of data packets, and the throughput performance of the network or channel at the time that data unit j is actually being transmitted over the wireless channel.

In this case, $d_i$ may be expressed as follows:

$$d_i = \Delta t_k + \Delta t_{k+1} + \ldots + \Delta t_{i-1} + \Delta t_i = \sum_{j=k}^{i} \Delta t_j$$

That is, in addition to the time it may take to transmit data unit i over the wireless channel, all previous data units still in the sender buffers should be transmitted over the wireless channel as well.

In this case, the delay constraint (Equation 28) may be expressed as:

$$s_i + \sum_{j=k}^{i} \Delta t_j \leq s_{start} + \Delta T_E + i \cdot \Delta T \qquad (29)$$

Note again that $\Delta t_j$ depends on the throughput or bandwidth of the channel at the time of transmitting data unit j. The delay constraint shows that on-time delivery of data unit i depends on the throughput or bandwidth of the channel at times into the future, during transmission of data units k to i. In such a system the throughput or bandwidth of the channel is subject to variations over time. Therefore, one may utilize any suitable technique to characterize the temporal variations, such as a probabilistic model of the channel behavior. In this case, an estimate or prediction of future channel throughput or bandwidth performance may be determined, given the model and given observations of past channel performance. Preferably, such observations may be available from feedback of channel performance estimates to the application.

Note also that $\Delta t_j$ depends on the number of bits $r_j$ used to encode data unit j. Therefore, the rate adaptation may be generally formulated as: find the optimal rate $r_i$ for data unit i, such that the distortion $D_i$ of unit i is minimized, subject to the delay constraint (Equation 29).

Rate Adaptation Techniques

Given the channel characterizations, one may define suitable rate adaptation techniques. One approach is to modify equation 29 to reflect the expected delay constraints:

$$E\left[s_i + \sum_{j=k}^{i} \Delta t_j\right] = s_i + \sum_{j=k}^{i} E[\Delta t_j] \leq s_{start} + \Delta T_E + i \cdot \Delta T \qquad (30)$$

based upon a probabilistic model of the channel and given observations of past channel performance. The rate adaptation then seeks to find the optimal rate $r_i$ for data unit i, such that the distortion $D_i$ of unit i is minimized, subject to the expected delay constraint (equation 30).

Another approach is to evaluate the probability that the delay constraint is not satisfied, in other words, the probability that data from data unit i are lost (because it arrives late at the receiver or is lost entirely):

$$Pr\left\{s_i + \sum_{j=k}^{i} \Delta t_j \geq s_{start} + \Delta T_E + i \cdot \Delta T\right\} \qquad (31)$$

again based on a probabilistic model of the channel and given observations of past channel performance. The rate adaptation problem in this case is to find the optimal rate $r_i$ for data unit i, such that the distortion $D_i$ of unit i is minimized, such that the probability given by (Eq. 31) remains below a small threshold. In some cases, equation 31 may also be utilized to evaluate expected distortion.

An example using equation 30 is illustrated in more detail. The expected duration of transmission of a data unit, $E[\Delta t_j]$, depends on the number of bits $r_j$ used to encode data unit j and on the channel condition at the time of transmission, denoted by $\theta_j$. It also depends on how the data unit is packetized. Data unit j, containing $r_j$ bits, is packetized into $M_j$ packets with payload size $P_j$ for all packets. Therefore, $$r_j = M_j \cdot P_j$$

By way of example, two techniques to compute $E[\Delta t_j]$ are illustrated. A first technique to compute $E[\Delta t_j]$ include knowledge of the channel condition in the form of an estimate of the expected available bandwidth at the time of transmission of data unit j.

One technique to estimate the available bandwidth H in a WLAN system includes periodically estimating the bandwidth based upon transmitting packets in bursts, and a bandwidth estimate is computed for one or more bursts. In a modified system the packets for a single data unit may be transmitted in a single burst. The bandwidth estimate is computed by the receiver and is sent back to the sender or otherwise information is obtained regarding the received single burst and provided to the sender which computes the bandwidth, where it is available to the rate adaptation mechanism. In addition to the bandwidth estimate, the feedback information includes the number (index) of the burst, i.e., data unit, for which the estimate was computed.

Other techniques to obtain estimates for available bandwidth may also be used. In particular, mechanisms may be used by the sender to retrieve information directly from the WLAN MAC and PHY layers, from which bandwidth or maximum throughput may be computed.

Here, the estimate for available bandwidth most recently obtained is utilized to compute $E[\Delta t_j]$ for media units j=k, ..., i. Therefore, the system may utilize the value of available bandwidth observed in the past to predict available bandwidth for future transmissions. The system may compute $E[\Delta t_j]$ as follows:

$$E[\Delta t_j] = \frac{r_j}{\tilde{H}} = \frac{M_j \cdot P_j}{\tilde{H}}$$

where $\tilde{H}$ is the most recent estimate of the available bandwidth.

In one embodiment, the number of packets for each media unit is held constant, therefore $M_i = M$ for all i. Therefore, rate adaptation is achieved by adapting packet size $P_i$.

Because the goal is to choose a rate for the single media unit i subject to the expected delay constraint (equation 30), it is sufficient to simply choose the highest rate for unit i for which equation 30 holds. Note that data units k, k+1, ..., i−1 are already encoded and already stored in the encoder or the transmission queue. Therefore, at time $s_i$, the system may only modify the rate of unit i. In other words, at time $s_i$, the system may choose the highest $P_i$ such that the following relation holds.

$$M \cdot \frac{P_i}{\tilde{H}} + M \cdot \sum_{j=k}^{i-1} \frac{P_j}{\tilde{H}} \leq s_{start} + \Delta T_E + i \cdot \Delta T - s_i$$

In a particular implementation, a discrete set of payload sizes may be defined, for example the set {72, 172, ..., 1372, 1472}. Then the system selects the value for $P_i$ from this set which best satisfies:

$$M \cdot \frac{P_i}{\tilde{H}} + M \cdot \sum_{j=k}^{i-1} \frac{P_j}{\tilde{H}} = s_{start} + F \cdot \Delta T_E + i \cdot \Delta T - s_i \quad (32)$$

Here, F is a deadline sensitivity factor. For small values of F, the system is highly sensitive to the deadline, and generally selects lower bit rates to data units. For higher values of F, the system is less sensitive, and generally selects higher bit rates. This is equivalent to determining a target delivery time, and subsequently selecting a bit rate for a data unit such that its expected delivery time coincides with the target delivery deadline.

If the (expected) delay constraint can not be met even when using the smallest allowable rate (smallest payload size $P_i$), the adaptation technique may determine that it is preferable to discard data unit i, i.e., not transmit it.

The sender adaptation technique should know the index k of the oldest data until still in the sender buffer 520 and 522, that is: how many data units are still in the encoder and networking queue at the time data unit i is about to be added to the queue. While the number of data units stored in the encoder buffer is generally known to the adaptation algorithm, information about the number of data units stored in the networking buffer(s) may not be available, as the transmission queue may not be accessible by the adaptation application in certain implementations. One technique to estimate this number is as follows. When the receiver receives a data unit it provides feedback to the sender, possibly including estimated bandwidth as well as the index of the data unit. The sender now assumes that the latest data unit for which it has received feedback at time $s_i$ corresponds to the latest data unit that has arrived at the receiver at that time instant. So, if u is the index of the most recent data unit for which the sender has received feedback, the sender estimates that k=u+1.

Given the above, the sender can now select $P_i$ from equation 32. This may be expressed by the technique illustrated in FIG. 40.

In another embodiment of this technique, the payload size for packets for all media units is held constant, therefore $P_i = P$ for all i. Therefore, rate adaptation is achieved by adapting the number of packets $M_i$ for different data units i.

In this case, for data unit i, the system may select the highest $M_i$ such that the following relation holds.

$$M_i \cdot \frac{P}{\tilde{H}} + \sum_{j=k}^{i-1} M_j \cdot \frac{P}{\tilde{H}} \leq s_{start} + \Delta T_E + i \cdot \Delta T - s_i \quad (32)$$

As before, a practical approach is to define a discrete set of values for $M_i$, for example the set {2, 3, ..., MMAX}. Then the value for $M_i$ is selected from this set which best satisfies:

$$M_i \cdot \frac{P}{\tilde{H}} + \sum_{j=k}^{i-1} M_j \cdot \frac{P}{\tilde{H}} = s_{start} + F \cdot \Delta T_E + i \cdot \Delta T - s_i \quad (33)$$

If the (expected) delay constraint can not be met even when using the smallest allowable rate (smallest number of packets $M_i$), the adaptation algorithm may decide to discard data unit i, i.e., not transmit it. This results in the rate adaptation technique shown in FIG. 41.

In yet another embodiment, both the number of packets as well as the payload size for each of the packets may be adapted.

The technique just described does not explicitly model the relation between the expected duration of transmission of a data unit (or, alternatively, the expected available bandwidth) and the wireless channel condition. It also ignores the dependency of the duration (or available bandwidth) on the packet size. In order to accommodate this, the system may let $\phi(P,\theta)$ be the expected transmission duration over an wireless wireless channel (such as 802.11 wireless channel) of a packet with payload size P and where the channel condition is $\theta$. The channel condition $\theta$ may be defined in terms of SNR, BER, PER or other parameter, and can be inferred from feedback obtained from the receiver, or from information directly available to the sender. Expected duration can be computed using any suitable technique. As previously described the values of $\phi(P,\theta)$ can be tabulated for discrete sets of values for P and $\theta$.

| MSDU size | BER = 0 | BER = $10^{-7}$ | BER = $10^{-6}$ | BER = $10^{-5}$ | ... |
|---|---|---|---|---|---|
| 1500 | 1.921 | 1.924 | 1.948 | 2.220 | ... |
| 1400 | 1.849 | 1.851 | 1.873 | 2.116 | ... |
| 1300 | 1.776 | 1.778 | 1.798 | 2.015 | ... |
| ... | ... | ... | ... | ... | ... |
| 200 | 0.976 | 0.976 | 0.978 | 0.997 | ... |
| 100 | 0.903 | 0.903 | 0.904 | 0.913 | ... |

As an example, the table below contains values for P in the set $\{100, 200, 300, \ldots, 1500\}$ in the case of IEEE 802.11b, where P corresponds to MSDU size, and in the case that the channel condition is defined in terms of the BER.

Similar tables can be constructed for 802.11a, 802.11g, or other protocols. The values of MSDU size and BER in the table above are only examples, and other values can be used as appropriate.

The expected duration of a data unit j is computed by:

$$E[\Delta t_j] = M_j \cdot \phi(P_j, m\theta_j)$$

Further simplifications can be applied, whereby the channel condition inferred from the most recent feedback obtained at the sender is utilized to predict expected durations of data units $j=k, k+1, \ldots, i-1, i$. The rate adaptation selects, at time $S_i$, a rate $r_i = M_i \cdot P_i$ for data unit i such that the following holds:

$$M_i \cdot \varphi(P_i, \theta) + \sum_{j=k}^{i-1} M_j \cdot \varphi(P_i, \theta) = s_{start} + F \cdot \Delta T_E + i \cdot \Delta T - s_i \quad (34)$$

Three separate techniques may be defined as follows. In a first technique, the number of packets for each data unit is held constant, therefore $M_i = M$ for all i. Therefore, rate adaptation is achieved by adapting packet size $P_i$, and the previous technique. Selection of packet size $P_i$ may be based on equation 34.

In a second technique, the payload size for packets for all data units is held constant, therefore $P_i = P$ for all i. Therefore, rate adaptation is achieved by adapting the number of packets $M_i$ for different data units i, similar to the second technique above. Selection of $M_i$ may be based upon equation (34).

In a third technique, both the number of packets $M_i$ as well as the payload size for each packet $P_j$ may be adapted, based on equation (34).

As described there are several techniques that may be used for rate adaptation where the system includes several network protocol layers. Rate adaptation generally operates at the application layer. Many of these systems include multiple lower layers below the application layer, such as a medium access control (MAC) layer, and a physical (PHY) layer (among other layers) for communication between the sender and the receiver. In many cases it turns out that applications running at the application level have no direct information regarding the occurrence of specific events in these lower layers, such as for example, the actual transmission of data frames by the MAC and PHY layers, or the arrival of acknowledgment frames at the PHY and MAC layers, at the sender.

In several MAC layer specifications, such as in IEEE 802.11 a/b/g, the MAC layer at the sender receives packets from its upper layer, and queues such packets in a buffer, for actual transmission using the PHY. The design of the MAC layer typically includes one or more FIFO queues. Packets remain in the MAC buffer until their arrival at the destination/receiver is acknowledged to the source/sender, or until a counter or timer expires. Packets (data frames) that are not acknowledged by the receiver to the sender are retransmitted one or more times. In the case of the IEEE 802.11 a/b/g compliant MAC protocols (incorporated by reference herein), packets have a retry limit, which is the maximum number of times that a packet (data frame) is retransmitted, before the sending station ceases retransmitting. The IEEE 802.11e compliant MAC protocols (incorporated by reference herein) also introduces the concept of a lifetime of a packet, which is a time duration during which the sending station can retransmit the packet, and after the time duration it does not retransmit the packet.

In both the 802.11 a/b/g MAC protocols and the 802.11e MAC protocol, it may take awhile before a packet is successfully received at the destination, or before the retry limit or lifetime limit is reached, in degraded channel conditions. Especially when using the 802.11 a/b/g MAC for real-time AV transmissions, it is difficult to select an optimal retry limit. When the retry limit is set low, a relatively high number of packets will be lost. In contrast, when the retry limit is set high, it may take a significant amount of time before a single packet reaches the destination, or before the sending station reaches the retry limit and it stops retransmitting the packet. In the meantime, the sending queue in the MAC tends to increase, filling up the packet (frame) buffer. For example, depending on the MAC configuration, when the retry limit is set to 16, it may take up to 150 ms to reach the MAC retry limit. In addition to the packet being lost, there may be many subsequent data packets (frames) queued in the sending buffer that are very likely to arrive late. That is, many packets have incurred such a significant delay, that they will arrive after their delivery deadline at the destination, even after being transmitted successfully by the MAC. In the case of transmission and playout of AV streams, data that arrives at the receiver too late must be discarded and considered lost. In this case, transmitting many of the packets that are already in the MAC queue is unnecessary. Moreover, such transmissions only increase the delay that subsequent packets experience, which would otherwise have had some chance to be received on time. Therefore, it is better to drop packets at the sender that are already late, and not attempt to transmit them.

Packet dropping is applied to packets held in a buffer at the application layer. Conventionally, no consideration is given to packets that have already been taken from the application layer packet buffer and have been submitted to lower layers. This is because generally packet dropping and other techniques have no access to packets that have already been submitted to the lower layers. However, as described in the above, a significant number of packets may be held at the lower layers, such as the MAC packet buffer in the case of IEEE 802.11 a/b/g. And, as described this may have a significant impact on performance.

It is useful to maximize the utility of the packet dropping mechanism so that packets are not transmitted if they are likely going to arrive late at the receiver, in the context of transmissions over home networks, based on technologies such as IEEE 802.11. Specifically, the system may attempt to limit the number of packets queued in the MAC buffer for transmission, thereby avoiding the situation described above. Note that the algorithm may assume no direct cross-layer control on the MAC or the MAC buffer, rather the control is applied indirectly from the application layer.

The source AV data is described in terms of a sequence of data units, containing compressed AV data. A data unit may, for example, correspond to a single video frame or picture. Data units are indexed by an integer sequence number i, i=0, 1, 2, 3, . . . . A data unit is carried in multiple packets, where a packet is a unit of data for transmission over a network. Each packet also has an integer sequence number 0, 1, 2, . . . . In the following, a group of packets carrying a single AV data unit, e.g., a single video picture, is referred to as a burst.

Each data unit has an associated delivery deadline by which the data unit arrives at the receiver, in order to be properly decoded. The delivery deadline is expressed by a decoder timestamp $t_{DTS,i}$. In the case of constant frame rate video, the interval between the delivery deadline of subsequent video frames (pictures) is determined by the frame rate.

The principle approach is to hold data packets in a queue that is controlled by the application layer as long as possible, before submitting them to the lower layers at the server. When submitting packets to the lower network layers, they are out of the control of the application layer, and may be held in a MAC buffer at the sending side as described above. Data packets are only submitted to the network when a feedback from the destination has been received, or when a timeout occurs. Just prior to submitting packets to the network lower layers, the system checks whether these packets are expected to arrive after their delivery deadline, in which case they are dropped by the application layer (instead of actually sending them).

The arrival of feedback at the server indicates that a group of packets corresponding to a data unit has been delivered successfully to the client. Therefore, these packets are known to have left the sender MAC buffer. Therefore, after a feedback is received, the application layer at the server may submit more packets to the network. In this manner, the arrival of feedback messages is used to regulate submissions of packets to the network, at the server, and keep the number of data packets in the sender MAC below a pre-specified maximum.

A timeout mechanism is used to solve a potential problem when feedback is lost or the previous burst is completely lost. In that case, the server may wait too long to submit packets to the network. To solve this problem, a timer is started when the last packet of a data unit is sent to the network. When the expected feedback message arrives at the server, this timer is canceled. However, when the feedback message does not arrive at the server after a pre-specified time duration, this timer times out. After a timeout, the server may submit more packets to the network. Note that the value of the timeout duration should be pre-selected or adaptive. Choosing a small timeout value effectively reduces the function of the feedback messages in regulating packet submissions. On the other hand, choosing a large timeout value may unnecessarily delay packets. In one embodiment, the timeout value is a function of the size of the last sent burst of packets. In another embodiment, the timeout value is a function of the expected time difference between the instant that a burst of packets was sent and the instant that a feedback message acknowledging these packets arrives back at the server.

The technique may make use of a virtual MAC buffer, which is not an actual packet buffer, but a data structure that is used to track the relevant parameters and estimated states of the real MAC buffer. The virtual MAC buffer holds a list of the sequence numbers of packets that are estimated (by the application-layer algorithm) to be present in the real MAC. The total number of packets in the virtual MAC buffer is an estimate of the actual number of packets in the real MAC buffer.

Figure 42:
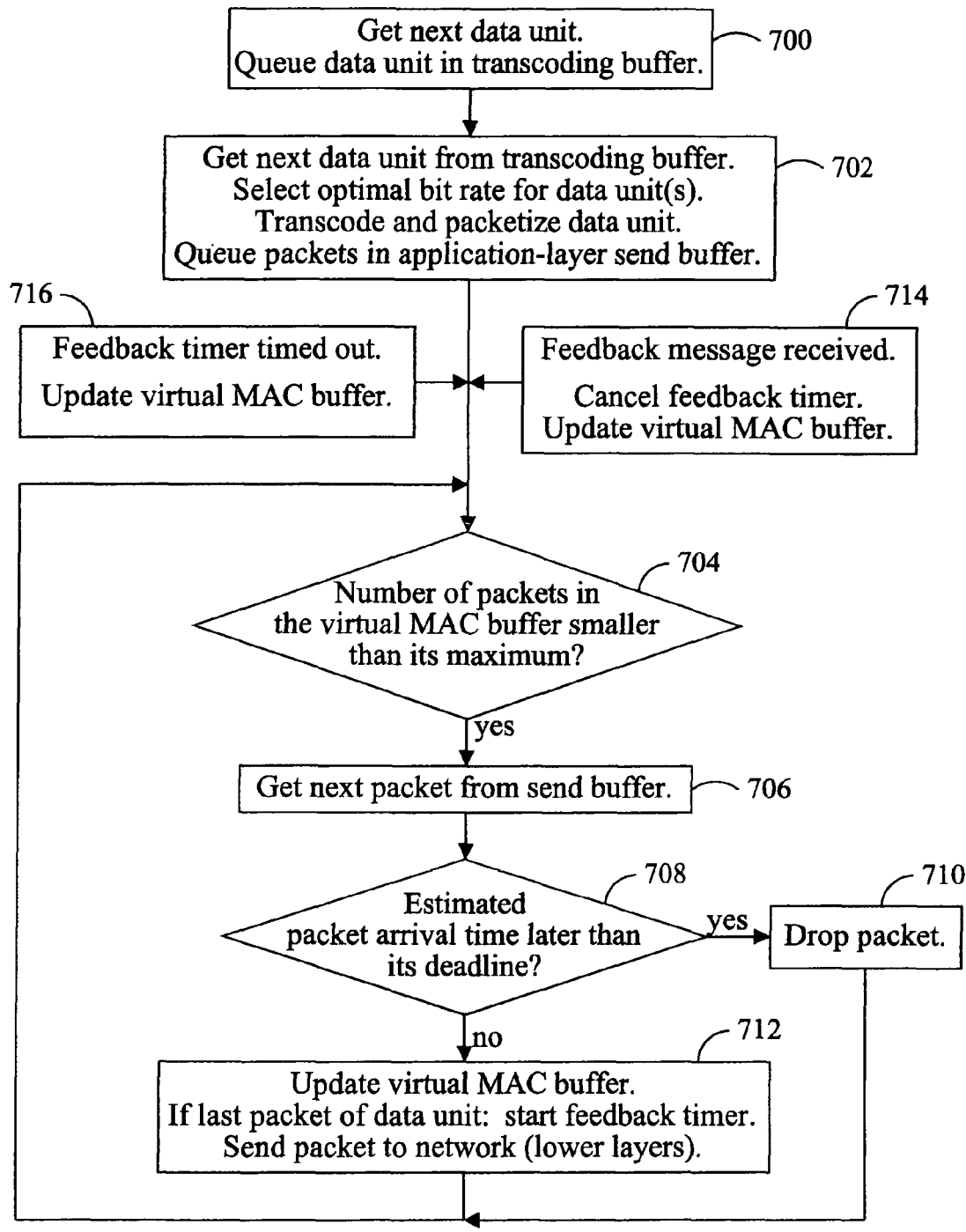
FIG. 42 illustrates a scheduling technique with a virtual buffer.

An overview diagram illustrating the steps of the algorithm is shown in FIG. 42.

The first steps are to queue incoming AV data units in a transcoding buffer 700, and at selected times to retrieve AV data units from this buffer, transcode and packetize the data units, and store the resulting data packets in an application-layer send buffer 702. The technique may use an optimal target bit rate for transcoding, which may be computed.

Before retrieving any packets from the application-layer send buffer, the algorithm checks whether the number of packets in the virtual MAC buffer is smaller than a pre-specified maximum 704. If so, the packet at the front of the queue in the application-layer buffer is retrieved and considered for submission to the network 706. First, the expected arrival time of this packet is computed, and compared to the delivery deadline of the data in the packet 708. If the packet is expected to arrive late at the client, this packet is dropped at the server 710. If the packet is expected to arrive on time, the packet is sent to the network lower layers. The virtual MAC buffer is updated, by including the sequence number of the packet in the list of packets estimated to be present in the real MAC buffer 712. Also, if this packet happens to be last packet in a burst, the above-mentioned timer is started.

The arrival of a feedback message likewise triggers the algorithm to consider retrieving packets from the application-layer send buffer and actually send them. It also causes the timer that was previously started to be canceled. It also causes the virtual MAC buffer to be updated, by removing the sequence numbers of packets that are acknowledged by the feedback message from the list in the virtual MAC buffer 714. Each feedback message contains the sequence number of the most recent packet delivered successfully at the client.

When the feedback timer times out, the algorithm is likewise triggered to consider retrieving packets from the application-layer send buffer and send them. It also causes the virtual MAC buffer to be updated, by removing the sequence numbers of all packets sent previously 716.

In one embodiment, the number of data units for which there are packets in the send buffer is limited to a pre-specified maximum value. In this case, the server is not allowed to retrieve an AV data unit from the transcoding buffer and transcode it and store the corresponding packets in the send buffer, until packets for earlier AV data units have been drained from the send buffer, i.e., until older packets have been actually sent to the network. This causes the bit rate selection and transcoding operations to occur as late as possible, i.e., until right before packets can potentially be considered for transmission. This may increase the overall adaptation performance, because in this manner the bit rate selection and transcoding operations are able to utilize the most recent and most relevant information about the network or channel status. This principle is referred to as "late transcoding" or "late adaptation". In one implementation, the maximum number of AV data units for which there are packets in the application-layer send buffer is 1 or 2.

By way of example the MAC buffer may have a size of approximately 12,000 bits per packet with space for 40 packets. A MAC buffer may likewise be preferably maintained at a fullness level less than 25% of the available space or less than 50% of the available space, even if additional packets are available to be provided to the MAC buffer.

Figure 43:
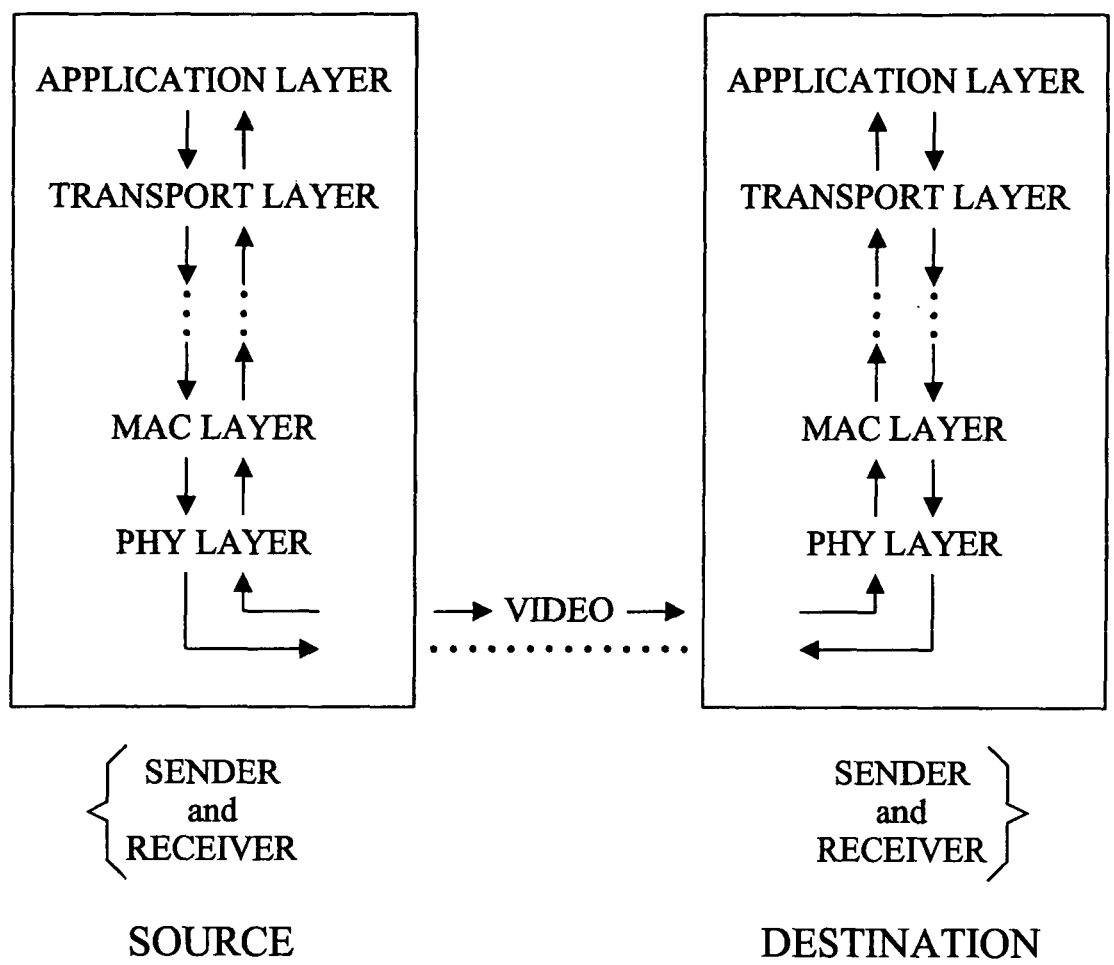
FIG. 43. illustrates a source and destination pair.

FIG. 43 illustrates the source and destination stations, as well as several network protocol layers, as well as the flow of packets between source and destination and between various protocol layers. Note that the source is effectively the sender for some data and the receiver for other data. The same applies to the destination. The system generally refers to "data packets" as packets containing video data that flow from the source to the destination, in particular at the application and transport layers. The system generally refers to "feedback packets" as packets containing feedback information that flow from the destination to the source, in particular at the application and transport layers. A plurality of data packets may be grouped into a "burst". The system generally refers to "data frames" as packets that are exchanged between the source and destination (in either direction) at the MAC layer. The system generally refers to "acknowledgement frames" as packets that are exchanged between the source and destination at the MAC layer, and acknowledge the arrival of data frames. A plurality of data frames at the MAC layer may be grouped into a "block". Note that both data packets and feedback packets at the application or transport layer are carried in data frames at the MAC layer.

Some of the bandwidth estimation techniques disclosed herein are based upon using the application layer. These techniques may incorporate an abstract model of lower protocol layers, such as the Medium Access Control (MAC) layer used in a network link between the source and the destination. However, the techniques using these methods normally have no direct knowledge about the occurrence of specific events in these lower layers, such as for example the arrival of acknowledgment or data frames at the MAC. In existing MAC specifications, such as in IEEE 802.11 a/b/g, the MAC layer at the destination receives packets from its lower layer (e.g. physical layer) one by one, and in the right order—the order in which the source MAC received the packets from its upper layer and the order in which the destination MAC must deliver packets to its upper layer. In such cases, the destination MAC does not need to buffer incoming data packets for purposes of re-ordering. The destination MAC delivers incoming packets directly to the upper layer. Therefore the relative arrival times of packets at the destination application layer are very indicative of the actual transmission duration. Available bandwidth can be computed from such arrival times at the application layer.

After attempting to apply these techniques to IEEE 802.11e, the bandwidth estimations were not as accurate as desired. It turns out that upon further examination that IEEE 802.11e introduces the so-called block-acknowledgment mechanism in the 802.11e MAC. Referring to FIG. 43, this mechanism is a type of pipelined error recovery mechanism which allows a batch of data frames (referred to as a block) to be transmitted between wireless stations, followed by a single acknowledgment frame, at the MAC layer. This single acknowledgment frame contains acknowledgments for individual data frames received in prior block transmissions. Data frames may arrive at the destination MAC out of order due to frame errors and retransmissions. The destination MAC acknowledges correctly received data frames whether or not they are received in the right order. Data frames are buffered at the destination MAC to allow for re-ordering, so that packets can be delivered to the upper layer in the right order. In the case of IEEE 802.11e, the acknowledgment frame from destination to source, called a block-acknowledgment frame is actually preceded by a block-acknowledgment-request frame from source to destination. After receiving a block-acknowledgment-request frame, and after re-ordering packets, the destination MAC may deliver a batch of packets to the upper layer. The packets in this batch may now arrive at the destination application layer at a very high rate, much higher than the actual transmission rate or average packet arrival rate at the MAC. Therefore, the relative packet arrival times and arrival rates at the destination application layer no longer accurately indicates the actual transmission duration. To accommodate this block-based characteristic a modified technique is desirable.

It is desirable to include a modified application-layer technique for bandwidth estimation that is capable of operating in the case where the destination lower layers (e.g. MAC layer) utilizes a receiver buffer. In particular, the bandwidth estimation technique should be effective when the underlying MAC layer is 802.11e and the MAC layer uses a block-acknowledgment mechanism.

As previously described, the audio and/or video data may be described in terms of a sequence of data units, containing compressed audio and/or video data. A data unit may, for example, correspond to a single video frame or picture. Data units are indexed by an integer sequence number 0, 1, 2, . . . . A data unit is carried in multiple packets, where a packet is a unit of data for transmission over a network. Each packet also has an integer sequence number 0, 1, 2, . . . . In the following, a group of packets carrying a single AV data unit, e.g., a single video picture, is referred to as a burst. A group of data frames (packets) formed at the MAC layer by the block-acknowledgment mechanism is referred to as a block.

One of the principles of the approach includes: the source uses the time difference between the arrival time of feedback messages and burst send times for estimating bandwidth. Bandwidth estimation is performed at the source or server side, i.e., the originator of audio and/or video data, rather than at the destination or client side, i.e., the recipient of audio and/or video data. The technique preferably operates at the application layer. The technique preferably uses UDP (as opposed to TCP) as the transport layer.

Figure 44:
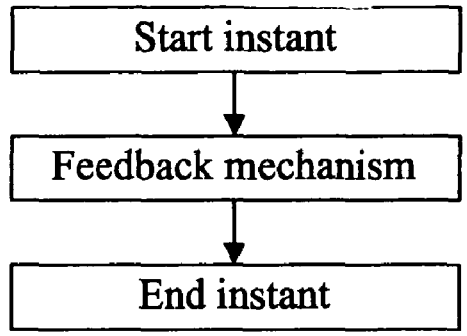
FIG. 44 illustrates a bandwidth estimation.

The technique may use one or more of the following relations, as illustrated in FIG. 44.

Bandwidth may be defined as the number of bits (or amount of data) received by the receiver (e.g., destination) within a measurement interval defined between two time instants (start and end), divided by the duration of this interval. The two time instants and measurements are preferably determined by the sender/source.

The interval end instant is the time when a feedback message is received by the sender/source. Accordingly, a bandwidth estimate may be calculated when a feedback is received at the sender/source. In another embodiment, the interval end instant may be the time when a packet was received at the destination after which the destination generated a feedback message, as estimated at the source.

The destination sends a feedback message after receiving a batch of packets with very small time difference between them, from the lower layer(s). The destination waits until it has received all the packets delivered at the same time (or almost the same time) by the lower layer. This event signals the arrival of a block of frames at the MAC. The destination generates a feedback message containing the sequence number of the last received packet and the number of packets that were lost since it sent the previous feedback message. The feedback message may also contain a timestamp based on the destination timeline indicating the instant at which the last packet was received, with which the source may estimate the time of this instant on the source timeline.

For increased accuracy in estimating the bandwidth, the interval duration measured should not include the time that packets spend in the buffer at the source MAC. Therefore, the start time instant of the measurement interval is chosen as the send time of the most recent burst which did not experience buffering at the source MAC. When the source application sends a burst of packets to the lower network layers, it detects whether or not that burst will experience buffering at the lower layers, for example as follows. If the sequence number of the first packet of a burst is one more than the sequence number of the last acknowledged packet, this means that all packets sent by the application layer have arrived at the receiver/destination. Therefore, the MAC buffer at the source is empty, and the next burst sent from the application layer will not experience buffering in the source MAC. For each burst, the source application stores a boolean value indicating whether it detected that the burst will experience buffering or not. When computing a bandwidth estimate, the server application searches for the most recent burst that did not experience buffering, starting from the most recent burst sent, going back to earlier bursts. The source also stores the send time of each burst of packets that it sends to the lower layers (including MAC). The send time of a burst of packets is the time that the first packet of that burst is sent to the lower layers. IntervalDuration may be defined as follows:

IntervalDuration=LastFeedbackRecvTime−SendTimeOfMostRecentBurst−WithNoMACBuffering The number of packets received by the destination during the "IntervalDuration" is computed at the source as the difference between the sequence number of the last packet that was acknowledged by a feedback packet and the sequence number of the first packet of the most recent burst that did not experience buffering, minus the number of lost packets. NumberOfReceivedPacsInTheInterval may be defined as follows:

NumberOfReceivedPacsInTheInterval=
SeqNumOfLastAckedPac−
SeqNumOfFirstPacOfMostRecent−
BurstWithNoMACBuffering+1−
numOFPacketsLostInTheInterval.

A bandwidth estimate sample ("BandwidthEstimateSample") may be computed as follows.

BandwidthEstimateSample=
NumberOfReceivedPacsInTheInterval*
PacketSize/IntervalDuration The previous two items above assume that the packet size is constant. These steps can be appropriately modified in case the packet size varies, by storing the sizes of packets at the server, and taking the sum of packet sizes to compute the total number of bits transmitted within the above interval, or other suitable variation.

The sequence of bandwidth estimate samples may subsequently be filtered for robustness. For example, a recursive (IIR) filter may be used as follows, with w=0.125.

BandwidthEstimate=(1−$w$)*BandwidthEstimate+
$w$*BandwidthEstimateSample

A feedback-based sender adaptation system generally relies on the arrival of feedback at the server/source for computing bandwidth estimates and, in general, adapting the sender behavior. In the system, feedback messages are sent by the client when it receives at least one packet.

A potential problem occurs when the transmission of packets takes very long, e.g., due to re-transmissions or other problems at the lower layers (including the MAC layer). In this case, the feedback message may be delayed as well, and the source may not receive a feedback message and may not update its bandwidth estimate for a relatively long time. However, not receiving a feedback for a long time means that the channel condition could actually be severely degraded and it is necessary to adapt the video quickly.

This problem can be reduced by using an early bandwidth update technique, which makes updates to the current bandwidth estimate value, without receiving a feedback message. The early bandwidth update technique keeps track of the time elapsed since the time that the last feedback message was received (at the server/source). Each feedback message received at the server/source has the time of its arrival stored.

Figure 45:
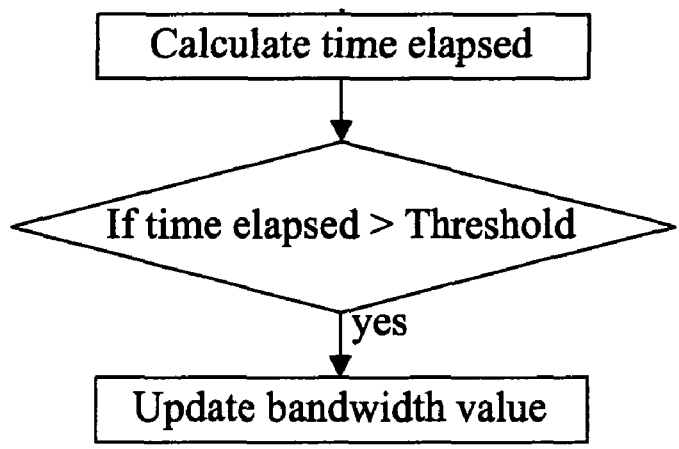
FIG. 45 illustrates another bandwidth estimation.

One instance of the early bandwidth update technique is as follows and illustrated in FIG. 45.

Prior to the source selecting an adapted bit rate for a video picture it checks whether there are any non-acknowledged packets. If there are, it looks up the time when the last feedback was received, and computes the time elapsed since the last feedback was received. timeElapsed may be defined as follows:

timeElapsed=currentTime−lastFeedbackTime

If the time difference between the current time and the time the last feedback was received is greater than a selected threshold (may be adaptive), the source calculates a new bandwidth sample. The new bandwidth sample calculation may be performed as follows:

Compute the number of packets that are expected to be acknowledged with the next feedback message. This number is approximated by computing the difference between the sequence numbers of the last sent and last acknowledged packets. If this difference is larger than the MAC block size, the number of packets that is expected to be acknowledged by the next feedback message is set to the MAC block size.

Calculate the bandwidth sample assuming that the expected feedback message is received at the current time. It may be represented as follows:

```
if (timeElapsed > ThresholdEarlyBWUpdate) then
{
    BandwidthEstimateSample = numOfPacketsToBeACKedNext *
    PacketSize / timeElapsed
}
```

In one preferred embodiment, the value of ThresholdEarlyBWUpdate is set to 50 ms. A final bandwidth estimate may be obtained by filtering the new bandwidth estimate sample for robustness, as above.

The above early bandwidth update technique can be used in case the underlying MAC is 802.11e and the MAC uses the Block-Acknowledgment mechanism.

Figure 46:
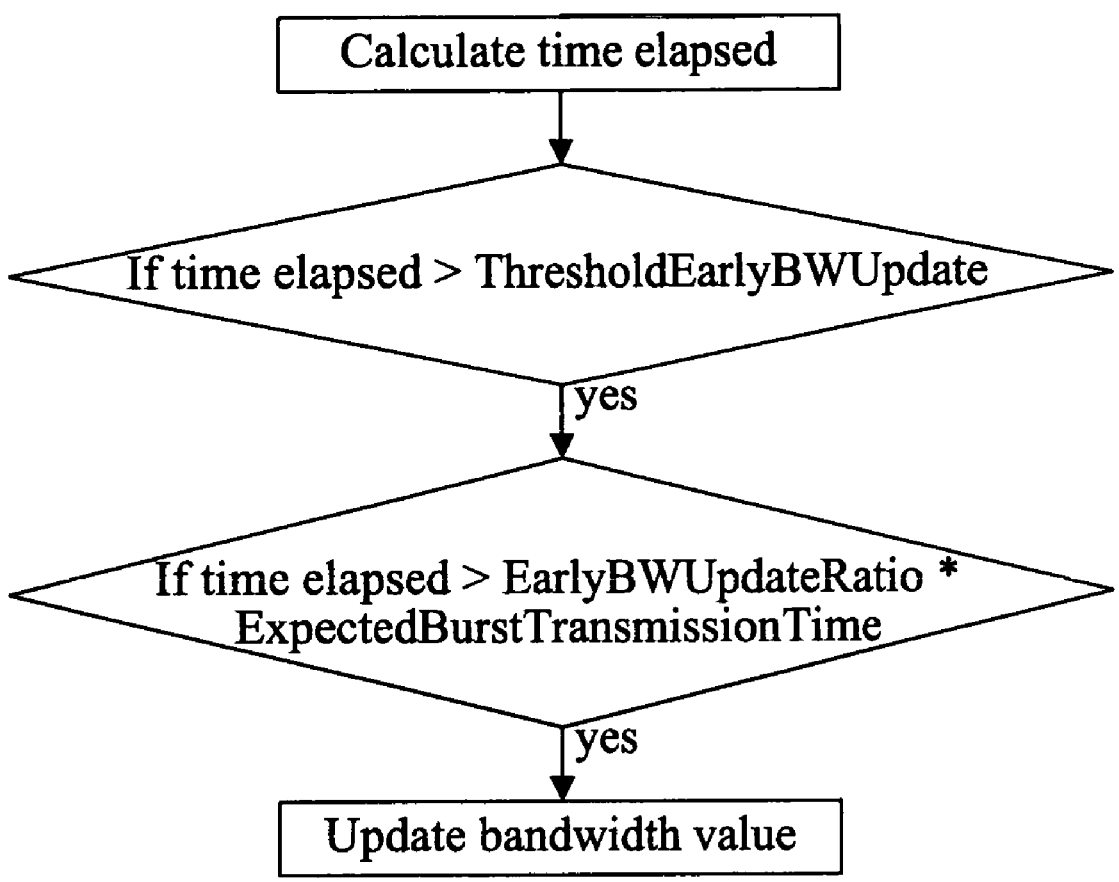
FIG. 46 illustrates another bandwidth estimation.

Another instance of the early bandwidth update technique may be as shown as illustrated in FIG. 46. The destination sends a feedback message after it receives a burst of packets corresponding to one data unit (e.g. video picture).

When the server/source is about to select an adapted bit rate for a video picture it checks whether there are any non-acknowledged packets. If there are, it looks up the time when the last feedback was received, and computes the time elapsed since the last feedback was received. timeElapsed may be computed as follows:

timeElapsed=currentTime−lastFeedbackTime

The source computes the size of the oldest burst of packets that was not acknowledged. To this end, the source stores the sizes of packets and the number of packets in each burst. Then, the source computes the expected transmission time of the oldest unacknowledged burst, using the current estimate of the bandwidth, as follows. ExpectedBurstTransmissionTime may be computed as follows:

ExpectedBurstTransmissionTime=
        sizeOfOldestUnacknowledgedBurst/
        BandwidthEstimate If the time elapsed since the last feedback was received is larger than the expected transmission time of the oldest unacknowledged burst by a (constant) factor EarlyBWUpdateRatio, and the elapsed time is greater than a selected threshold, the sender calculates a new bandwidth sample. The new bandwidth sample is calculated as the ratio of the size of the oldest unacknowledged burst and the elapsed time since the last feedback was received.

```
if (timeElapsed > ThresholdEarlyBWUpdate
    AND
    timeElapsed > EarlyBWUpdateRatio *
    ExpectedBurstTransmissionTime ) then
{
    BandwidthEstimateSample = sizeOfOldestUnacknowledgedBurst / timeElapsed
}
```

In one preferred embodiment, the value of ThresholdEarlyBWUpdate is set to 20 ms, and the value of EarlyBWUpdateRatio is set to 2.0. A final bandwidth estimate may be obtained by filtering the new bandwidth estimate sample for robustness.

Figure 47:
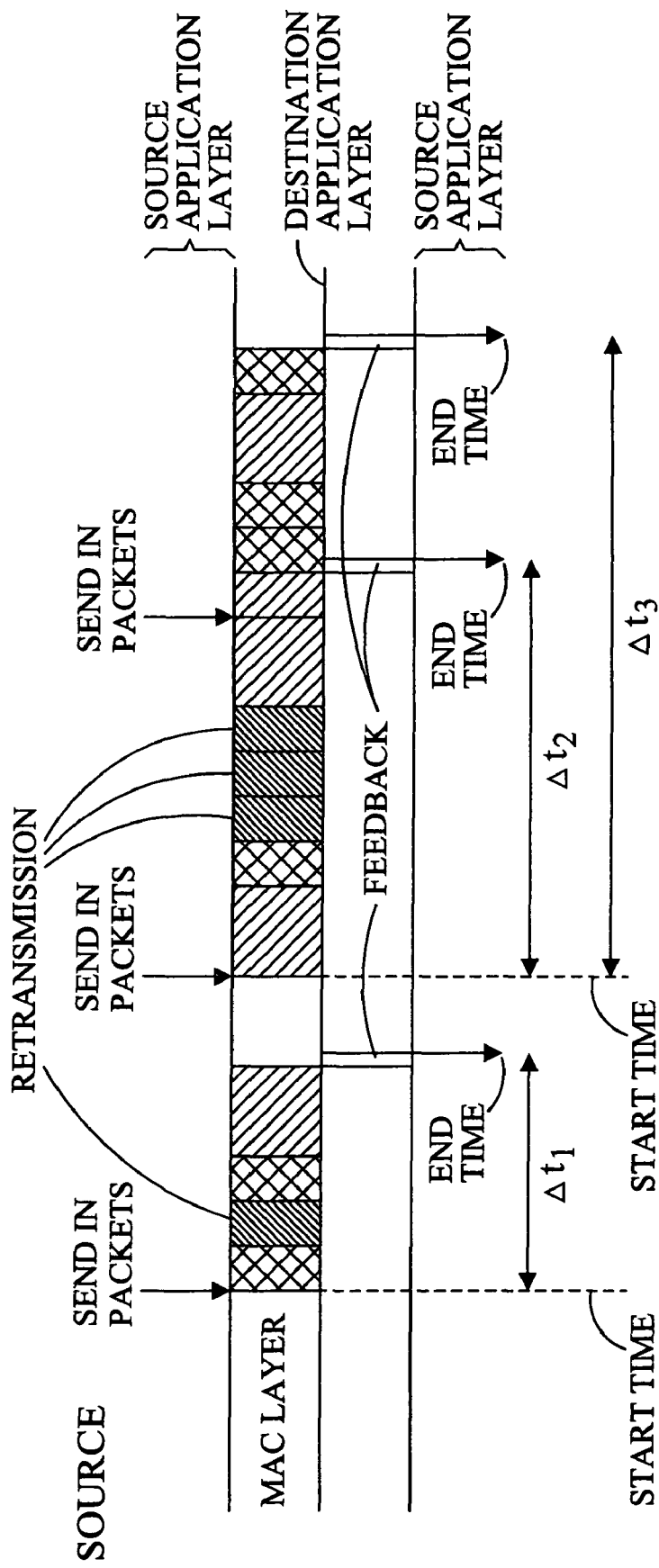
FIG. 47 illustrates bandwidth estimation 802.11e.

For purposes of illustration, FIG. 47 shows one timing illustration for bandwidth estimation that includes the block acknowledgment mechanism.

All references cited herein are incorporated by reference.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

The invention claimed is:

1. A method of transmitting video across an 802.11e wireless network interconnection from a source to a destination comprising:
(a) encoding said video at a network application layer at said source;
(b) providing sequential portions of said encoded video each comprising multiple data packets to a lower network layer than said application layer at said source, said lower network layer having at least one buffer capable of storing, and delaying transmission of, selective ones of said sequential portions of said encoded video, said network application layer storing a first value, and associating said first value with respective ones of said sequential portions, only when said respective ones of said sequential portions of said encoded video will be stored in no buffer of said lower network layer prior to transmission;
(c) said lower network layer capable of providing a plurality of said multiple data packets to said destination in an order different than the order that said multiple data packets are provided from said application layer to said lower network layer;
(d) receiving a feedback packet at said source from said destination, said feedback packet comprising a sequence number of the last received packet and a time stamp indicating a receipt time at which said last received packet was received;
(e) adapting said encoding of said video based upon an estimate of the bandwidth of said network interconnection, said estimate based upon said receiving said feedback packet at said source, and based on a calculation of an interval duration beginning from a start time that a said respective one of said sequential portions of said encoded video, associated with said first value, was provided to said lower network layer and ending at said receipt time for said last received packet of said respective one of said sequential portions, and where said calculation excludes any interval duration beginning from a start time that a portion of said encoded video, that is not associated with a said first value, was provided to said lower network layer.

2. The method of claim 1 wherein, at the lower network layer, multiple data packets are sent by the source prior to receiving a feedback packet.

3. The method of claim 2 wherein said multiple data packets are received by said receiver in an out of order manner.

4. The method of claim 3 wherein said feedback packet is representative of said multiple data packets.

5. The method of claim 4 wherein said feedback packet is a block-acknowledgment frame.

6. The method of claim 5 wherein said block-acknowledgment frame is preceded by a block-acknowledgment-request frame.

7. The method of claim 1 wherein the rate of arrival of said multiple data packets at said destination is different from the rate at which packets can be transmitted across said network interconnection.

8. The method of claim 1 wherein said network interconnection uses UDP.

9. The method of claim 1 wherein said bandwidth is based upon selection of one of a previous instance that said multiple data packets were provided to said lower network layer at said source.

10. The method of claim 9 wherein said bandwidth is further based upon the number of lost packets.

11. The method of claim 1 wherein said bandwidth is based upon the absence of receiving a feedback packet during a time period.

12. The method of claim 1 wherein said bandwidth is based upon a comparison related to a MAC block size.

* * * * *

UNITED STATES PATENT AND TRADEMARK OFFICE
CERTIFICATE OF CORRECTION

PATENT NO.         : 7,784,076 B2
APPLICATION NO.    : 11/113001
DATED              : August 24, 2010
INVENTOR(S)        : Mehmet U. Demircin It is certified that error appears in the above-identified patent and that said Letters Patent is hereby corrected as shown below:

Col. 47, Line 39

Change "$E[\Delta t_j] = M_j \cdot \phi(P_j m \theta_j)$" to read -- $E[\Delta t_j] = M_j \cdot \varphi(P_j \theta_j)$ --.

Signed and Sealed this
Twelfth Day of April, 2011

David J. Kappos
*Director of the United States Patent and Trademark Office*